(12) United States Patent
Kagalwalla et al.

(10) Patent No.: US 12,367,263 B2
(45) Date of Patent: Jul. 22, 2025

(54) INTENSITY EXTRACTION FOR FEATURE VALUES IN BASE CALLING

(71) Applicant: Illumina, Inc., San Diego, CA (US)

(72) Inventors: Abde Ali Hunaid Kagalwalla, San Diego, CA (US); Eric Jon Ojard, San Francisco, CA (US); Rami Mehio, San Diego, CA (US); Gavin Derek Parnaby, Laguna Niguel, CA (US); Nitin Udpa, San Diego, CA (US); Bo Lu, San Diego, CA (US); John S. Vieceli, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 18/604,194

(22) Filed: Mar. 13, 2024

(65) Prior Publication Data

US 2024/0362300 A1    Oct. 31, 2024

Related U.S. Application Data

(63) Continuation of application No. 17/902,630, filed on Sep. 2, 2022, now Pat. No. 11,989,265, which is a
(Continued)

(51) Int. Cl.
*G06V 10/56* (2022.01)
*G06F 18/20* (2023.01)
*G06F 18/23213* (2023.01)

(52) U.S. Cl.
CPC ...... *G06F 18/23213* (2023.01); *G06F 18/285* (2023.01); *G06V 10/56* (2022.01)

(58) Field of Classification Search
None
See application file for complete search history.

(56) References Cited

U.S. PATENT DOCUMENTS

| 5,528,050 A | 6/1996 | Miller et al. |
| 5,641,658 A | 6/1997 | Adams et al. |

(Continued)

FOREIGN PATENT DOCUMENTS

| CN | 112203648 A | 1/2021 |
| EP | 3306566 A1 | 4/2018 |

(Continued)

OTHER PUBLICATIONS

Abbaszadegan, "An Encoder-Decoder Based Basecaller for Nanopore DNA Sequencing", dated Feb. 2019, 112pgs.
(Continued)

*Primary Examiner* — Tahmina N Ansari
(74) *Attorney, Agent, or Firm* — Keller Preece PLLC

(57) ABSTRACT

The technology disclosed extracts intensities from sequencing images for base calling target clusters and attenuates spatial crosstalk from neighboring clusters. The technology disclosed accesses a particular section from a plurality of sections of an image output by a sensor, the particular section of the image including at least one pixel depicting intensity emission values from a target cluster and neighboring clusters located across the sensor, and convolves the particular section of the image with a corresponding convolution kernel in a plurality of convolution kernels, to generate a feature map comprising a plurality of feature values. The technology disclosed further assigns a corresponding feature value to the target cluster based on feature values in the plurality of feature values adjoining a center of the target cluster, and processes the corresponding feature value assigned to the target cluster, to base call the target cluster.

20 Claims, 31 Drawing Sheets

Related U.S. Application Data continuation of application No. 17/511,483, filed on Oct. 26, 2021, now Pat. No. 11,455,487.

(60) Provisional application No. 63/223,408, filed on Jul. 19, 2021.

(56) References Cited

U.S. PATENT DOCUMENTS

| | | | |
|---|---|---|---|
| 5,719,391 | A | 2/1998 | Kain |
| 6,090,592 | A | 7/2000 | Adams et al. |
| 6,266,459 | B1 | 1/2001 | Walt et al. |
| 6,355,431 | B1 | 3/2002 | Chee et al. |
| 6,598,013 | B1 | 7/2003 | Domnisoru et al. |
| 6,770,441 | B2 | 8/2004 | Dickinson et al. |
| 6,778,692 | B1 | 8/2004 | Yazici |
| 6,859,570 | B2 | 2/2005 | Walt et al. |
| 6,865,301 | B1 | 3/2005 | Harris |
| 7,057,026 | B2 | 6/2006 | Barnes et al. |
| 7,115,400 | B1 | 10/2006 | Adessi et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,405,281 | B2 | 7/2008 | Xu et al. |
| 7,595,882 | B1 | 9/2009 | Chen et al. |
| 7,622,294 | B2 | 11/2009 | Walt et al. |
| 8,158,926 | B2 | 4/2012 | Feng et al. |
| 8,241,573 | B2 | 8/2012 | Banerjee et al. |
| 8,563,477 | B2 | 10/2013 | Smith et al. |
| 8,778,848 | B2 | 7/2014 | Lin et al. |
| 8,778,849 | B2 | 7/2014 | Bowen et al. |
| 8,895,249 | B2 | 11/2014 | Shen et al. |
| 8,965,076 | B2 | 2/2015 | Garcia et al. |
| 9,012,022 | B2 | 4/2015 | George et al. |
| 9,079,148 | B2 | 7/2015 | Rigatti et al. |
| 9,483,610 | B2 * | 11/2016 | McMillen .............. G16B 30/10 |
| 9,512,422 | B2 | 12/2016 | Barnard et al. |
| 10,068,053 | B2 | 9/2018 | Kermani et al. |
| 10,691,775 | B2 * | 6/2020 | van Rooyen .......... G16H 10/60 |
| 11,188,778 | B1 | 11/2021 | Ojard et al. |
| 11,455,487 | B1 | 9/2022 | Kagalwalla et al. |
| 2002/0034337 | A1 | 3/2002 | Shekter |
| 2002/0055100 | A1 | 5/2002 | Kawashima et al. |
| 2002/0150909 | A1 | 10/2002 | Stuelpnagel et al. |
| 2004/0002090 | A1 | 1/2004 | Mayer et al. |
| 2004/0096853 | A1 | 5/2004 | Mayer |
| 2005/0064460 | A1 | 3/2005 | Holliger et al. |
| 2005/0130173 | A1 | 6/2005 | Leamon et al. |
| 2006/0020203 | A1 | 1/2006 | Tamura |
| 2007/0128624 | A1 | 6/2007 | Gormley et al. |
| 2007/0194249 | A1 | 8/2007 | Gavrilov et al. |
| 2008/0009420 | A1 | 1/2008 | Schroth et al. |
| 2008/0108082 | A1 | 5/2008 | Rank et al. |
| 2008/0234136 | A1 | 9/2008 | Drmanac et al. |
| 2008/0242560 | A1 | 10/2008 | Gunderson et al. |
| 2009/0024331 | A1 | 1/2009 | Tomaney et al. |
| 2009/0035779 | A1 | 2/2009 | Kurnik et al. |
| 2009/0088327 | A1 | 4/2009 | Rigatti et al. |
| 2010/0034444 | A1 | 2/2010 | Emhoff et al. |
| 2010/0160172 | A1 | 6/2010 | Erlich et al. |
| 2011/0059865 | A1 | 3/2011 | Smith et al. |
| 2011/0256631 | A1 | 10/2011 | Tomaney et al. |
| 2012/0015825 | A1 | 1/2012 | Zhong et al. |
| 2012/0020537 | A1 | 1/2012 | Garcia et al. |
| 2012/0270305 | A1 | 10/2012 | Reed et al. |
| 2012/0316086 | A1 | 12/2012 | Lin et al. |
| 2013/0023422 | A1 | 1/2013 | Feng et al. |
| 2013/0079232 | A1 | 3/2013 | Kain et al. |
| 2013/0109577 | A1 | 5/2013 | Korlach et al. |
| 2013/0116153 | A1 | 5/2013 | Bowen et al. |
| 2013/0184796 | A1 | 7/2013 | Marzano et al. |
| 2013/0260372 | A1 | 10/2013 | Buermann et al. |
| 2014/0153801 | A1 | 6/2014 | Sárközy et al. |
| 2014/0221216 | A1 | 8/2014 | Cope et al. |
| 2014/0243224 | A1 | 8/2014 | Barnard et al. |
| 2015/0057167 | A1 | 2/2015 | Kaiser et al. |
| 2015/0065353 | A1 | 3/2015 | Turner et al. |
| 2015/0079596 | A1 | 3/2015 | Eltoukhy et al. |
| 2015/0125053 | A1 | 5/2015 | Vieceli et al. |
| 2015/0169824 | A1 | 6/2015 | Kermani et al. |
| 2017/0152554 | A1 | 6/2017 | Drmanac et al. |
| 2017/0318240 | A1 | 11/2017 | Yu |
| 2018/0195953 | A1 | 7/2018 | Langlois et al. |
| 2018/0260940 | A1 | 9/2018 | Langlois et al. |
| 2018/0274023 | A1 | 9/2018 | Belitz et al. |
| 2020/0234099 | A1 * | 7/2020 | Wang ..................... G06F 17/16 |
| 2020/0234124 | A1 * | 7/2020 | Park ....................... G06N 3/048 |
| 2020/0302223 | A1 | 9/2020 | Dutta et al. |
| 2020/0302224 | A1 | 9/2020 | Jaganathan et al. |
| 2020/0302225 | A1 * | 9/2020 | Dutta ................. G06V 10/7715 |
| 2020/0350037 | A1 | 11/2020 | Mishra |
| 2020/0364496 | A1 | 11/2020 | Kostem |
| 2020/0364565 | A1 | 11/2020 | Kostem |
| 2021/0011896 | A1 * | 1/2021 | Huang ................. G06F 16/285 |
| 2021/0118110 | A1 | 4/2021 | Langlois et al. |
| 2021/0158512 | A1 * | 5/2021 | Sun ........................ G06T 13/80 |
| 2021/0264232 | A1 * | 8/2021 | Kim ....................... G06N 3/048 |
| 2021/0350163 | A1 | 11/2021 | Ojard et al. |

FOREIGN PATENT DOCUMENTS

| | | | |
|---|---|---|---|
| JP | 2020-056677 | A | 2/2021 |
| RU | 2291197 | C2 | 1/2007 |
| RU | 2565550 | C2 | 10/2015 |
| WO | 91/06678 | A1 | 5/1991 |
| WO | 00/63437 | A1 | 1/2002 |
| WO | 2004/018493 | A1 | 3/2004 |
| WO | 2004/018497 | A3 | 6/2004 |
| WO | 2005/024010 | A1 | 3/2005 |
| WO | 2005/065814 | A1 | 7/2005 |
| WO | 2005/010145 | A3 | 8/2005 |
| WO | 2006/120433 | A1 | 11/2006 |
| WO | 2007/010251 | A2 | 1/2007 |
| WO | 2007/010252 | A1 | 1/2007 |
| WO | 2008/041002 | A2 | 4/2008 |
| WO | 2007/123744 | A3 | 11/2008 |
| WO | 2012/058096 | A1 | 5/2012 |
| WO | 2015/002813 | A1 | 8/2015 |
| WO | 2016/066586 | A1 | 6/2016 |
| WO | 2017/098013 | A1 | 6/2017 |
| WO | 2020/236945 | A1 | 11/2020 |

OTHER PUBLICATIONS

Bentley et. al., Accurate Whole Human Genome Sequencing using Reversible Terminator Chemistry, Supplemental Information, Nature, dated Nov. 6, 2008, 55 pages, [retrieved on Jul. 21, 2021], retrieved from the internet [URL:https://media.nature.com/original/natureassets/nature/journal/v4567/n218/extref/nature07517-s1.pdf].

Boza et. al, "DeepNano: Deep recurrent neural network for base calling in MinION nanopore reads", dated Jun. 5, 2017, 13 pages.

Dressman et al., Transforming single DNA molecules into fluorescent magnetic particles for detection and enumeration of genetic variations, Proceedings of the National Academy of Science, vol. 100, No. 15, pp. 8817-8822, dated Jul. 22, 2003, 6 pages.

Genome Analysis Wiki, "Base Caller Summaries", date of last edit Mar. 12, 2010, 4 pages.

Huang et. al, "SACall: a neural network basecaller for Oxford Nanopore sequencing data based on self-attention mechanism", dated 2020, 10 pages.

J. Shen, X. Tang, X. Dong and L. Shao, "Visual Object Tracking by Hierarchical Attention Siamese Network", in IEEE Transactions on Cybernetics, vol. 50, No. 7, pp. 3068-3080, Jul. 2020, DOI: 10.1109/TCYB.2019.2936503.

Kao et. al., "BayesCall: A model-based base-calling algorithm", dated Apr. 21, 2009, 13 pages.

Kircher et. al. "Improved base calling for the Illumina Genome Analyzer using machine learning strategies", dated Aug. 14, 2009, 9 pages.

Konishi et. al., "Halcyon: an accurate basecaller exploiting an encoder-decoder model with monotonic attention", dated Nov. 9, 2020. 7 pages.

(56) References Cited

OTHER PUBLICATIONS

Miculinic et. al, "MinCall—MinION end2end convolutional deep learning basecaller", dated Apr. 22, 2019, 8 pages.
Oxford, Cacho et. al., "A comparison of Base-calling Algorithms for Illumina Sequencing Technology", dated Oct. 5, 2015, 10 pages.
Peresini et. al, "Nanopore Base Calling on the Edge", dated Nov. 9, 2020, 15 pages.
Rakocevic et al., Fast and Accurate Genomic Analyses using Genome Graphs, biorxiv URL [https://www.biorxiv.org/content/biorxiv/early/2018/03/194530.full.pdf], dated Mar. 20, 2018, 104 pages.
Ratkovic, Deep Learning Model for Base Calling of MinION Nanopore Reads, dated Mar. 3, 2017, 48 pages,. (University of Zagreb).
Thornley et. al., "Machine Learning in Basecalling—Decoding Trace Peak Behavior", dated Oct. 2006, 9 pages.
University of Cambridge, "Artificial Intelligence for genomic medicine", dated May 2020, 63 pages.
Wang et al "An adaptive decorrelation method removes Illumina DNA base-calling errors caused by crosstalk between adjacent clusters" Scientific Reports vol. 7, Article No. 41348 (2017) (Year: 2017).
Wang et. al., "WaveNano: a signal-level nanopore base caller simultaneous prediction of nucleotide labels and move abels through bi-directional WaveNets", dated 2018, 10 pages.
Weissleder Ralph et al: "Automated molecular-image cytometry and analysis in modern oncology", Nature Reviews Materials, Nature Publishing Group UK, London, vol. 5, No. 6, Mar. 5, 2020 (Mar. 5, 2020), pp. 409-422, XP037159302, DOI: 10.1038/S41578-020-0180-6 [retrieved on Mar. 5, 2020].
Wick et. al., "Performance of neural network basecalling tools for Oxford Nanopore sequencing", dated 2019, 10 pages.
Wikipedia, Least Squares, 13 pages, retrieved on Mar. 7, 2022, retrieved from the internet [URL: https://en.wikipedia.org/w/index.php?title=Least_squares&oldid=951737821].
Wikipedia, Ordinary Least Squares, 16 pages, retrieved on Mar. 7, 2022, retrieved from the internet [URL: https://en. Wikipedia .org/w/index. php?title=Ordinary _least squares&oldid=951770366].
Wolowski, Vincent Roman "High-quality, high-throughput measurement of protein-DNA binding using HITS-FLIP", Munich, Mar. 2, 2016, 251 pages.
Xuan Lv et. al., "An end-to-end Oxford Nanopore Basecaller Using Convolution-augmented Transformer", dated 2020, 6 pages.
Zeng et. al, "Causalcall: Nanopore Basecalling Using a Temporal Convolutional Network", dated Jan. 20, 2020, 11 pages.

\* cited by examiner

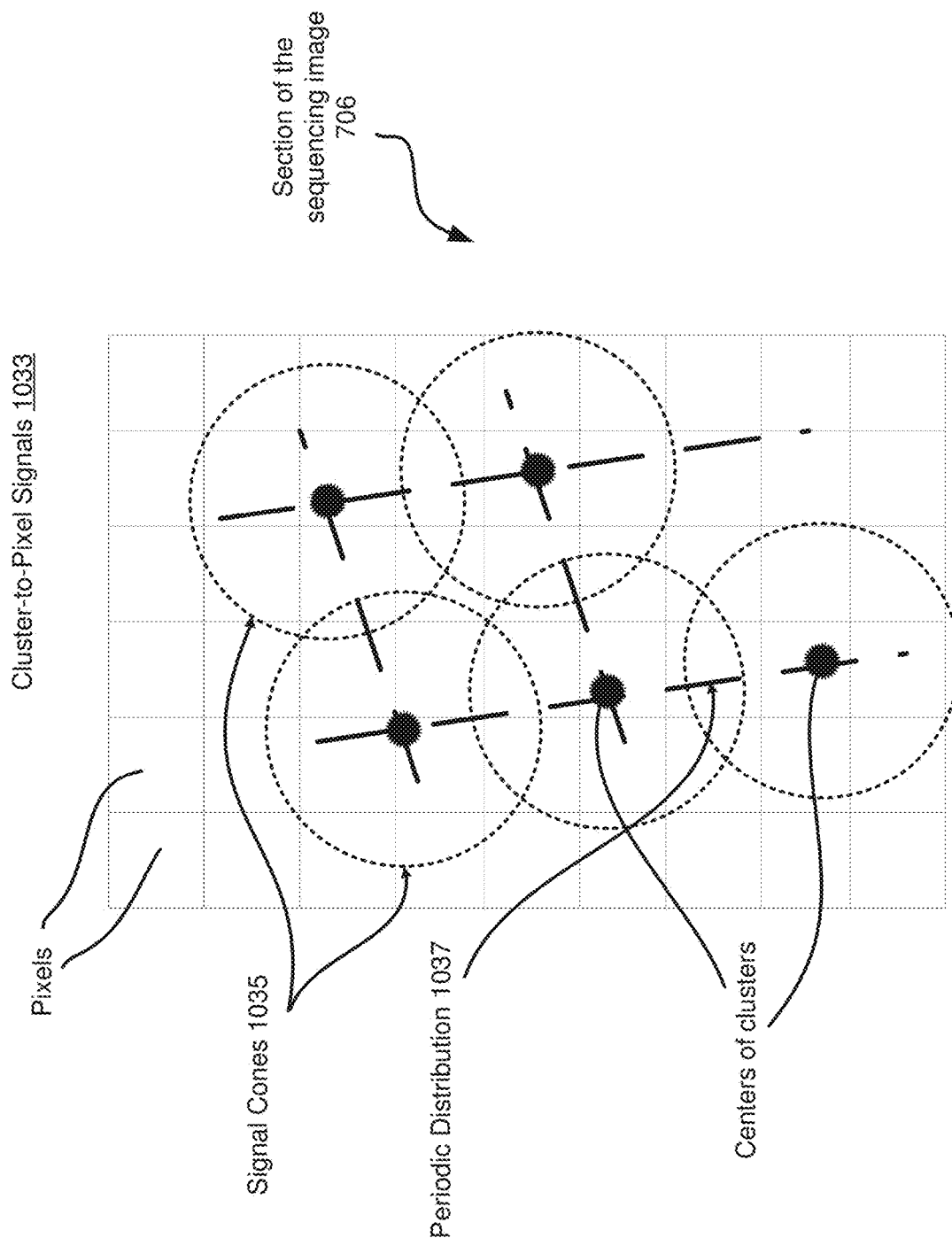

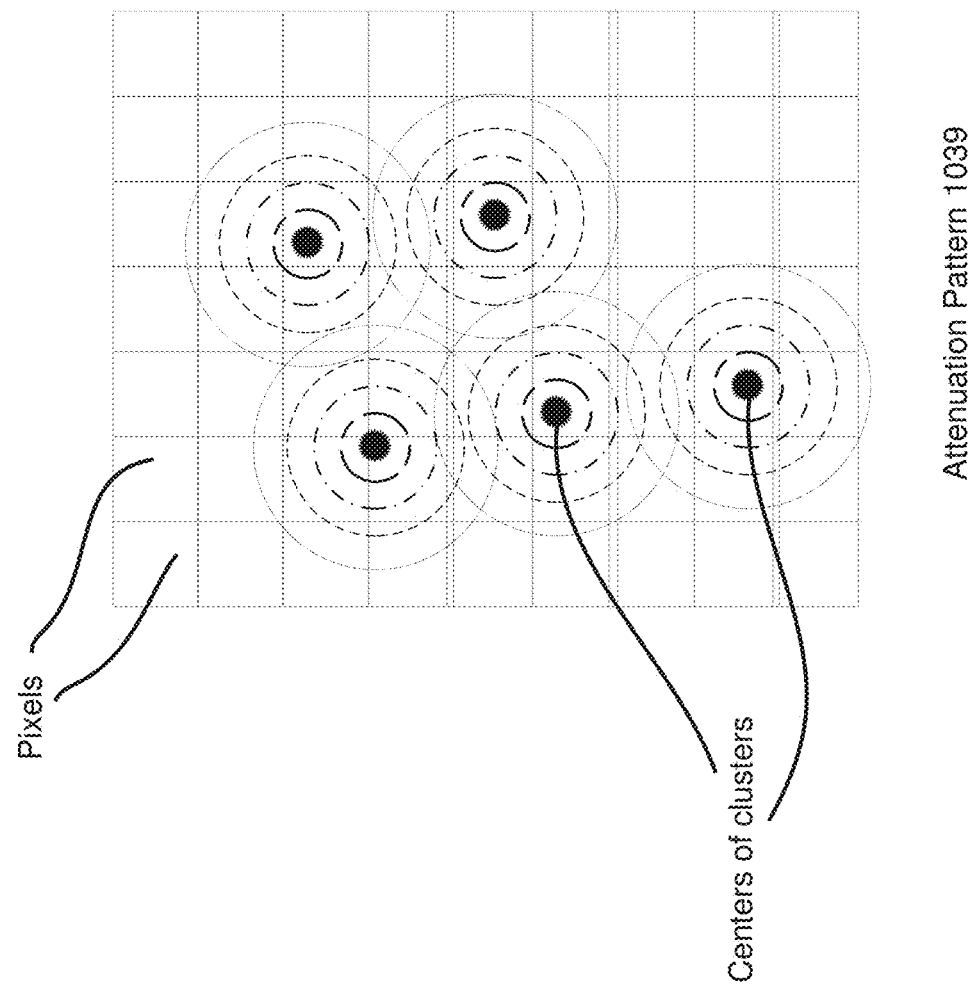

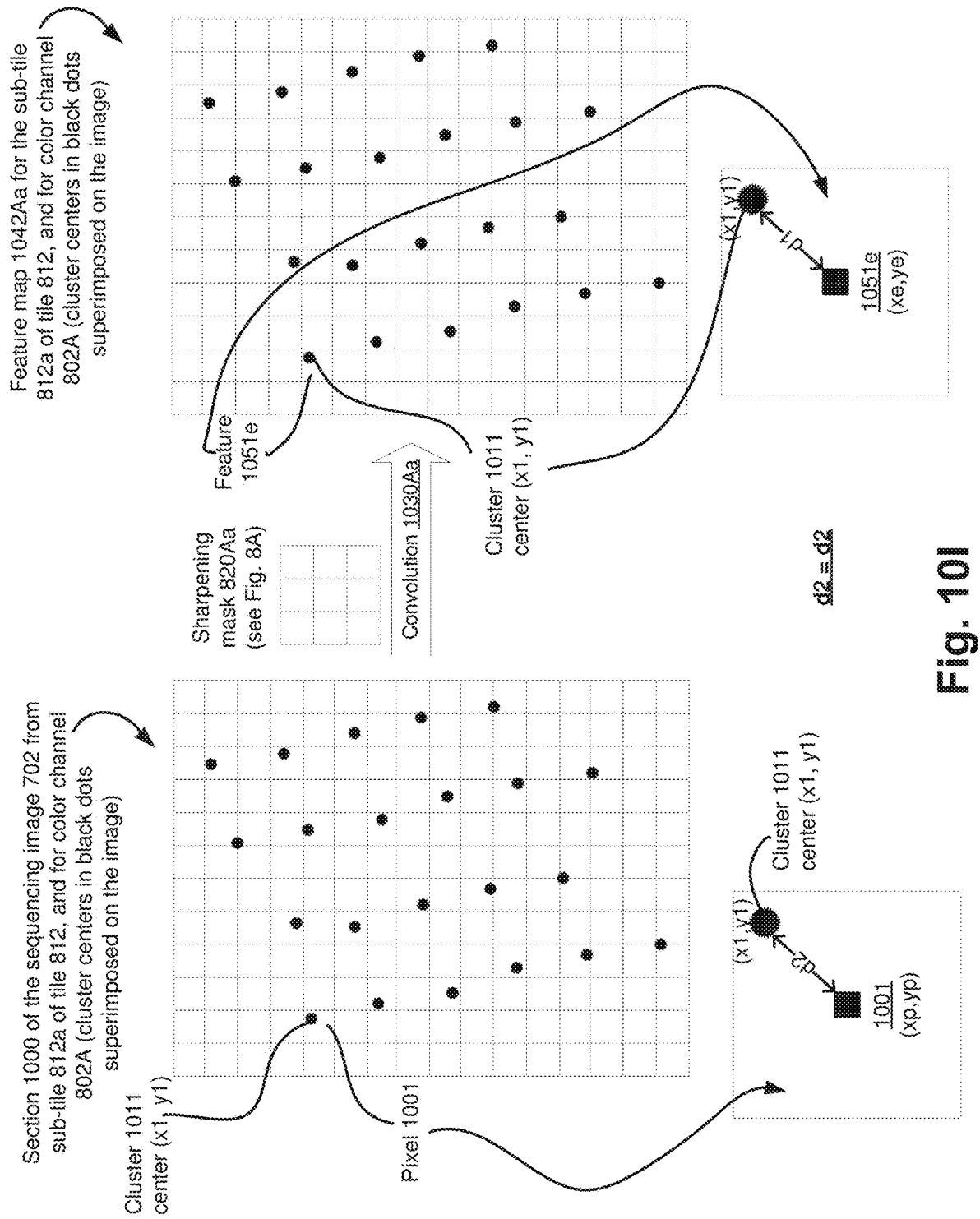

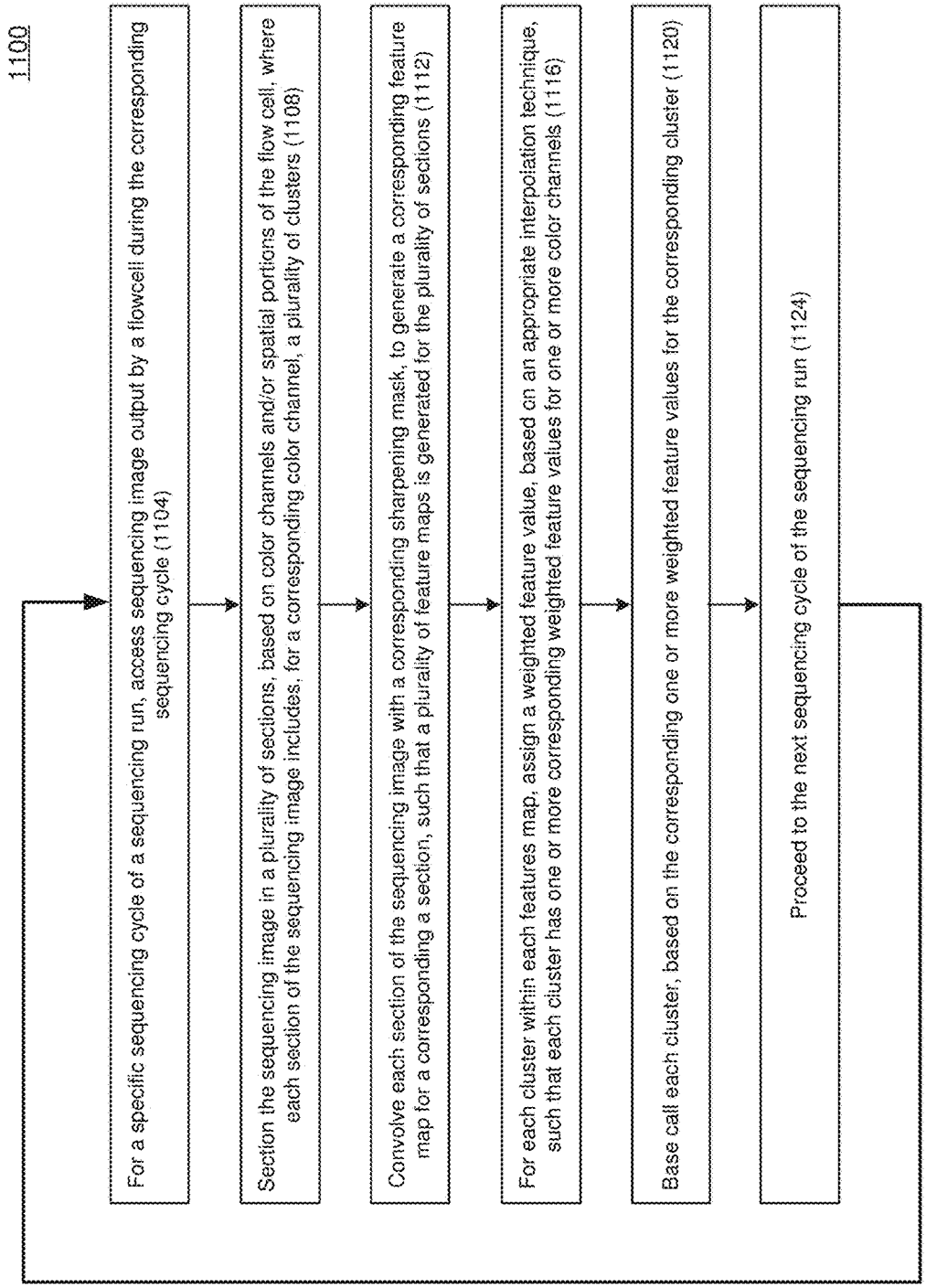

INTENSITY EXTRACTION FOR FEATURE VALUES IN BASE CALLING

PRIORITY APPLICATIONS

This application is a continuation of U.S. Nonprovisional patent application Ser. No. 17/902,630, entitled "INTENSITY EXTRACTION AND SPATIAL CROSSTALK ATTENUATION FOR BASE CALLING." filed on Sep. 2, 2022, which is a continuation of U.S. Nonprovisional patent application Ser. No. 17/511,483, entitled "INTENSITY EXTRACTION AND CROSSTALK ATTENUATION USING INTERPOLATION AND ADAPTATION FOR BASE CALLING." filed on Oct. 26, 2021, which in turn claims the priority to or benefit of U.S. Provisional Patent Application No. 63/223,408, entitled "SPECIALIST SIGNAL PROFILERS FOR BASE CALLING." filed on Jul. 19, 2021. The priority applications are hereby incorporated by reference in their entirety for all purposes as if fully set forth herein.

STATEMENT OF COMMON OWNERSHIP

Pursuant to 35 USC § 102 (b) (2) (C) and MPEP § 2146.02 (I), Applicant hereby states that this application, U.S. Provisional Patent Application No. 63/020,449, and U.S. Nonprovisional patent application Ser. No. 17/308,035, not later than the effective filing date of this application, were owned by or subject to an obligation of assignment to the same person (Illumina, Inc.), and that Illumina Software, Inc., the named applicant and assignee on this application, is a wholly owned subsidiary of Illumina, Inc.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as deep convolutional neural networks for analyzing data.

INCORPORATIONS

The following are incorporated by reference for all purposes as if fully set forth herein:
  U.S. Nonprovisional patent application Ser. No. 15/936, 365, entitled "DETECTION APPARATUS HAVING A MICROFLUOROMETER, A FLUIDIC SYSTEM, AND A FLOW CELL LATCH CLAMP MODULE," filed on Mar. 26, 2018;
  U.S. Nonprovisional patent application Ser. No. 16/567, 224, entitled "FLOW CELLS AND METHODS RELATED TO SAME," filed on Sep. 11, 2019;
  U.S. Nonprovisional patent application Ser. No. 16/439, 635, entitled "DEVICE FOR LUMINESCENT IMAGING," filed on Jun. 12, 2019;
  U.S. Nonprovisional patent application Ser. No. 15/594, 413, entitled "INTEGRATED OPTOELECTRONIC READ HEAD AND FLUIDIC CARTRIDGE USEFUL FOR NUCLEIC ACID SEQUENCING," filed on May 12, 2017;
  U.S. Nonprovisional patent application Ser. No. 16/351, 193, entitled "ILLUMINATION FOR FLUORESCENCE IMAGING USING OBJECTIVE LENS," filed on Mar. 12, 2019;
  U.S. Nonprovisional patent application Ser. No. 12/638, 770, entitled "DYNAMIC AUTOFOCUS METHOD AND SYSTEM FOR ASSAY IMAGER," filed on Dec. 15, 2009;
  U.S. Nonprovisional patent application Ser. No. 13/783, 043, entitled "KINETIC EXCLUSION AMPLIFICATION OF NUCLEIC ACID LIBRARIES." filed on Mar. 1, 2013;
  U.S. Nonprovisional patent application Ser. No. 13/006, 206, entitled "DATA PROCESSING SYSTEM AND METHODS," filed on Jan. 13, 2011;
  U.S. Nonprovisional patent application Ser. No. 14/530, 299, entitled "IMAGE ANALYSIS USEFUL FOR PATTERNED OBJECTS," filed on Oct. 31, 2014;
  U.S. Nonprovisional patent application Ser. No. 15/153, 953, entitled "METHODS AND SYSTEMS FOR ANALYZING IMAGE DATA," filed on Dec. 3, 2014;
  U.S. Nonprovisional patent application Ser. No. 14/020, 570, entitled "CENTROID MARKERS FOR IMAGE ANALYSIS OF HIGH DENSITY CLUSTERS IN COMPLEX POLYNUCLEOTIDE SEQUENCING," filed on Sep. 6, 2013;
  U.S. Nonprovisional patent application Ser. No. 14/530, 299, entitled "IMAGE ANALYSIS USEFUL FOR PATTERNED OBJECTS," filed on Oct. 31, 2014;
  U.S. Nonprovisional patent application Ser. No. 12/565, 341, entitled "METHOD AND SYSTEM FOR DETERMINING THE ACCURACY OF DNA BASE IDENTIFICATIONS," filed on Sep. 23, 2009;
  U.S. Nonprovisional patent application Ser. No. 12/295, 337, entitled "SYSTEMS AND DEVICES FOR SEQUENCE BY SYNTHESIS ANALYSIS," filed on Mar. 30, 2007;
  U.S. Nonprovisional patent application Ser. No. 12/020, 739, entitled "IMAGE DATA EFFICIENT GENETIC SEQUENCING METHOD AND SYSTEM," filed on Jan. 28, 2008;
  U.S. Nonprovisional patent application Ser. No. 13/833, 619, entitled "BIOSENSORS FOR BIOLOGICAL OR CHEMICAL ANALYSIS AND SYSTEMS AND METHODS FOR SAME," filed on Mar. 15, 2013;
  U.S. Nonprovisional patent application Ser. No. 15/175, 489, entitled "BIOSENSORS FOR BIOLOGICAL OR CHEMICAL ANALYSIS AND METHODS OF MANUFACTURING THE SAME," filed on Jun. 7, 2016;
  U.S. Nonprovisional patent application Ser. No. 13/882, 088, entitled "MICRODEVICES AND BIOSENSOR CARTRIDGES FOR BIOLOGICAL OR CHEMICAL ANALYSIS AND SYSTEMS AND METHODS FOR THE SAME," filed on Apr. 26, 2013;
  U.S. Nonprovisional patent application Ser. No. 13/624, 200, entitled "METHODS AND COMPOSITIONS FOR NUCLEIC ACID SEQUENCING," filed on Sep. 21, 2012;
  U.S. Provisional Patent Application No. 62/821,602, entitled "Training Data Generation for Artificial Intelligence-Based Sequencing," filed 21 Mar. 2019;
  U.S. Provisional Patent Application No. 62/821,618, entitled "Artificial Intelligence-Based Generation of Sequencing Metadata," filed 21 Mar. 2019;

U.S. Provisional Patent Application No. 62/821,681, entitled "Artificial Intelligence-Based Base Calling," filed 21 Mar. 2019;

U.S. Provisional Patent Application No. 62/821,724, entitled "Artificial Intelligence-Based Quality Scoring," filed 21 Mar. 2019;

U.S. Provisional Patent Application No. 62/821,766, entitled "Artificial Intelligence-Based Sequencing," filed 21 Mar. 2019;

NL Application No. 2023310, entitled "Training Data Generation for Artificial Intelligence-Based Sequencing," filed 14 Jun. 2019;

NL Application No. 2023311, entitled "Artificial Intelligence-Based Generation of Sequencing Metadata," filed 14 Jun. 2019;

NL Application No. 2023312, entitled "Artificial Intelligence-Based Base Calling," filed 14 Jun. 2019;

NL Application No. 2023314, entitled "Artificial Intelligence-Based Quality Scoring," filed 14 Jun. 2019;

NL Application No. 2023316, entitled "Artificial Intelligence-Based Sequencing," filed 14 Jun. 2019;

U.S. Nonprovisional patent application Ser. No. 16/825,987, entitled "Training Data Generation for Artificial Intelligence-Based Sequencing," filed 20 Mar. 2020;

U.S. Nonprovisional patent application Ser. No. 16/825,991 entitled "Training Data Generation for Artificial Intelligence-Based Sequencing," filed 20 Mar. 2020;

U.S. Nonprovisional patent application Ser. No. 16/826,126, entitled "Artificial Intelligence-Based Base Calling," filed 20 Mar. 2020;

U.S. Nonprovisional patent application Ser. No. 16/826,134, entitled "Artificial Intelligence-Based Quality Scoring," filed 20 Mar. 2020;

U.S. Nonprovisional patent application Ser. No. 16/826,168, entitled "Artificial Intelligence-Based Sequencing," filed 21 Mar. 2020;

U.S. Provisional Patent Application No. 62/849,091, entitled," Systems and Devices for Characterization and Performance Analysis of Pixel-Based Sequencing," filed May 16, 2019;

U.S. Provisional Patent Application No. 62/849,132, entitled, "Base Calling Using Convolutions," filed May 16, 2019;

U.S. Provisional Patent Application No. 62/849,133, entitled, "Base Calling Using Compact Convolutions," filed May 16, 2019;

U.S. Provisional Patent Application No. 62/979,384, entitled, "Artificial Intelligence-Based Base Calling of Index Sequences," filed Feb. 20, 2020;

U.S. Provisional Patent Application No. 62/979,414, entitled, "Artificial Intelligence-Based Many-To-Many Base Calling," filed Feb. 20, 2020;

U.S. Provisional Patent Application No. 62/979,385, entitled, "Knowledge Distillation-Based Compression of Artificial Intelligence-Based Base Caller," filed Feb. 20, 2020;

U.S. Provisional Patent Application No. 62/979,412, entitled, "Multi-Cycle Cluster Based Real Time Analysis System," filed Feb. 20, 2020;

U.S. Provisional Patent Application No. 62/979,411, entitled, "Data Compression for Artificial Intelligence-Based Base Calling," filed Feb. 20, 2020;

U.S. Nonprovisional Patent Application No. 63/020,449, entitled "EQUALIZATION-BASED IMAGE PROCESSING AND SPATIAL CROSSTALK ATTENUATOR." filed May 5, 2020;

U.S. Nonprovisional patent application Ser. No. 17/308,035, entitled "EQUALIZATION-BASED IMAGE PROCESSING AND SPATIAL CROSSTALK ATTENUATOR." filed May 4, 2021; and U.S. Provisional Patent Application No. 62/979,399, entitled, "Squeezing Layer for Artificial Intelligence-Based Base Calling," filed Feb. 20, 2020.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The rapid improvement in computation capability has made deep Convolution Neural Networks (CNNs) a great success in recent years on many computer vision tasks with significantly improved accuracy. During the inference phase, many applications demand low latency processing of one image with strict power consumption requirement, which reduces the efficiency of Graphics Processing Unit (GPU) and other general-purpose platform, bringing opportunities for specific acceleration hardware, e.g., Field Programmable Gate Array (FPGA), by customizing the digital circuit specific for the deep learning algorithm inference. However, deploying CNNs on portable and embedded systems is still challenging due to large data volume, intensive computation, varying algorithm structures, and frequent memory accesses.

As convolution contributes most operations in CNNs, the convolution acceleration scheme significantly affects the efficiency and performance of a hardware CNN accelerator. Convolution involves multiply and accumulate (MAC) operations with four levels of loops that slide along kernel and feature maps. The first loop level computes the MAC of pixels within a kernel window. The second loop level accumulates the sum of products of the MAC across different input feature maps. After finishing the first and second loop levels, a final output element in the output feature map is obtained by adding the bias. The third loop level slides the kernel window within an input feature map. The fourth loop level generates different output feature maps.

FPGAs have gained increasing interest and popularity in particular to accelerate inference tasks, due to their (1) high degree of reconfigurability, (2) faster development time compared to Application Specific Integrated Circuits (ASICs) to catch up with the rapid evolving of CNNs, (3) good performance, and (4) superior energy efficiency compared to GPUs. The high performance and efficiency of an FPGA can be realized by synthesizing a circuit that is customized for a specific computation to directly process billions of operations with the customized memory systems. For instance, hundreds to thousands of digital signal processing (DSP) blocks on modern FPGAs support the core convolution operation, e.g., multiplication and addition, with high parallelism. Dedicated data buffers between external on-chip memory and on-chip processing engines (PEs) can be designed to realize the preferred dataflow by configuring tens of Mbyte on-chip block random access memories (BRAM) on the FPGA chip.

Efficient dataflow and hardware architecture of CNN acceleration are desired to minimize data communication while maximizing resource utilization to achieve high performance. An opportunity arises to design methodology and framework to accelerate the inference process of various CNN algorithms on acceleration hardware with high performance, efficiency, and flexibility. CNN algorithms and other machine learning algorithms can be applied to a variety of application areas, including calling bases (e.g., A, C, T, or G) of unknown nucleotides using a biological sequencing machine.

Various protocols in biological or chemical research involve performing a large number of controlled reactions on local support surfaces or within predefined reaction chambers. The desired reactions may then be observed or detected, and subsequent analysis may help identify or reveal properties of chemicals involved in the reaction. For example, in some multiplex assays, an unknown analyte having an identifiable label (e.g., fluorescent label) may be exposed to thousands of known probes under controlled conditions. Each known probe may be deposited into a corresponding well of a microplate. Observing any chemical reactions that occur between the known probes and the unknown analyte within the wells may help identify or reveal properties of the analyte. Other examples of such protocols include known DNA sequencing processes, such as sequencing-by-synthesis or cyclic-array sequencing. In cyclic-array sequencing, a dense array of DNA features (e.g., template nucleic acids) are sequenced through iterative cycles of enzymatic manipulation. After each cycle, an image may be captured and subsequently analyzed with other images to determine a sequence of the DNA features.

As a more specific example, one known DNA sequencing system uses a pyrosequencing process and includes a chip having a fused fiber-optic faceplate with millions of wells. A single capture bead having clonally amplified sstDNA from a genome of interest is deposited into each well. After the capture beads are deposited into the wells, nucleotides are sequentially added to the wells by flowing a solution containing a specific nucleotide along the faceplate. The environment within the wells is such that if a nucleotide flowing through a particular well complements the DNA strand on the corresponding capture bead, the nucleotide is added to the DNA strand. A colony of DNA strands is called a cluster. Incorporation of the nucleotide into the cluster initiates a process that ultimately generates a chemiluminescent light signal. The system includes a CCD camera that is positioned directly adjacent to the faceplate and is configured to detect the light signals from the DNA clusters in the wells. Subsequent analysis of the images taken throughout the pyrosequencing process can determine a sequence of the genome of interest.

However, the above pyrosequencing system, in addition to other systems, may have certain limitations. For example, the fiber-optic faceplate is acid-etched to make millions of small wells. Although the wells may be approximately spaced apart from each other, it is difficult to know a precise location of a well in relation to other adjacent wells. When the CCD camera is positioned directly adjacent to the faceplate, the wells are not evenly distributed along the pixels of the CCD camera and, as such, the wells are not aligned in a known manner with the pixels. Spatial crosstalk is inter-well crosstalk between the adjacent wells and makes distinguishing true light signals from the well of interest from other unwanted light signals difficult in the subsequent analysis. Also, fluorescent emissions are substantially isotropic. As the density of the analytes increases, it becomes increasingly challenging to manage or account for unwanted light emissions from adjacent analytes (e.g., crosstalk). As a result, data recorded during the sequencing cycles must be carefully analyzed.

Base calling accuracy is crucial for high-throughput DNA sequencing and downstream analysis such as read mapping and genome assembly. Spatial crosstalk between adjacent clusters accounts for a large portion of sequencing errors. Accordingly, an opportunity arises to reduce DNA sequencing errors and improve base calling accuracy by correcting spatial crosstalk in the cluster intensity data.

BRIEF DESCRIPTION OF THE DRAWINGS

The color drawings also may be available in PAIR via the Supplemental Content tab. In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 10A-10K, in combination, illustrate various implementations of using trained sharpening masks, to attenuate spatial crosstalk from sensor pixels and to base call clusters using crosstalk-corrected sensor data.

FIG. 11A illustrates a method of base calling, based on convolution of at least a section of a sequencing image and subsequent interpolation to assign one or more weighted feature values to a cluster, and base calling the cluster based on the assigned one or more weighted feature values.

DETAILED DESCRIPTION

Figure 1:
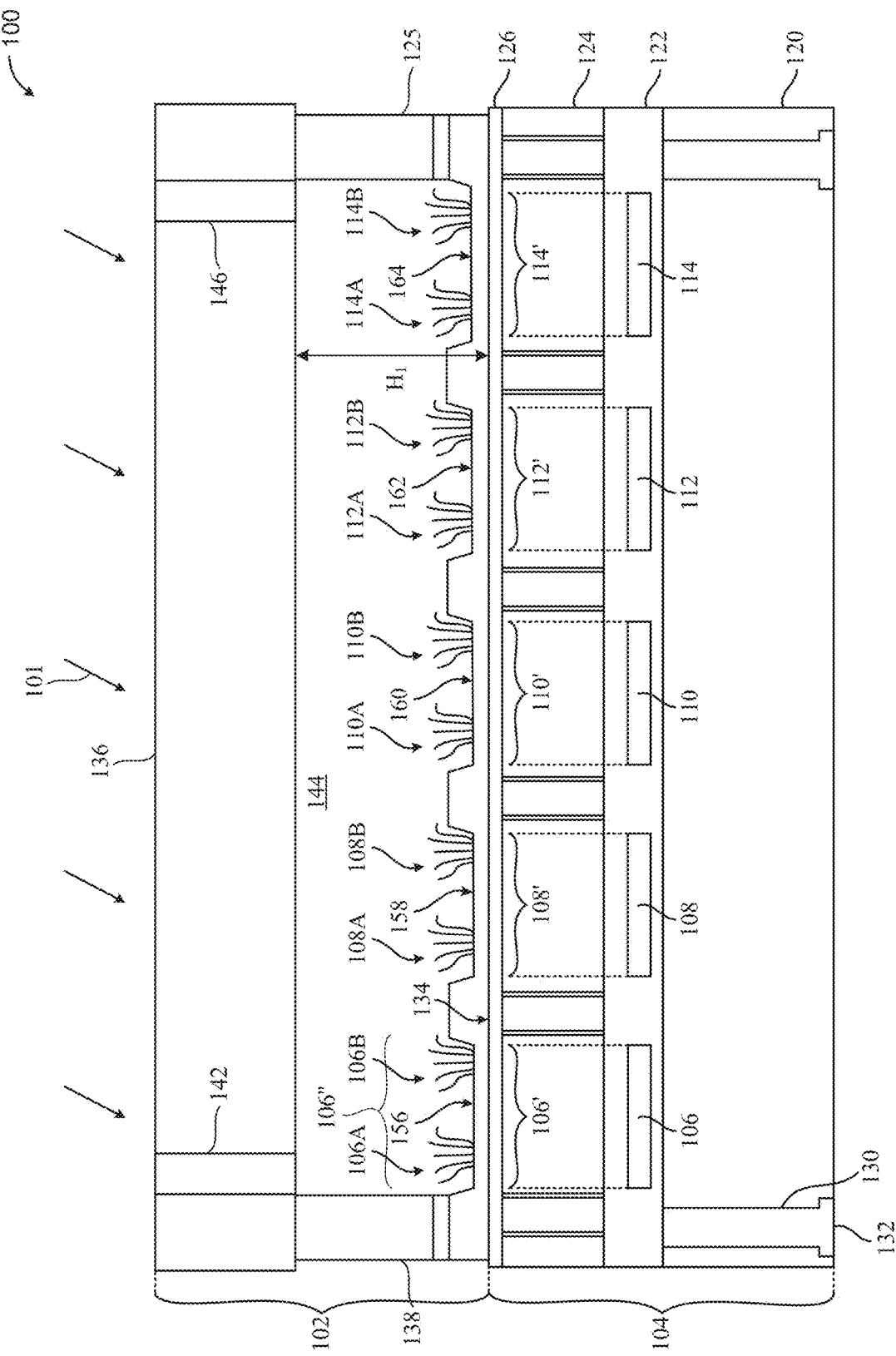
FIG. 1 illustrates a cross-section of a biosensor that can be used in various embodiments.

The following description will typically be with reference to specific structural implementations and methods. It is to be understood that there is no intention to limit the technology to the specifically disclosed implementations and methods but that the technology may be practiced using other features, elements, methods and implementations. Preferred implementations are described to illustrate the present technology, not to limit its scope, which is defined by the claims. Those of ordinary skill in the art will recognize a variety of equivalent variations on the description that follows.

As used herein, the terms "polynucleotide" or "nucleic acids" refer to deoxyribonucleic acid (DNA), but where appropriate the skilled artisan will recognize that the systems and devices herein can also be utilized with ribonucleic acid (RNA). The terms should be understood to include, as equivalents, analogs of either DNA or RNA made from nucleotide analogs. The terms as used herein also encompasses cDNA, that is complementary, or copy, DNA produced from an RNA template, for example by the action of reverse transcriptase.

The single stranded polynucleotide molecules sequenced by the systems and devices herein can have originated in single-stranded form, as DNA or RNA or have originated in double-stranded DNA (dsDNA) form (e.g., genomic DNA fragments, PCR and amplification products and the like). Thus, a single stranded polynucleotide may be the sense or antisense strand of a polynucleotide duplex. Methods of preparation of single stranded polynucleotide molecules suitable for use in the method of the disclosure using standard techniques are well known in the art. The precise sequence of the primary polynucleotide molecules is generally not material to the disclosure, and may be known or unknown. The single stranded polynucleotide molecules can represent genomic DNA molecules (e.g., human genomic DNA) including both intron and exon sequences (coding sequence), as well as non-coding regulatory sequences such as promoter and enhancer sequences.

In certain embodiments, the nucleic acid to be sequenced through use of the current disclosure is immobilized upon a substrate (e.g., a substrate within a flowcell or one or more beads upon a substrate such as a flowcell, etc.). The term "immobilized" as used herein is intended to encompass direct or indirect, covalent or non-covalent attachment, unless indicated otherwise, either explicitly or by context. In certain embodiments covalent attachment may be preferred, but generally all that is required is that the molecules (e.g., nucleic acids) remain immobilized or attached to the support under conditions in which it is intended to use the support, for example in applications requiring nucleic acid sequencing.

The term "solid support" (or "substrate" in certain usages) as used herein refers to any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In many embodiments, the solid support is a glass surface (e.g., the planar surface of a flowcell channel). In certain embodiments the solid support may comprise an inert substrate or matrix which has been "functionalized." for example by the application of a layer or coating of an intermediate material comprising reactive groups which permit covalent attachment to molecules such as polynucleotides. By way of non-limiting example such supports can include polyacrylamide hydrogels supported on an inert substrate such as glass. In such embodiments the molecules (polynucleotides) can be directly covalently attached to the intermediate material (e.g., the hydrogel) but the intermediate material can itself be non-covalently attached to the substrate or matrix (e.g., the glass substrate). Covalent attachment to a solid support is to be interpreted accordingly as encompassing this type of arrangement.

As indicated above, the present disclosure comprises novel systems and devices for sequencing nucleic acids. As will be apparent to those of skill in the art, references herein to a particular nucleic acid sequence may, depending on the context, also refer to nucleic acid molecules which comprise such nucleic acid sequence. Sequencing of a target fragment means that a read of the chronological order of bases is established. The bases that are read do not need to be contiguous, although this is preferred, nor does every base on the entire fragment have to be sequenced during the sequencing. Sequencing can be carried out using any suitable sequencing technique, wherein nucleotides or oligonucleotides are added successively to a free 3' hydroxyl group, resulting in synthesis of a polynucleotide chain in the 5' to 3' direction. The nature of the nucleotide added is preferably determined after each nucleotide addition. Sequencing techniques using sequencing by ligation, wherein not every contiguous base is sequenced, and techniques such as massively parallel signature sequencing (MPSS) where bases are removed from, rather than added to, the strands on the surface are also amenable to use with the systems and devices of the disclosure.

In certain embodiments, the current disclosure discloses sequencing-by-synthesis (SBS). In SBS, four fluorescently labeled modified nucleotides are used to sequence dense clusters of amplified DNA (possibly millions of clusters) present on the surface of a substrate (e.g., a flowcell).

Various additional aspects regarding SBS procedures and methods, which can be utilized with the systems and devices herein, are disclosed in, for example, WO04018497, WO04018493 and U.S. Pat. No. 7,057,026 (nucleotides), WO05024010 and WO06120433 (polymerases), WO05065814 (surface attachment techniques), and WO 9844151, WO06064199 and WO07010251, the contents of each of which are incorporated herein by reference in their entirety.

In particular uses of the systems/devices herein the flowcells containing the nucleic acid samples for sequencing are placed within the appropriate flowcell holder. The samples for sequencing can take the form of single molecules, amplified single molecules in the form of clusters, or beads comprising molecules of nucleic acid. The nucleic acids are prepared such that they comprise an oligonucleotide primer adjacent to an unknown target sequence. To initiate the first SBS sequencing cycle, one or more differently labeled nucleotides, and DNA polymerase, etc., are flowed into/through the flowcell by the fluid flow subsystem (various embodiments of which are described herein). Either a single nucleotide can be added at a time, or the nucleotides used in the sequencing procedure can be specially designed to possess a reversible termination property, thus allowing each cycle of the sequencing reaction to occur simultaneously in the presence of all four labeled nucleotides (A, C, T, G). Where the four nucleotides are mixed together, the polymerase is able to select the correct base to incorporate and each sequence is extended by a single base. In such methods of using the systems, the natural competition between all four alternatives leads to higher accuracy than wherein only one nucleotide is present in the reaction mixture (where most of the sequences are therefore not exposed to the correct nucleotide). Sequences where a particular base is repeated one after another (e.g., homopolymers) are addressed like any other sequence and with high accuracy.

The fluid flow subsystem also flows the appropriate reagents to remove the blocked 3' terminus (if appropriate) and the fluorophore from each incorporated base. The substrate can be exposed either to a second round of the four blocked nucleotides, or optionally to a second round with a different individual nucleotide. Such cycles are then repeated, and the sequence of each cluster is read over the multiple chemistry cycles. The computer aspect of the current disclosure can optionally align the sequence data gathered from each single molecule, cluster or bead to determine the sequence of longer polymers, etc. Alternatively, the image processing and alignment can be performed on a separate computer.

The heating/cooling components of the system regulate the reaction conditions within the flowcell channels and reagent storage areas/containers (and optionally the camera, optics, and/or other components), while the fluid flow components allow the substrate surface to be exposed to suitable reagents for incorporation (e.g., the appropriate fluorescently labeled nucleotides to be incorporated) while unincorporated reagents are rinsed away. An optional movable stage upon which the flowcell is placed allows the flowcell to be brought into proper orientation for laser (or other light) excitation of the substrate and optionally moved in relation to a lens objective to allow reading of different areas of the substrate. Additionally, other components of the system are also optionally movable/adjustable (e.g., the camera, the lens objective, the heater/cooler, etc.). During laser excitation, the image/location of emitted fluorescence from the nucleic acids on the substrate is captured by the camera component, thereby, recording the identity, in the computer component, of the first base for each single molecule, cluster or bead.

Embodiments described herein may be used in various biological or chemical processes and systems for academic or commercial analysis. More specifically, embodiments described herein may be used in various processes and systems where it is desired to detect an event, property, quality, or characteristic that is indicative of a desired reaction. For example, embodiments described herein include cartridges, biosensors, and their components as well as bioassay systems that operate with cartridges and biosensors. In particular embodiments, the cartridges and biosensors include a flow cell and one or more sensors, pixels, light detectors, or photodiodes that are coupled together in a substantially unitary structure.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be standalone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional elements whether or not they have that property.

As used herein, a "desired reaction" includes a change in at least one of a chemical, electrical, physical, or optical property (or quality) of an analyte-of-interest. In particular embodiments, the desired reaction is a positive binding event (e.g., incorporation of a fluorescently labeled biomolecule with the analyte-of-interest). More generally, the desired reaction may be a chemical transformation, chemical change, or chemical interaction. The desired reaction may also be a change in electrical properties. For example, the desired reaction may be a change in ion concentration within a solution. Exemplary reactions include, but are not limited to, chemical reactions such as reduction, oxidation, addition, elimination, rearrangement, esterification, amidation, etherification, cyclization, or substitution; binding interactions in which a first chemical binds to a second chemical; dissociation reactions in which two or more chemicals detach from each other; fluorescence; luminescence; bioluminescence; chemiluminescence; and biological reactions, such as nucleic acid replication, nucleic acid amplification, nucleic acid hybridization, nucleic acid ligation, phosphorylation, enzymatic catalysis, receptor binding, or ligand binding. The desired reaction can also be an addition or elimination of a proton, for example, detectable as a change in pH of a surrounding solution or environment. An additional desired reaction can be detecting the flow of ions across a membrane (e.g., natural or synthetic bilayer membrane), for example as ions flow through a membrane the current is disrupted and the disruption can be detected.

In particular embodiments, the desired reaction includes the incorporation of a fluorescently-labeled molecule to an analyte. The analyte may be an oligonucleotide and the fluorescently-labeled molecule may be a nucleotide. The desired reaction may be detected when an excitation light is directed toward the oligonucleotide having the labeled nucleotide, and the fluorophore emits a detectable fluorescent signal. In alternative embodiments, the detected fluorescence is a result of chemiluminescence or bioluminescence. A desired reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" or "reactant" includes any substance that may be used to obtain a desired reaction. For example, reaction components include reagents, enzymes, samples, other biomolecules, and buffer solutions. The reaction components are typically delivered to a reaction site in a solution and/or immobilized at a reaction site. The reaction components may interact directly or indirectly with another substance, such as the analyte-of-interest.

As used herein, the term "reaction site" is a localized region where a desired reaction may occur. A reaction site may include support surfaces of a substrate where a substance may be immobilized thereon. For example, a reaction site may include a substantially planar surface in a channel of a flow cell that has a colony of nucleic acids thereon. Typically, but not always, the nucleic acids in the colony have the same sequence, being for example, clonal copies of a single stranded or double stranded template. However, in some embodiments a reaction site may contain only a single nucleic acid molecule, for example, in a single stranded or double stranded form. Furthermore, a plurality of reaction sites may be unevenly distributed along the support surface or arranged in a predetermined manner (e.g., side-by-side in a matrix, such as in microarrays). A reaction site can also include a reaction chamber (or well) that at least partially defines a spatial region or volume configured to compartmentalize the desired reaction.

This application uses the terms "reaction chamber" and "well" interchangeably. As used herein, the term "reaction chamber" or "well" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel. Biosensors including such reaction chambers are described in greater detail in international application no. PCT/US2011/057111, filed on Oct. 20, 2011, which is incorporated herein by reference in its entirety.

In some embodiments, the reaction chambers are sized and shaped relative to solids (including semi-solids) so that the solids may be inserted, fully or partially, therein. For example, the reaction chamber may be sized and shaped to accommodate only one capture bead. The capture bead may have clonally amplified DNA or other substances thereon. Alternatively, the reaction chamber may be sized and shaped to receive an approximate number of beads or solid substrates. As another example, the reaction chambers may also be filled with a porous gel or substance that is configured to control diffusion or filter fluids that may flow into the reaction chamber.

In some embodiments, sensors (e.g., light detectors, photodiodes) are associated with corresponding pixel areas of a sample surface of a biosensor. As such, a pixel area is a geometrical construct that represents an area on the biosensor's sample surface for one sensor (or pixel). A sensor that is associated with a pixel area detects light emissions gathered from the associated pixel area when a desired reaction has occurred at a reaction site or a reaction chamber overlying the associated pixel area. In a flat surface embodiment, the pixel areas can overlap. In some cases, a plurality of sensors may be associated with a single reaction site or a single reaction chamber. In other cases, a single sensor may be associated with a group of reaction sites or a group of reaction chambers.

As used herein, a "biosensor" includes a structure having a plurality of reaction sites and/or reaction chambers (or wells). A biosensor may include a solid-state imaging device (e.g., CCD or CMOS imager) and, optionally, a flow cell mounted thereto. The flow cell may include at least one flow channel that is in fluid communication with the reaction sites and/or the reaction chambers. As one specific example, the biosensor is configured to fluidically and electrically couple to a bioassay system. The bioassay system may deliver reactants to the reaction sites and/or the reaction chambers according to a predetermined protocol (e.g., sequencing-by-synthesis) and perform a plurality of imaging events. For example, the bioassay system may direct solutions to flow along the reaction sites and/or the reaction chambers. At least one of the solutions may include four types of nucleotides having the same or different fluorescent labels. The nucleotides may bind to corresponding oligonucleotides located at the reaction sites and/or the reaction chambers. The bioassay system may then illuminate the reaction sites and/or the reaction chambers using an excitation light source (e.g., solid-state light sources, such as light-emitting diodes or LEDs). The excitation light may have a predetermined wavelength or wavelengths, including a range of wavelengths. The excited fluorescent labels provide emission signals that may be captured by the sensors.

In alternative embodiments, the biosensor may include electrodes or other types of sensors configured to detect other identifiable properties. For example, the sensors may be configured to detect a change in ion concentration. In another example, the sensors may be configured to detect the ion current flow across a membrane.

As used herein, a "cluster" is a colony of similar or identical molecules or nucleotide sequences or DNA strands. For example, a cluster can be an amplified oligonucleotide or any other group of a polynucleotide or polypeptide with a same or similar sequence. In other embodiments, a cluster can be any element or group of elements that occupy a physical area on a sample surface. In embodiments, clusters are immobilized to a reaction site and/or a reaction chamber during a base calling cycle.

As used herein, the term "immobilized," when used with respect to a biomolecule or biological or chemical substance, includes substantially attaching the biomolecule or biological or chemical substance at a molecular level to a surface. For example, a biomolecule or biological or chemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface. Immobilizing biomolecules or biological or chemical substances to a surface of a substrate material may be based upon the properties of the substrate surface, the liquid medium carrying the biomolecule or biological or chemical substance, and the properties of the biomolecules or biological or chemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon. A substance can be immobilized to a surface via a gel, for example, as described in US Patent Publ. No. US 2011/0059865 A1, which is incorporated herein by reference.

In some embodiments, nucleic acids can be attached to a surface and amplified using bridge amplification. Useful bridge amplification methods are described, for example, in U.S. Pat. No. 5,641,658; WO 2007/010251; U.S. Pat. No. 6,090,592; U.S. Patent Publ. No. 2002/0055100 A1; U.S. Pat. No. 7,115,400; U.S. Patent Publ. No. 2004/0096853 A1; U.S. Patent Publ. No. 2004/0002090 A1; U.S. Patent Publ. No. 2007/0128624 A1; and U.S. Patent Publ. No. 2008/0009420 A1, each of which is incorporated herein in its entirety. Another useful method for amplifying nucleic acids on a surface is Rolling Circle Amplification (RCA), for example, using methods set forth in further detail below. In some embodiments, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any embodiment, repeated rounds of extension (e.g., amplification) using the immobilized primer and primer in solution provide multiple copies of the nucleic acid.

In particular embodiments, the assay protocols executed by the systems and methods described herein include the use of natural nucleotides and also enzymes that are configured to interact with the natural nucleotides. Natural nucleotides include, for example, ribonucleotides (RNA) or deoxyribonucleotides (DNA). Natural nucleotides can be in the mono-, di-, or tri-phosphate form and can have a base selected from adenine (A), thymine (T), uracil (U), guanine (G) or cytosine (C). It will be understood however that non-natural nucleotides, modified nucleotides or analogs of the aforementioned nucleotides can be used. Some examples of useful non-natural nucleotides are set forth below in regard to reversible terminator-based sequencing by synthesis methods.

In embodiments that include reaction chambers, items or solid substances (including semi-solid substances) may be disposed within the reaction chambers. When disposed, the item or solid may be physically held or immobilized within the reaction chamber through an interference fit, adhesion, or entrapment. Exemplary items or solids that may be disposed within the reaction chambers include polymer beads, pellets, agarose gel, powders, quantum dots, or other solids that may be compressed and/or held within the reaction chamber. In particular embodiments, a nucleic acid superstructure, such as a DNA ball, can be disposed in or at a reaction chamber, for example, by attachment to an interior surface of the reaction chamber or by residence in a liquid within the reaction chamber. A DNA ball or other nucleic acid superstructure can be preformed and then disposed in or at the reaction chamber. Alternatively, a DNA ball can be synthesized in situ at the reaction chamber. A DNA ball can be synthesized by rolling circle amplification to produce a concatemer of a particular nucleic acid sequence and the concatemer can be treated with conditions that form a relatively compact ball. DNA balls and methods for their synthesis are described, for example in, U.S. Patent Publication Nos. 2008/0242560 A1 or 2008/0234136 A1, each of which is incorporated herein in its entirety. A substance that is held or disposed in a reaction chamber can be in a solid, liquid, or gaseous state.

As used herein. "base calling" identifies a nucleotide base in a nucleic acid sequence. Base calling refers to the process of determining a base call (A, C, G, T) for every cluster at a specific cycle. As an example, base calling can be performed utilizing four-channel, two-channel or one-channel methods and systems described in the incorporated materials of U.S. Patent Application Publication No. 2013/0079232. In particular embodiments, a base calling cycle is referred to as a "sampling event." In one dye and two-channel sequencing protocol, a sampling event comprises two illumination stages in time sequence, such that a pixel signal is generated at each stage. The first illumination stage induces illumination from a given cluster indicating nucleotide bases A and T in a AT pixel signal, and the second illumination stage induces illumination from a given cluster indicating nucleotide bases C and T in a CT pixel signal.

The technology disclosed, e.g., the disclosed base callers can be implemented on processors like Central Processing Units (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs).

Biosensor

FIG. 1 illustrates a cross-section of a biosensor 100 that can be used in various embodiments. Biosensor 100 has pixel areas 106', 108', 110', 112', and 114' that can each hold more than one cluster during a base calling cycle (e.g., 2 clusters per pixel area). As shown, the biosensor 100 may include a flow cell 102 that is mounted onto a sampling device 104. In the illustrated embodiment, the flow cell 102 is affixed directly to the sampling device 104. However, in alternative embodiments, the flow cell 102 may be removably coupled to the sampling device 104. The sampling device 104 has a sample surface 134 that may be functionalized (e.g., chemically or physically modified in a suitable manner for conducting the desired reactions). For example, the sample surface 134 may be functionalized and may include a plurality of pixel areas 106', 108', 110', 112', and 114' that can each hold more than one cluster during a base calling cycle (e.g., each having a corresponding cluster pair 106A, 106B; 108A, 108B; 110A, 110B; 112A, 112B; and 114A, 114B immobilized thereto). Each pixel area is associated with a corresponding sensor (or pixel or photodiode)

106, 108, 110, 112, and 114, such that light received by the pixel area is captured by the corresponding sensor. A pixel area 106' can be also associated with a corresponding reaction site 106" on the sample surface 134 that holds a cluster pair, such that light emitted from the reaction site 106" is received by the pixel area 106' and captured by the corresponding sensor 106. As a result of this sensing structure, in the case in which two or more clusters are present in a pixel area of a particular sensor during a base calling cycle (e.g., each having a corresponding cluster pair), the pixel signal in that base calling cycle carries information based on all of the two or more clusters. As a result, signal processing as described herein is used to distinguish each cluster, where there are more clusters than pixel signals in a given sampling event of a particular base calling cycle.

In the illustrated embodiment, the flow cell 102 includes sidewalls 138, 125, and a flow cover 136 that is supported by the sidewalls 138, 125. The sidewalls 138, 125 are coupled to the sample surface 134 and extend between the flow cover 136 and the sidewalls 138, 125. In some embodiments, the sidewalls 138, 125 are formed from a curable adhesive layer that bonds the flow cover 136 to the sampling device 104.

The sidewalls 138, 125 are sized and shaped so that a flow channel 144 exists between the flow cover 136 and the sampling device 104. The flow cover 136 may include a material that is transparent to excitation light 101 propagating from an exterior of the biosensor 100 into the flow channel 144. In an example, the excitation light 101 approaches the flow cover 136 at a non-orthogonal angle.

Also shown, the flow cover 136 may include inlet and outlet ports 142, 146 that are configured to fluidically engage other ports (not shown). For example, the other ports may be from the cartridge or the workstation. The flow channel 144 is sized and shaped to direct a fluid along the sample surface 134. A height H1 and other dimensions of the flow channel 144 may be configured to maintain a substantially even flow of a fluid along the sample surface 134. The dimensions of the flow channel 144 may also be configured to control bubble formation.

By way of example, the flow cover 136 (or the flow cell 102) may comprise a transparent material, such as glass or plastic. The flow cover 136 may constitute a substantially rectangular block having a planar exterior surface and a planar inner surface that defines the flow channel 144. The block may be mounted onto the sidewalls 138, 125. Alternatively, the flow cell 102 may be etched to define the flow cover 136 and the sidewalls 138, 125. For example, a recess may be etched into the transparent material. When the etched material is mounted to the sampling device 104, the recess may become the flow channel 144.

The sampling device 104 may be similar to, for example, an integrated circuit comprising a plurality of stacked substrate layers 120-126. The substrate layers 120-126 may include a base substrate 120, a solid-state imager 122 (e.g., CMOS image sensor), a filter or light-management layer 124, and a passivation layer 126. It should be noted that the above is only illustrative and that other embodiments may include fewer or additional layers. Moreover, each of the substrate layers 120-126 may include a plurality of sublayers. The sampling device 104 may be manufactured using processes that are similar to those used in manufacturing integrated circuits, such as CMOS image sensors and CCDs. For example, the substrate layers 120-126 or portions thereof may be grown, deposited, etched, and the like to form the sampling device 104.

The passivation layer 126 is configured to shield the filter layer 124 from the fluidic environment of the flow channel 144. In some cases, the passivation layer 126 is also configured to provide a solid surface (i.e., the sample surface 134) that permits biomolecules or other analytes-of-interest to be immobilized thereon. For example, each of the reaction sites may include a cluster of biomolecules that are immobilized to the sample surface 134. Thus, the passivation layer 126 may be formed from a material that permits the reaction sites to be immobilized thereto. The passivation layer 126 may also comprise a material that is at least transparent to a desired fluorescent light. By way of example, the passivation layer 126 may include silicon nitride ($Si_3N_4$) and/or silica ($SiO_2$). However, other suitable material(s) may be used. In the illustrated embodiment, the passivation layer 126 may be substantially planar. However, in alternative embodiments, the passivation layer 126 may include recesses, such as pits, wells, grooves, and the like. In the illustrated embodiment, the passivation layer 126 has a thickness that is about 150-200 nm and, more particularly, about 170 nm.

The filter layer 124 may include various features that affect the transmission of light. In some embodiments, the filter layer 124 can perform multiple functions. For instance, the filter layer 124 may be configured to (a) filter unwanted light signals, such as light signals from an excitation light source; (b) direct emission signals from the reaction sites toward corresponding sensors 106, 108, 110, 112, and 114 that are configured to detect the emission signals from the reaction sites; or (c) block or prevent detection of unwanted emission signals from adjacent reaction sites. As such, the filter layer 124 may also be referred to as a light-management layer. In the illustrated embodiment, the filter layer 124 has a thickness that is about 1-5 μm and, more particularly, about 2-4 μm. In alternative embodiments, the filter layer 124 may include an array of microlenses or other optical components. Each of the microlenses may be configured to direct emission signals from an associated reaction site to a sensor.

In some embodiments, the solid-state imager 122 and the base substrate 120 may be provided together as a previously constructed solid-state imaging device (e.g., CMOS chip). For example, the base substrate 120 may be a wafer of silicon and the solid-state imager 122 may be mounted thereon. The solid-state imager 122 includes a layer of semiconductor material (e.g., silicon) and the sensors 106, 108, 110, 112, and 114. In the illustrated embodiment, the sensors are photodiodes configured to detect light. In other embodiments, the sensors comprise light detectors. The solid-state imager 122 may be manufactured as a single chip through a CMOS-based fabrication processes.

The solid-state imager 122 may include a dense array of sensors 106, 108, 110, 112, and 114 that are configured to detect activity indicative of a desired reaction from within or along the flow channel 144. In some embodiments, each sensor has a pixel area (or detection area) that is about 1-2 square micrometer ($\mu m^2$). The array can include 500,000 sensors, 5 million sensors, 10 million sensors, or even 120 million sensors. The sensors 106, 108, 110, 112, and 114 can be configured to detect a predetermined wavelength of light that is indicative of the desired reactions.

In some embodiments, the sampling device 104 includes a microcircuit arrangement, such as the microcircuit arrangement described in U.S. Pat. No. 7,595,882, which is incorporated herein by reference in the entirety. More specifically, the sampling device 104 may comprise an integrated circuit having a planar array of the sensors 106, 108, 110, 112, and 114. Circuitry formed within the sampling device 104 may be configured for at least one of signal amplification, digitization, storage, and processing. The circuitry may collect and analyze the detected fluorescent light and generate pixel signals (or detection signals) for communicating detection data to a signal processor. The circuitry may also perform additional analog and/or digital signal processing in the sampling device 104. Sampling device 104 may include conductive vias 130 that perform signal routing (e.g., transmit the pixel signals to the signal processor). The pixel signals may also be transmitted through electrical contacts 132 of the sampling device 104.

The sampling device 104 is discussed in further details with respect to U.S. Nonprovisional patent application Ser. No. 16/874,599, titled "Systems and Devices for Characterization and Performance Analysis of Pixel-Based Sequencing." filed May 14, 2020, which is incorporated by reference as if fully set forth herein. The sampling device 104 is not limited to the above constructions or uses as described above. In alternative embodiments, the sampling device 104 may take other forms. For example, the sampling device 104 may comprise a CCD device, such as a CCD camera, that is coupled to a flow cell or is moved to interface with a flow cell having reaction sites therein.

Figure 2:
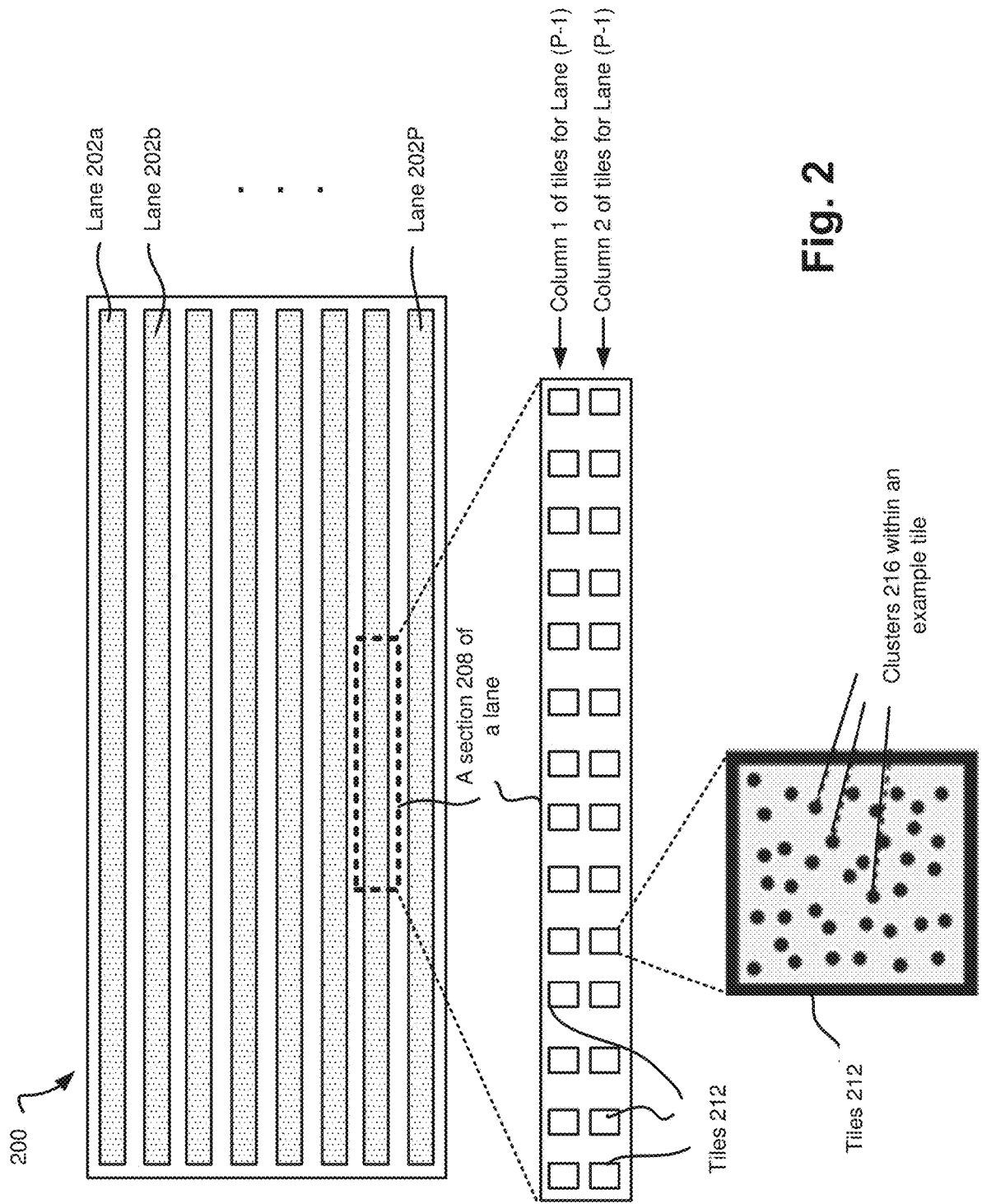
FIG. 2 depicts one implementation of a flow cell that contains clusters in its tiles.

FIG. 2 depicts one implementation of a flow cell 200 that contains clusters in its tiles. The flow cell 200 corresponds to the flow cell 102 of FIG. 1, e.g., without the flow cover 136. Furthermore, the depiction of the flow cell 200 is symbolic in nature, and the flow cell 200 symbolically depicts various lanes and tiles therewithin, without illustrating various other components therewithin. FIG. 2 illustrates a top view of the flow cell 200.

In an embodiment, the flow cell 200 is divided or partitioned in a plurality of lanes, such as lanes 202a, 202b . . . 202P. i.e., P number of lanes. In the example of FIG. 2, the flow cell 200 is illustrated to include 8 lanes, i.e., P=8 in this example, although the number of lanes within a flow cell is implementation specific.

In an embodiment, individual lanes 202 are further partitioned into non-overlapping regions called "tiles" 212. For example. FIG. 2 illustrates a magnified view of a section 208 of an example lane. The section 208 is illustrated to comprise a plurality of tiles 212.

In an example, each lane 202 comprises one or more columns of tiles. For example, in FIG. 2, each lane 202 comprises two corresponding columns of tiles 212, as illustrated within the magnified section 208. A number of tiles within each column of tiles within each lane is implementation specific, and in one example, there can be 50 tiles, 60 tiles, 100 tiles, or another appropriate number of tiles in each column of tiles within each lane.

Each tile comprises a corresponding plurality of clusters. During the sequencing procedure, the clusters and their surrounding background on the tiles are imaged. For example, FIG. 2 illustrates example clusters 216 within an example tile.

Figure 3:
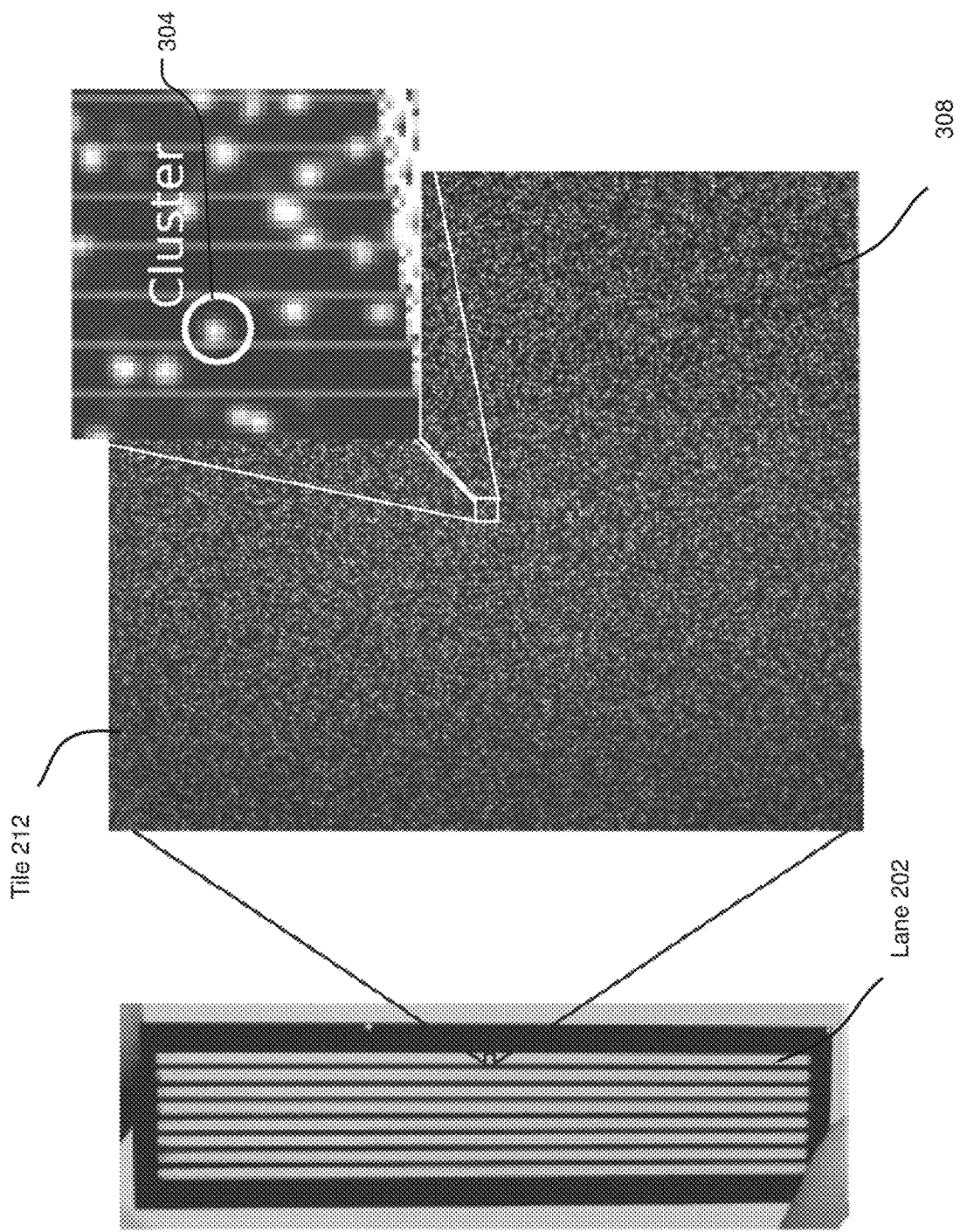
FIG. 3 illustrates an example flow cell with eight lanes, and also illustrates a zoom-in on one tile and its clusters and their surrounding background.

FIG. 3 illustrates an example Illumina GA-IIx™ flow cell with eight lanes, and also illustrates a zoom-in on one tile and its clusters and their surrounding background. For example, there are a hundred tiles per lane in Illumina Genome Analyzer II and sixty-eight tiles per lane in Illumina HiSeq2000. A tile 212 holds hundreds of thousands to millions of clusters. In FIG. 3, an image generated from a tile with clusters shown as bright spots is shown at 308 (e.g., 308 is a magnified image view of a tile), with an example cluster 304 labelled. A cluster 304 comprises approximately one thousand identical copies of a template molecule, though clusters vary in size and shape. The clusters are grown from the template molecule, prior to the sequencing run, by bridge amplification of the input library. The purpose of the amplification and cluster growth is to increase the intensity of the emitted signal since the imaging device cannot reliably sense a single fluorophore. However, the physical distance of the DNA fragments within a cluster 304 is small, so the imaging device perceives the cluster of fragments as a single spot 304.

The clusters and the tiles are discussed in further details with respect to U.S. Nonprovisional patent application Ser. No. 16/825,987, titled "TRAINING DATA GENERATION FOR ARTIFICIAL INTELLIGENCE-BASED SEQUENCING." filed 20 Mar. 2020.

Figure 4:
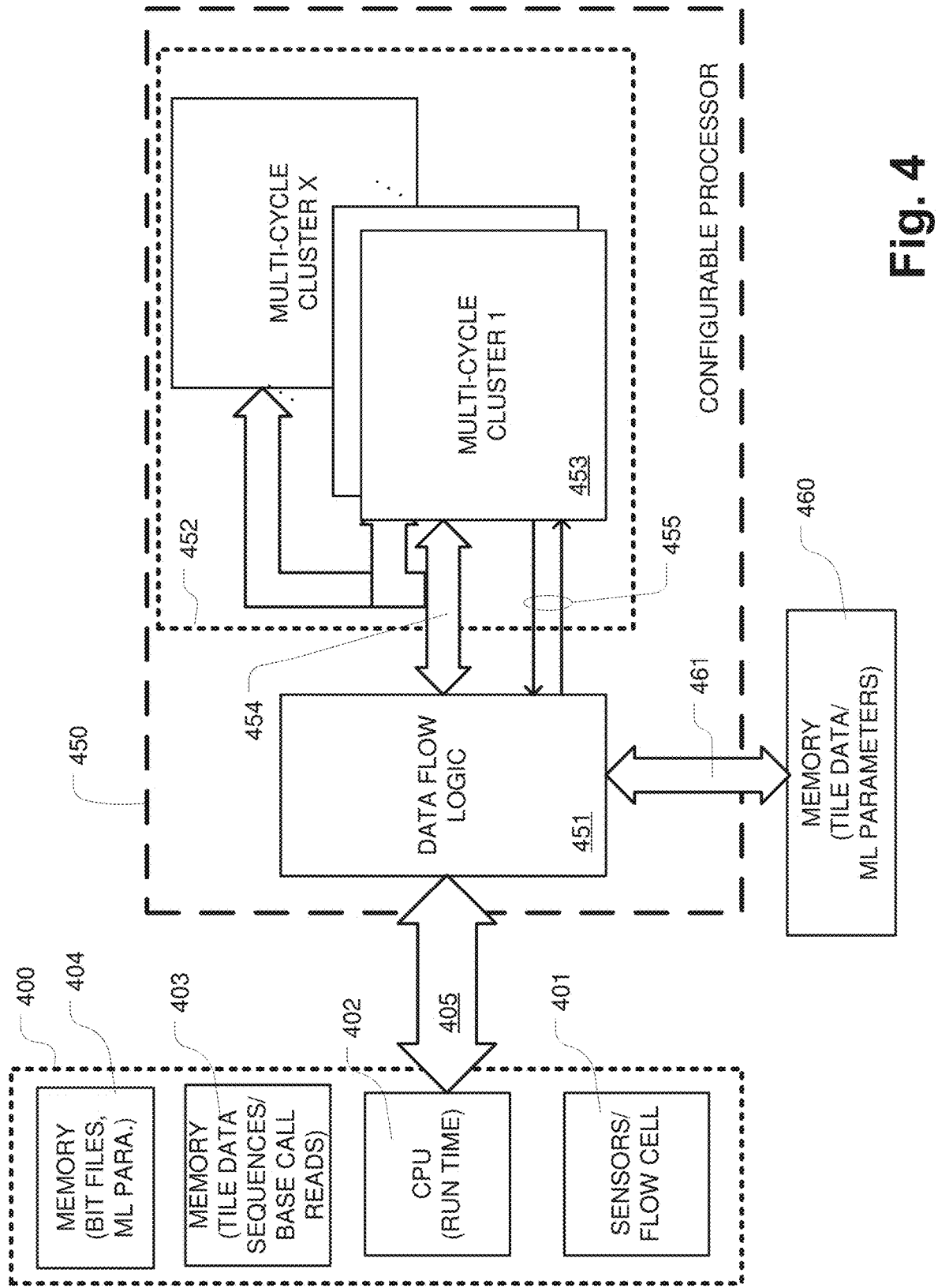
FIG. 4 is a simplified block diagram of the system for analysis of sensor data from a sequencing system, such as base call sensor outputs.

FIG. 4 is a simplified block diagram of the system for analysis of sensor data from a sequencing system, such as base call sensor outputs (e.g., see FIG. 1). In the example of FIG. 4, the system includes a sequencing machine 400 and a configurable processor 450. The configurable processor 450 can execute a neural network-based base caller and/or a non-neural network-based base caller (which will be discussed herein in further detail) in coordination with a runtime program executed by a host processor, such as a central processing unit (CPU) 402. The sequencing machine 400 comprises base call sensors and flow cell 401 (e.g., discussed with respect to FIGS. 1-3). The flow cell can comprise one or more tiles in which clusters of genetic material are exposed to a sequence of analyte flows used to cause reactions in the clusters to identify the bases in the genetic material, as discussed with respect to FIGS. 1-3. The sensors sense the reactions for each cycle of the sequence in each tile of the flow cell to provide tile data. Examples of this technology are described in more detail below. Genetic sequencing is a data intensive operation, which translates base call sensor data into sequences of base calls for each cluster of genetic material sensed in during a base call operation.

The system in this example includes the CPU 402 which executes a runtime program to coordinate the base call operations, memory 403 to store sequences of arrays of tile data, base call reads produced by the base calling operation, and other information used in the base call operations. Also, in this illustration the system includes memory 404 to store a configuration file (or files), such as FPGA bit files, and model parameters for the neural network used to configure and reconfigure the configurable processor 450 and execute the neural network. The sequencing machine 400 can include a program for configuring a configurable processor and in some embodiments a reconfigurable processor to execute the neural network.

The sequencing machine 400 is coupled by a bus 405 to the configurable processor 450. The bus 405 can be implemented using a high throughput technology, such as in one example bus technology compatible with the PCIe standards (Peripheral Component Interconnect Express) currently maintained and developed by the PCI-SIG (PCI Special Interest Group). Also, in this example, a memory 460 is coupled to the configurable processor 450 by bus 461. The memory 460 can be on-board memory, disposed on a circuit board with the configurable processor 450. The memory 460 is used for high-speed access by the configurable processor 450 of working data used in the base call operation. The bus 461 can also be implemented using a high throughput technology, such as bus technology compatible with the PCIe standards. The memory 460 can store genomics data, for example, variant call format (VCF) files.

Configurable processors, including Field Programmable Gate Arrays (FPGAs), Coarse Grained Reconfigurable Arrays (CGRAs), and other configurable and reconfigurable devices, can be configured to implement a variety of functions more efficiently or faster than might be achieved using a general-purpose processor executing a computer program. Configuration of configurable processors involves compiling a functional description to produce a configuration file, referred to sometimes as a bitstream or bit file, and distributing the configuration file to the configurable elements on the processor.

The configuration file defines the logic functions to be executed by the configurable processor, by configuring the circuit to set data flow patterns, use of distributed memory and other on-chip memory resources, lookup table contents, operations of configurable logic blocks and configurable execution units like multiply-and-accumulate units, configurable interconnects and other elements of the configurable array. A configurable processor is reconfigurable if the configuration file may be changed in the field, by changing the loaded configuration file. For example, the configuration file may be stored in volatile SRAM elements, in non-volatile read-write memory elements, and in combinations of the same, distributed among the array of configurable elements on the configurable or reconfigurable processor. A variety of commercially available configurable processors are suitable for use in a base calling operation as described herein. In some examples, a host CPU can be implemented on the same integrated circuit as the configurable processor.

Embodiments described herein implement the multi-cycle neural network using a configurable processor 450. The configuration file for a configurable processor can be implemented by specifying the logic functions to be executed using a high-level description language (HDL) or a register transfer level (RTL) language specification. The specification can be compiled using the resources designed for the selected configurable processor to generate the configuration file. The same or similar specification can be compiled for the purposes of generating a design for an application-specific integrated circuit which may not be a configurable processor.

Alternatives for the configurable processor, in all embodiments described herein, therefore include a configured processor comprising an application specific ASIC or special purpose integrated circuit or set of integrated circuits, or a system-on-a-chip SOC device, configured to execute a neural network based base call operation as described herein.

In general, configurable processors and configured processors described herein, as configured to execute runs of a neural network, are referred to herein as neural network processors. In another example, configurable processors and configured processors described herein, as configured to execute runs of a non-neural network based base caller, are referred to herein as non-neural network processors. In general, the configurable processors and configured processors can be used to implement one or both a neural network based base caller and a non-neural network based base caller, as will be discussed herein later.

The configurable processor 450 is configured in this example by a configuration file loaded using a program executed by the CPU 402, or by other sources, which configures the array of configurable elements on the configurable processor 454 to execute the base call function. In this example, the configuration includes data flow logic 451 which is coupled to the buses 405 and 461 and executes functions for distributing data and control parameters among the elements used in the base call operation.

Also, the configurable processor 450 is configured with base call execution logic 452 to execute a multi-cycle neural network. The logic 452 comprises a plurality of multi-cycle execution clusters (e.g., 453) which, in this example, includes multi-cycle cluster 1 through multi-cycle cluster X. The number of multi-cycle clusters can be selected according to a trade-off involving the desired throughput of the operation, and the available resources on the configurable processor.

The multi-cycle clusters are coupled to the data flow logic 451 by data flow paths 454 implemented using configurable interconnect and memory resources on the configurable processor. Also, the multi-cycle clusters are coupled to the data flow logic 451 by control paths 455 implemented using configurable interconnect and memory resources for example on the configurable processor, which provide control signals indicating available clusters, readiness to provide input units for execution of a run of the neural network to the available clusters, readiness to provide trained parameters for the neural network, readiness to provide output patches of base call classification data, and other control data used for execution of the neural network.

The configurable processor is configured to execute runs of a multi-cycle neural network using trained parameters to produce classification data for sensing cycles of the base flow operation. A run of the neural network is executed to produce classification data for a subject sensing cycle of the base call operation. A run of the neural network operates on a sequence including a number N of arrays of tile data from respective sensing cycles of N sensing cycles, where the N sensing cycles provide sensor data for different base call operations for one base position per operation in time sequence in the examples described herein. Optionally, some of the N sensing cycles can be out of sequence if the needed according to a particular neural network model being executed. The number N can be any number greater than one. In some examples described herein, sensing cycles of the N sensing cycles represent a set of sensing cycles for at least one sensing cycle preceding the subject sensing cycle and at least one sensing cycle following the subject cycle in time sequence. Examples are described herein in which the number N is an integer equal to or greater than five.

The data flow logic 451 is configured to move tile data and at least some trained parameters of the model from the memory 460 to the configurable processor for runs of the neural network, using input units for a given run including tile data for spatially aligned patches of the N arrays. The input units can be moved by direct memory access operations in one DMA operation, or in smaller units moved during available time slots in coordination with the execution of the neural network deployed.

Tile data for a sensing cycle as described herein can comprise an array of sensor data having one or more features. For example, the sensor data can comprise two images which are analyzed to identify one of four bases at a base position in a genetic sequence of DNA, RNA, or other genetic material. The tile data can also include metadata about the images and the sensors. For example, in embodiments of the base calling operation, the tile data can comprise information about alignment of the images with the clusters such as distance from center information indicating the distance of each pixel in the array of sensor data from the center of a cluster of genetic material on the tile.

During execution of the multi-cycle neural network as described below, tile data can also include data produced during execution of the multi-cycle neural network, referred to as intermediate data, which can be reused rather than recomputed during a run of the multi-cycle neural network. For example, during execution of the multi-cycle neural network, the data flow logic can write intermediate data to the memory 460 in place of the sensor data for a given patch of an array of tile data. Embodiments like this are described in more detail below.

As illustrated, a system is described for analysis of base call sensor output, comprising memory (e.g., 460) accessible by the runtime program storing tile data including sensor data for a tile from sensing cycles of a base calling operation. Also, the system includes a neural network processor, such as configurable processor 450 having access to the memory. The neural network processor is configured to execute runs of a neural network using trained parameters to produce classification data for sensing cycles. As described herein, a run of the neural network is operating on a sequence of N arrays of tile data from respective sensing cycles of N sensing cycles, including a subject cycle, to produce the classification data for the subject cycle. The data flow logic 451 is provided to move tile data and the trained parameters from the memory to the neural network processor for runs of the neural network using input units including data for spatially aligned patches of the N arrays from respective sensing cycles of N sensing cycles.

Also, a system is described in which the neural network processor has access to the memory, and includes a plurality of execution clusters, the execution logic clusters in the plurality of execution clusters configured to execute a neural network. The data flow logic has access to the memory and to execution clusters in the plurality of execution clusters, to provide input units of tile data to available execution clusters in the plurality of execution clusters, the input units including a number N of spatially aligned patches of arrays of tile data from respective sensing cycles, including a subject sensing cycle, and to cause the execution clusters to apply the N spatially aligned patches to the neural network to produce output patches of classification data for the spatially aligned patch of the subject sensing cycle, where N is greater than 1.

Figure 5:
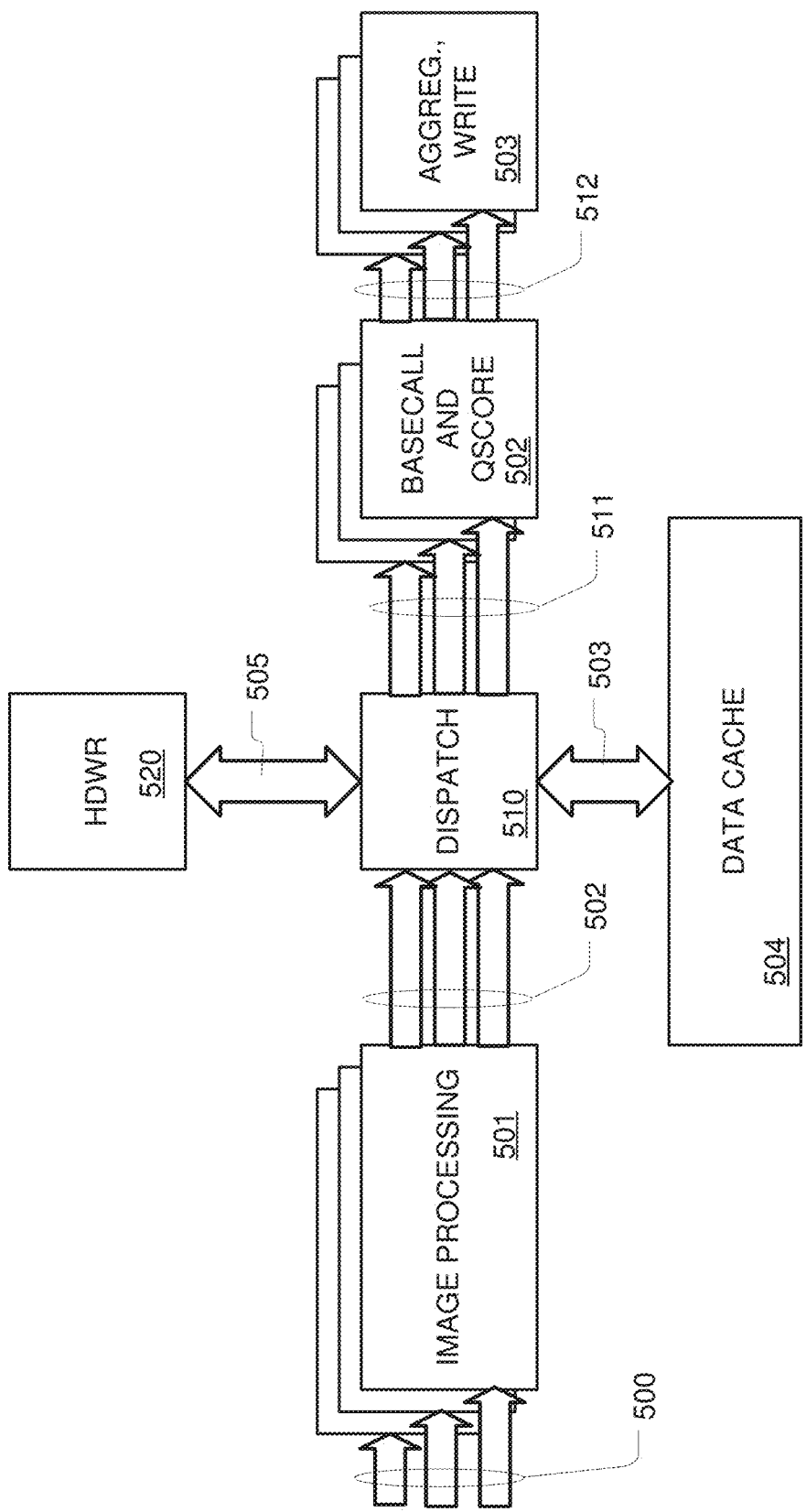
FIG. 5 is a simplified diagram showing aspects of the base calling operation, including functions of a runtime program executed by a host processor.

FIG. 5 is a simplified diagram showing aspects of the base calling operation, including functions of a runtime program executed by a host processor. In this diagram, the output of image sensors from a flow cell (such as those illustrated in FIGS. 1-2) are provided on lines 500 to image processing threads 501, which can perform processes on images such as resampling, alignment and arrangement in an array of sensor data for the individual tiles, and can be used by processes which calculate a tile cluster mask for each tile in the flow cell, which identifies pixels in the array of sensor data that correspond to clusters of genetic material on the corresponding tile of the flow cell. To compute a cluster mask, one example algorithm is based on a process to detect clusters which are unreliable in the early sequencing cycles using a metric derived from the softmax output, and then the data from those wells/clusters is discarded, and no output data is produced for those clusters. For example, a process can identify clusters with high reliability during the first N1 (e.g., 25) base-calls, and reject the others. Rejected clusters might be polyclonal or very weak intensity or obscured by fiducials. This procedure can be performed on the host CPU. In alternative implementations, this information would potentially be used to identify the necessary clusters of interest to be passed back to the CPU, thereby limiting the storage required for intermediate data.

The outputs of the image processing threads 501 are provided on lines 502 to a dispatch logic 510 in the CPU which routes the arrays of tile data to a data cache 504 on a high-speed bus 503, or on high-speed bus 505 to hardware 520, such as the configurable processor of FIG. 4, according to the state of the base calling operation. The hardware 520 can be multi-cluster neural network processor to execute a neural network based base caller, or can be hardware to execute a non-neural based base caller, as will be discussed herein later.

The hardware 520 returns classification data (e.g., output by the neural network base caller and/or the non-neural network base caller) to the dispatch logic 510, which passes the information to the data cache 504, or on lines 511 to threads 502 that perform base call and quality score computations using the classification data, and can arrange the data in standard formats for base call reads. The outputs of the threads 502 that perform base calling and quality score computations are provided on lines 512 to threads 503 that aggregate the base call reads, perform other operations such as data compression, and write the resulting base call outputs to specified destinations for utilization by the customers.

In some embodiments, the host can include threads (not shown) that perform final processing of the output of the hardware 520 in support of the neural network. For example, the hardware 520 can provide outputs of classification data from a final layer of the multi-cluster neural network. The host processor can execute an output activation function, such as a softmax function, over the classification data to configure the data for use by the base call and quality score threads 502. Also, the host processor can execute input operations (not shown), such as resampling, batch normalization or other adjustments of the tile data prior to input to the hardware 520.

Figure 6:
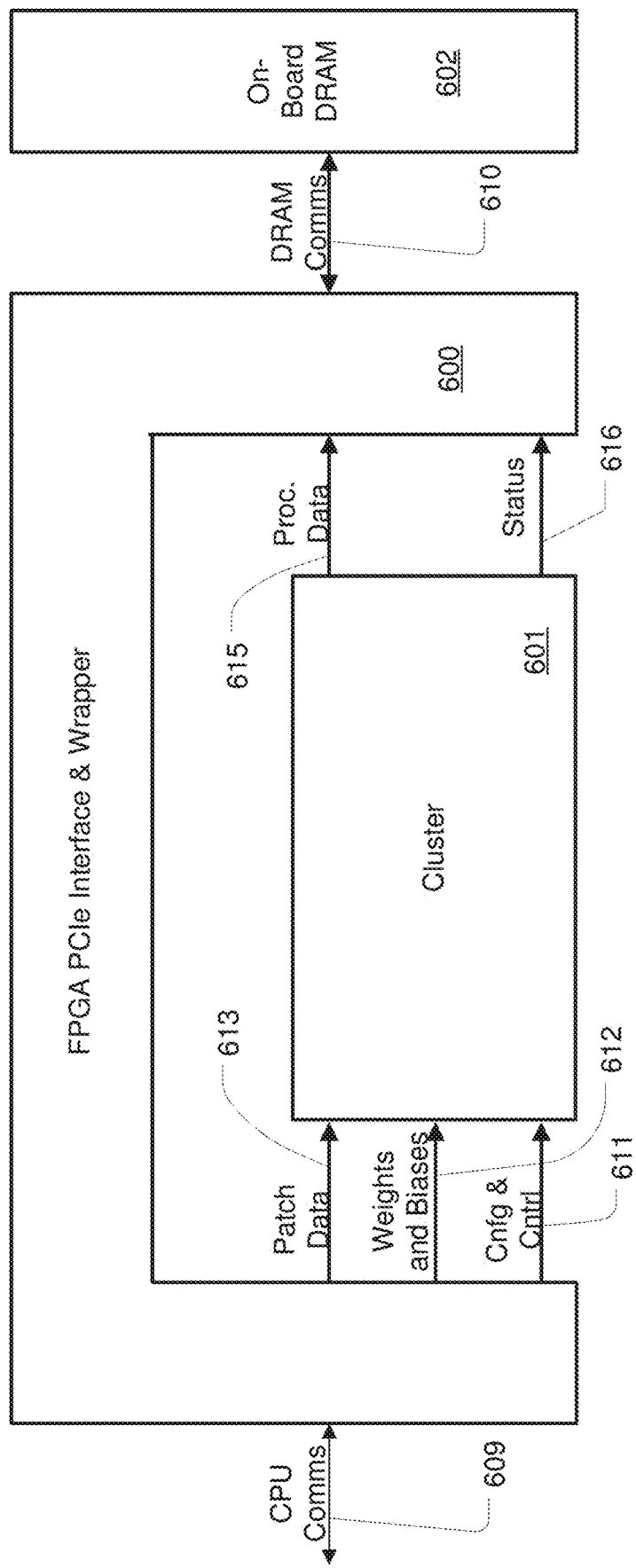
FIG. 6 is a simplified diagram of a configuration of a configurable processor such as that of FIG. 4.

FIG. 6 is a simplified diagram of a configuration of a configurable processor such as that of FIG. 4. In FIG. 6, the configurable processor comprises in FPGA with a plurality of high speed PCIe interfaces. The FPGA is configured with a wrapper 600 which comprises the data flow logic described with reference to FIG. 1. The wrapper 600 manages the interface and coordination with a runtime program in the CPU across the CPU communication link 609 and manages communication with the on-board DRAM 602 (e.g., memory 460) via DRAM communication link 610. The data flow logic in the wrapper 600 provides patch data retrieved by traversing the arrays of tile data on the on-board DRAM 602 for the number N cycles to a cluster 601 and retrieves process data 615 from the cluster 601 for delivery back to the on-board DRAM 602. The wrapper 600 also manages transfer of data between the on-board DRAM 602 and host memory, for both the input arrays of tile data, and for the output patches of classification data. The wrapper transfers patch data on line 613 to the allocated cluster 601. The wrapper provides trained parameters, such as weights and biases on line 612 to the cluster 601 retrieved from the on-board DRAM 602. The wrapper provides configuration and control data on line 611 to the cluster 601 provided from, or generated in response to, the runtime program on the host via the CPU communication link 609. The cluster can also provide status signals on line 616 to the wrapper 600, which are used in cooperation with control signals from the host to manage traversal of the arrays of tile data to provide spatially aligned patch data, and to execute the multi-cycle neural network for base calling and/or operations for non-neural network based base calling, over the patch data using the resources of the cluster 601.

As mentioned above, there can be multiple clusters on a single configurable processor managed by the wrapper 600 configured for executing on corresponding ones of multiple patches of the tile data. Each cluster can be configured to provide classification data for base calls in a subject sensing cycle using the tile data of multiple sensing cycles described herein.

In examples of the system, model data, including kernel data like filter weights and biases can be sent from the host CPU to the configurable processor, so that the model can be updated as a function of cycle number. A base calling operation can comprise, for a representative example, on the order of hundreds of sensing cycles. Base calling operation can include paired end reads in some embodiments. For example, the model trained parameters may be updated once every 20 cycles (or other number of cycles), or according to update patterns implemented for particular systems. In some embodiments including paired end reads in which a sequence for a given string in a genetic cluster on a tile includes a first part extending from a first end down (or up) the string, and a second part extending from a second end up (or down) the string, the trained parameters can be updated on the transition from the first part to the second part.

In some examples, image data for multiple cycles of sensing data for a tile can be sent from the CPU to the wrapper 600. The wrapper 600 can optionally do some pre-processing and transformation of the sensing data and write the information to the on-board DRAM 602. The input tile data for each sensing cycle can include arrays of sensor data including on the order of 4000×3000 pixels per sensing cycle per tile or more, with two features representing colors of two images of the tile, and one or two bytes per feature per pixel. For an embodiment in which the number N is three sensing cycles to be used in each run of the multi-cycle neural network, the array of tile data for each run of the multi-cycle neural network can consume on the order of hundreds of megabytes per tile. In some embodiments of the system, the tile data also includes an array of DFC data, stored once per tile, or other type of metadata about the sensor data and the tiles.

In operation, when a multi-cycle cluster is available, the wrapper allocates a patch to the cluster. The wrapper fetches a next patch of tile data in the traversal of the tile and sends it to the allocated cluster along with appropriate control and configuration information. The cluster can be configured with enough memory on the configurable processor to hold a patch of data including patches from multiple cycles in some systems, that is being worked on in place, and a patch of data that is to be worked on when the current patch of processing is finished using a ping-pong buffer technique or raster scanning technique in various embodiments.

When an allocated cluster completes its run of the neural network for the current patch and produces an output patch, it will signal the wrapper. The wrapper will read the output patch from the allocated cluster, or alternatively the allocated cluster will push the data out to the wrapper. Then the wrapper will assemble output patches for the processed tile in the DRAM 602. When the processing of the entire tile has been completed, and the output patches of data transferred to the DRAM, the wrapper sends the processed output array for the tile back to the host/CPU in a specified format. In some embodiments, the on-board DRAM 602 is managed by memory management logic in the wrapper 600. The runtime program can control the sequencing operations to complete analysis of all the arrays of tile data for all the cycles in the run in a continuous flow to provide real time analysis.

Sharpening Mask Generation

Figure 7:
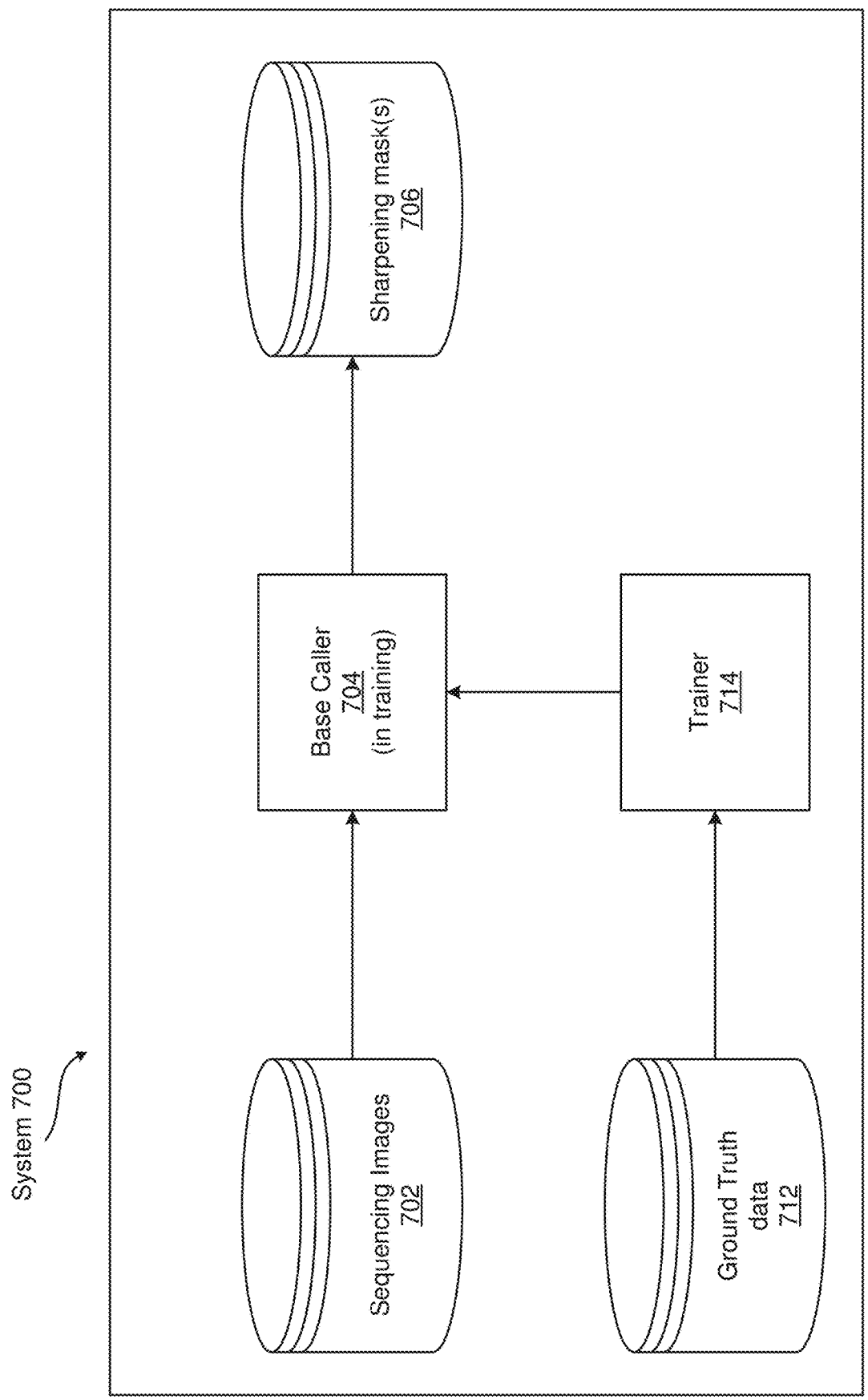
FIG. 7 shows a system that generates and/or updates sharpening mask(s).

FIG. 7 shows a system 700 that generates and/or updates sharpening mask(s) 706, by training a base caller 704. System 700 comprises a trainer 714 that trains the base caller 704 using least square estimation, for example. As used herein, a "sharpening mask" maximizes the signal-to-noise ratio of a signal that is disturbed by noise. A sharpening mask can be a value or function that is applied to data to modify the data in a desired way. For example, the data can be modified to increase its accuracy, relevance, or applicability with regard to a particular situation. The sharpening mask can be applied to the data by any of a variety of mathematical manipulations including, but not limited to addition, subtraction, division, multiplication, or a combination thereof. The sharpening mask can be a mathematical formula, logic function, computer implemented algorithm, or the like. The data can be image data, electrical data, or a combination thereof. In one implementation, the sharpening mask is an equalizer (e.g., a spatial equalizer). The equalizer can be trained (e.g., using least square estimation, adaptive equalization algorithm) to improve and/or maximize the signal-to-noise ratio of cluster intensity data in sequencing images. In some implementations, the equalizer includes coefficients that are learned from the training. In one implementation of a convolution operation, the training produces equalizer coefficients that are configured to mix/combine intensity values of pixels that depict intensity emissions from a target cluster being base called and intensity emissions from one or more adjacent clusters in a manner that maximizes the signal-to-noise ratio. The signal maximized in the signal-to-noise ratio is the intensity emissions from the target cluster, and the noise minimized in the signal-to-noise ratio is the intensity emissions from the adjacent clusters, i.e., spatial crosstalk, plus some random noise (e.g., to account for background intensity emissions). The equalizer coefficients are used as weights and the mixing/combining includes executing element-wise multiplication between the equalizer coefficients and the intensity values of the pixels to calculate a weighted sum of the intensity values of the pixels, i.e., a convolution operation. Furthermore, in cases the image data spans across multiple color channels, a set of equalizer coefficients is generated for each color channel (e.g., one channel, three channels, four channels, etc.).

Sequencing images 702 are generated during sequencing runs carried out by a sequencing instrument, such as a sequencing instrument that includes the biosensor 100 discussed with respect to FIG. 1. Examples of such sequencing instruments include Illumina's iSeq, HiSeqX, HiSeq 3000, HiSeq 4000, HiSeq 2500, NovaSeq 6000, NextSeq 550, NextSeq 1000, NextSeq 2000, NextSeqDx, MiSeq, and MiSeqDx. In one implementation, the Illumina sequencers employ cyclic reversible termination (CRT) chemistry for base calling. The process relies on growing nascent strands complementary to template strands with fluorescently-labeled nucleotides, while tracking the emitted signal of each newly added nucleotide. The fluorescently-labeled nucleotides have a 3' removable block that anchors a fluorophore signal of the nucleotide type.

Sequencing occurs in repetitive cycles, each comprising three steps: (a) extension of a nascent strand by adding the fluorescently-labeled nucleotide; (b) excitation of the fluorophore using one or more lasers of an optical system of the sequencing instrument and imaging through different filters of the optical system, yielding the sequencing images; and (c) cleavage of the fluorophore and removal of the 3' block in preparation for the next sequencing cycle. Incorporation and imaging cycles are repeated up to a designated number of sequencing cycles, defining the read length. Using this approach, each cycle interrogates a new position along the template strands.

The tremendous power of the Illumina sequencers stems from their ability to simultaneously execute and sense millions or even billions of analytes (e.g., clusters) undergoing CRT reactions. A cluster comprises approximately one thousand identical copies of a template strand, though clusters vary in size and shape. The clusters are grown from the template strand, prior to the sequencing run, by bridge amplification or exclusion amplification of the input library. The purpose of the amplification and cluster growth is to increase the intensity of the emitted signal since the imaging device cannot reliably sense fluorophore signal of a single strand. However, the physical distance of the strands within a cluster is small, so the imaging device perceives the cluster of strands as a single spot.

Sequencing occurs in a flow cell—a small glass slide that holds the input strands (e.g., see FIG. 2). The flow cell is connected to the optical system, which comprises microscopic imaging, excitation lasers, and fluorescence filters. The flow cell comprises multiple chambers called lanes. The lanes are physically separated from each other and may contain different tagged sequencing libraries, distinguishable without sample cross contamination. In some implementations, the flow cell comprises a patterned surface. A "patterned surface" refers to an arrangement of different regions in or on an exposed layer of a solid support. For example, one or more of the regions can be features where one or more amplification primers are present. The features can be separated by interstitial regions where amplification primers are not present. In some implementations, the pattern can be an x-y format of features that are in rows and columns. In some implementations, the pattern can be a repeating arrangement of features and/or interstitial regions. In some implementations, the pattern can be a random arrangement of features and/or interstitial regions. Exemplary patterned surfaces that can be used in the methods and compositions set forth herein are described in U.S. Pat. Nos. 8,778,849, 9,079,148, 8,778,848, and US Pub. No. 2014/0243224, each of which is incorporated herein by reference.

In some implementations, the flow cell comprises an array of wells or depressions in a surface. This may be fabricated as is generally known in the art using a variety of techniques, including, but not limited to, photolithography, stamping techniques, molding techniques and microetching techniques. As will be appreciated by those in the art, the technique used will depend on the composition and shape of the array substrate.

The features in a patterned surface can be wells in an array of wells (e.g., microwells or nanowells) on glass, silicon, plastic or other suitable solid supports with patterned, covalently-linked gel such as poly(N-(5-azidoacetamidylpentyl) acrylamide-co-acrylamide) (PAZAM, see, for example, US Pub. No. 2013/184796, WO 2016/066586, and WO 2015-002813, each of which is incorporated herein by reference in its entirety). The process creates gel pads used for sequencing that can be stable over sequencing runs with a large number of cycles. The covalent linking of the polymer to the wells is helpful for maintaining the gel in the structured features throughout the lifetime of the structured substrate during a variety of uses. However, in many implementations, the gel need not be covalently linked to the wells. For example, in some conditions silane free acrylamide (SFA, see, for example, U.S. Pat. No. 8,563,477, which is incorporated herein by reference in its entirety) which is not covalently attached to any part of the structured substrate, can be used as the gel material.

In particular implementations, a structured substrate can be made by patterning a solid support material with wells (e.g. microwells or nanowells), coating the patterned support with a gel material (e.g. PAZAM, SFA or chemically modified variants thereof, such as the azidolyzed version of SFA (azido-SFA)) and polishing the gel coated support, for example via chemical or mechanical polishing, thereby retaining gel in the wells but removing or inactivating substantially all of the gel from the interstitial regions on the surface of the structured substrate between the wells. Primer nucleic acids can be attached to gel material. A solution of target nucleic acids (e.g. a fragmented human genome) can then be contacted with the polished substrate such that individual target nucleic acids will seed individual wells via interactions with primers attached to the gel material; however, the target nucleic acids will not occupy the interstitial regions due to absence or inactivity of the gel material. Amplification of the target nucleic acids will be confined to the wells since absence or inactivity of gel in the interstitial regions prevents outward migration of the growing nucleic acid colony. The process is manufacturable, being scalable and utilizing conventional micro- or nano-fabrication methods.

The imaging device of the sequencing instrument (e.g., a solid-state imager such as a charge-coupled device (CCD) or a complementary metal-oxide-semiconductor (CMOS) sensor) takes snapshots at multiple locations along the lanes in a series of non-overlapping regions called tiles. For example, there can be sixty four or ninety six tiles per lane. A tile holds hundreds of thousands to millions of clusters.

The output of the sequencing runs is the sequencing images, each depicting intensity emissions of the clusters and their surrounding background. The sequencing images depict intensity emissions generated as a result of nucleotide incorporation in the sequences during the sequencing. The intensity emissions are from associated analytes/clusters and their surrounding background.

Sequencing images 702 are sourced from a plurality of sequencing instruments, sequencing runs, cycles, flow cells, tiles, wells, and clusters. In one implementation, the sequencing images are processed by the base caller 704 on an imaging-channel basis. Sequencing runs produce m image(s) per sequencing cycle that correspond to m imaging channels. In one implementation, each imaging channel (also referred to as color channel) corresponds to one of a plurality of filter wavelength bands. In another implementation, each imaging channel corresponds to one of a plurality of imaging events at a sequencing cycle. In yet another implementation, each imaging channel corresponds to a combination of illumination with a specific laser and imaging through a specific optical filter. In different implementations such as 4-, 2-, and 1-channel chemistries, m is 4 or 2. In other implementations, m is 1, 3, or greater than 4.

In another implementation, the input data is based on pH changes induced by the release of hydrogen ions during molecule extension. The pH changes are detected and converted to a voltage change that is proportional to the number of bases incorporated (e.g., in the case of Ion Torrent). In yet another implementation, the input data is constructed from nanopore sensing that uses biosensors to measure the disruption in current as an analyte passes through a nanopore or near its aperture while determining the identity of the base. For example, the Oxford Nanopore Technologies (ONT) sequencing is based on the following concept: pass a single strand of DNA (or RNA) through a membrane via a nanopore and apply a voltage difference across the membrane. The nucleotides present in the pore will affect the pore's electrical resistance, so current measurements over time can indicate the sequence of DNA bases passing through the pore. This electrical current signal (the 'squiggle' due to its appearance when plotted) is the raw data gathered by an ONT sequencer. These measurements are stored as 16-bit integer data acquisition (DAC) values, taken at 4 kHz frequency (for example). With a DNA strand velocity of ~450 base pairs per second, this gives approximately nine raw observations per base on average. This signal is then processed to identify breaks in the open pore signal corresponding to individual reads. These stretches of raw signal are base called—the process of converting DAC values into a sequence of DNA bases. In some implementations, the input data comprises normalized or scaled DAC values. Additional information about non-image based sequenced data can be found in U.S. Provisional Patent Application No. 62/849,132, entitled. "Base Calling Using Convolutions." filed May 16, 2019, U.S. Provisional Patent Application No. 62/849,133, entitled. "Base Calling Using Compact Convolutions." filed May 16, 2019, and U.S. Nonprovisional patent application Ser. No. 16/826,168, entitled "Artificial Intelligence-Based Sequencing." filed 21 Mar. 2020.

Spatially Varying Sharpening Masks

A particular sharpening mask/mask/convolution kernel can be configured to/trained to improve and/or improve and/or maximize the signal-to-noise ratio of a particular category/type/configuration/characteristic/class/bin of data. Similarly, respective sharpening masks can be configured to improve and/or improve and/or maximize the signal-to-noise ratio of respective instances/categories/types/configurations/characteristics/classes/bins of data We disclose a variety of sharpening masks. For example, a "surface-specific specialist sharpening mask" is configured to/trained to improve and/or maximize the signal-to-noise ratio of sequencing data of clusters located on a particular surface or a particular surface-type/category/class (e.g., top surfaces or bottom surfaces or surfaces 1 to N of a flow cell). Similarly, a "lane-specific specialist sharpening mask" is configured to/trained to improve and/or maximize the signal-to-noise ratio of sequencing data of clusters located on a particular lane or a particular lane-type/category/class (e.g., central lanes or peripheral lanes or lanes 1 to N of a flow cell). Also, a "tile-specific specialist sharpening mask" is configured to/trained to improve and/or maximize the signal-to-noise ratio of sequencing data of clusters located on a particular tile or a particular tile-type/category/class (e.g., central tiles or peripheral tiles or tiles 1 to N of a flow cell). Also, a "sub-tile-specific specialist sharpening mask" is configured to/trained to improve and/or maximize the signal-to-noise ratio of sequencing data of clusters located on a particular sub-tile or a particular sub-tile-type/category/class (e.g., central sub-tiles or peripheral sub-tiles or sub-tiles 1 to N of a flow cell). In some implementations, a single sharpening mask can comprise a plurality of specialist coefficient sets, such that each specialist coefficient set is configured to/trained to improve and/or maximize the signal-to-noise ratio of a particular category/type/configuration/characteristic/class/bin of data. In some implementations, the single sharpening mask can comprise a variety of specialist coefficient sets. For example, a "surface-specific specialist coefficient set" is configured to/trained to improve and/or maximize the signal-to-noise ratio of sequencing data of clusters located on a particular surface or a particular surface-type/category/class (e.g., top surfaces or bottom surfaces or surfaces 1 to N of a flow cell). Similarly, a "lane-specific specialist coefficient set" is configured to/trained to improve and/or maximize the signal-to-noise ratio of sequencing data of clusters located on a particular lane or a particular lane-type/category/class (e.g., central lanes or peripheral lanes or lanes 1 to N of a flow cell). Also, a "tile-specific specialist coefficient set" is configured to/trained to improve and/or maximize the signal-to-noise ratio of sequencing data of clusters located on a particular tile or a particular tile-type/category/class (e.g., central tiles or peripheral tiles or tiles 1 to N of a flow cell). Also, a "sub-tile-specific specialist coefficient set" is configured to/trained to improve and/or maximize the signal-to-noise ratio of sequencing data of clusters located on a particular sub-tile or a particular sub-tile-type/category/class (e.g., central sub-tiles or peripheral sub-tiles or sub-tiles 1 to N of a flow cell). The disclosed specialist sharpening masks are applicable to clusters located on both patterned and unpatterned surfaces of a flow cell. With unpatterned surfaces, the clusters are randomly distributed on the flow cell. The randomly distributed clusters and data therefor (e.g., images) can be binned spatially, temporally, signal-wise, or by any combination thereof. Accordingly, the specialist sharpening masks can be configured and trained for different configurations of the differently binned randomly distributed clusters. With patterned surfaces, the clusters are located on patterned wells with fixed locations. The patterned wells and the constituent clusters can be binned spatially, temporally, signal-wise, or by any combination thereof. Accordingly, the specialist sharpening masks can be configured and trained for different configurations of the differently binned patterned clusters. The disclosed specialist sharpening masks are configuration-specific sharpening masks that are trained to improve and/or maximize the signal-to-noise ratio of image data generated for different configurations of a sequencing run. These configurations can be spatial configurations relating to different regions on a flow cell, temporal configurations relating to different sequencing/imaging cycles of the sequencing run, signal distribution configurations relating to different distributions/patterns of signal profiles observed/encoded in the imaged data, or a combination thereof. Other examples of configurations covered by this disclosure include segmenting sequencing data and training corresponding specialist sharpening masks by imaging type, color channel type, laser type, optics type, lens type, optical filter type, illumination type, library type, sample type, indexing type (first index read v/s second index read), read type (forward read v/s reverse read), physical properties of the sample, noise type (e.g., bubble), and reagent type.

Figure 8A:
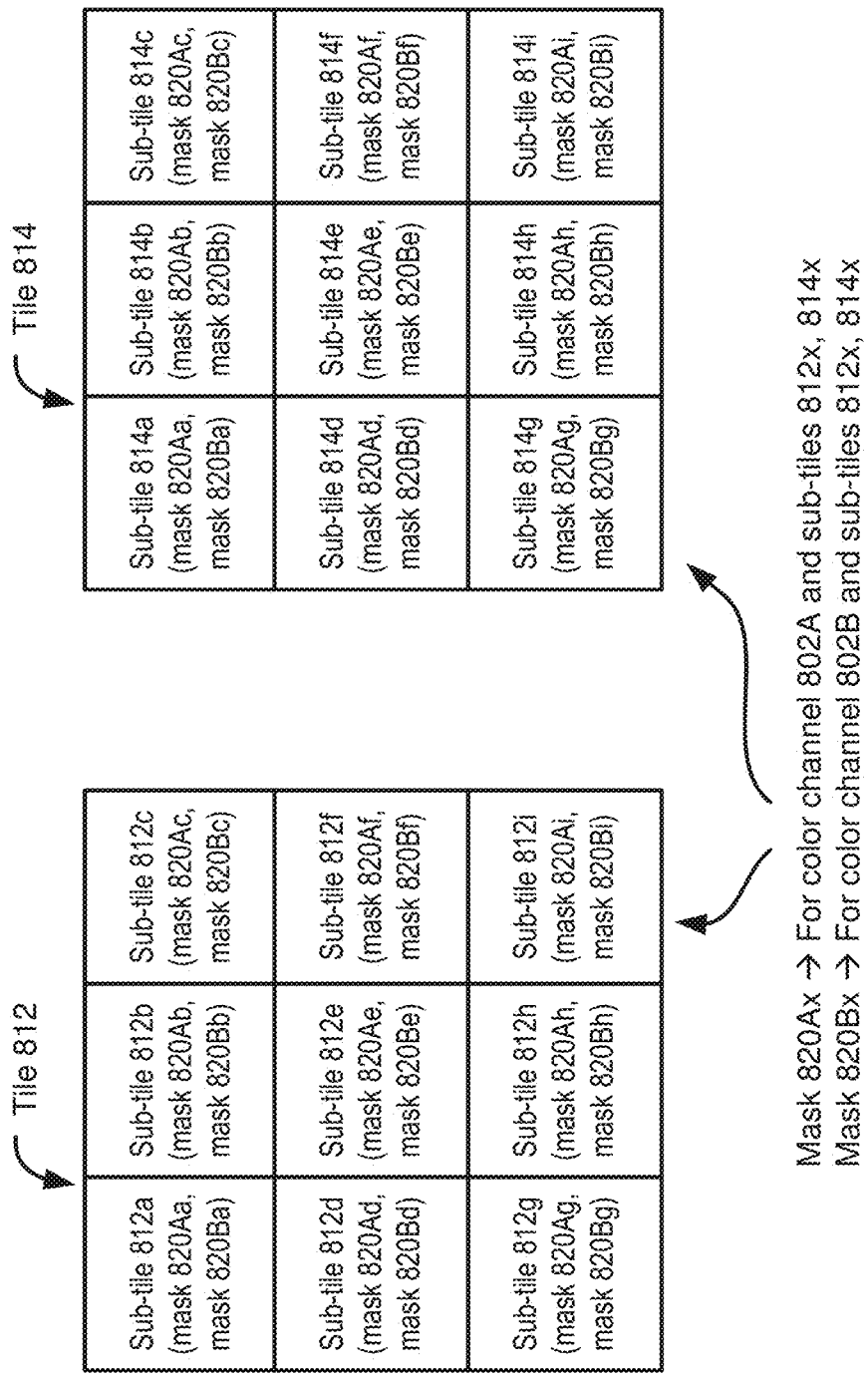
FIG. 8A illustrates a plurality of sharpening masks used for corresponding sections of sequencing images generated for corresponding regions of a flow cell, where each tile of the flow cell is divided in 3×3 sub-tile regions, with each sub-tile region assigned one or more corresponding sharpening masks.

FIG. 8A illustrates a plurality of sharpening masks 820 used for corresponding sections of the sequencing images generated for corresponding regions of a flow cell, where each tile of the flow cell is divided in 3×3 sub-tile regions, with each sub-tile region assigned one or more corresponding sharpening masks.

For example, in FIG. 8A, two example tiles 812 and 814 of a flow-cell are illustrated (see FIG. 2 for further discussion of tiles and flow-cell), where the flow-cell generates the sequencing images 702 of FIG. 7. Tile 812 is divided in 3×3 sub-tile regions 812a, 812b, . . . 812i, as illustrated. Similarly, tile 814 is divided in 3×3 sub-tile regions 814a. 814b . . . 814i, as illustrated. Similarly, other tiles of the flow cell may also be divided in corresponding 3×3 sub-tile regions. Merely as an example, if a tile has 9000×9000 pixels in the corresponding image, the image is divided in sub-tile regions, such that each sub-tile region has 3000× 3000 pixels.

Each sub-tile comprises a plurality of clusters. For example, each 3000×3000-pixel sub-tile region of the image comprises images of the corresponding plurality of clusters.

Each sub-tile region of a tile is assigned one or more corresponding sharpening masks. For example, in the example of FIG. 8A, two color channels 802A, 802B are assumed merely as an example, although there may be any different number of color channels. For example, sharpening masks 820Ax correspond to color channel 802A, and sharpening masks 820Bx correspond to color channel 802B, where the "A" in sharpening masks 820Ax implies that these masks are for processing images for color channel 802A, and the "B" in sharpening masks 820Bx implies that these masks are for processing images for color channel 802B.

Furthermore, the indices "x" in masks 820Ax and 820Bx are associated with corresponding sub-tiles 812x, 814x for which the masks are to be used. For example, mask 820Aa is used for sections of the sequencing images 702 generated from sub-tile 812a of the tile 812 and also for the sub-tile 814a of the tile 814; mask 820Ba is used for sections of the sequencing images 702 generated from sub-tile 812a of the tile 812 and also for the sub-tile 814a of the tile 814; mask 820Ab is used for sections of the sequencing images 702 generated from sub-tile 812b of the tile 812 and also for the sub-tile 814b of the tile 814, and so on.

Thus, in summary, for example, mask 820Aa is used for sections of the sequencing images 702 that corresponds to color channel 802A and for sub-tile regions 812a and 814a; mask 820Ba is used for sections of the sequencing images 702 that corresponds to color channel 802B and for sub-tile regions 812a and 814a; mask 820Ab is used for sections of the sequencing images 702 that corresponds to color channel 802A and for sub-tile regions 812b and 814b; mask 820Bb is used for sections of the sequencing images 702 that corresponds to color channel 802B and for sub-tile regions 812b and 814b; and so on.

Note that a same sharpening mask is used for corresponding sub-tile regions of multiples tiles. For example, the sharpening masks 802Aa and 802Ba are used for top-left sub-tile of multiple or all tiles of the flow cell, the sharpening mask 802Ae and 802Be are used for the central sub-tile of multiple or all tiles of the flow cell, and so on.

Thus, in the example of FIG. 8A where each tile is divided in 3×3 sub-tile regions and 2 color channels are assumed, there are 9*2 or 18 sharpening masks. In general, if each tile is divided in N number of sub-tile regions and M color channels are assumed, then there are M*N number of sharpening masks.

In an example, the k×k (such as 3×3) subdivision of a tile may be used for scenarios where a point and shoot image capturing system is used to capture the sequencing image. For example, in a point and shoot image capturing system, a center of the tile may be captured slightly different from an edge of the tile, e.g., due to distortion effects, due to different focusing on different sections of the tile, and/or the like. Accordingly, an edge of the tile can have a different sharpening mask than a center of the tile, as illustrated in FIG. 8A. Furthermore, due to factors like tilting in the optical system relative to the flow cell, images from different edges of the tile can also be slightly different (i.e., each edge may not be similarly represented in the image). Accordingly, in the example of FIG. 8A, each of the 9 sub-tiles can have different associated sharpening masks.

Figure 8B:
FIG. 8B illustrates a plurality of sharpening masks used for corresponding sections of sequencing images generated for corresponding regions of a flow cell, where each tile of the flow cell is divided in 1×9 sub-tile regions, with each sub-tile region assigned one or more corresponding sharpening masks.

FIG. 8B illustrates a plurality of sharpening masks 840 used for corresponding sections of the sequencing images generated for corresponding regions of a flow cell, where each tile of the flow cell is divided in 1×9 sub-tile regions, with each sub-tile region assigned one or more corresponding sharpening masks.

For example, in FIG. 8B, two example tiles 832 and 834 of a flow-cell are illustrated (see FIG. 2 for further discussion of tiles and flow-cell), where the flow-cell generates the sequencing images 702 of FIG. 7. Tile 832 is divided in 1×9 sub-tile regions 832a, 832b . . . 832i, as illustrated. Similarly, tile 834 is divided in 1×9 sub-tile regions 834a, 834b . . . 834i, as illustrated. Similarly, other tiles of the flow cell may also be divided in corresponding 1×9 sub-tile regions.

Merely as an example, if a tile has 9000×9000 pixels in the corresponding image, the image is divided in sub-tile regions, such that each sub-tile region has 9000×1000 pixels. Each 9000×1000-pixel sub-tile region of the image comprises images of corresponding plurality of clusters.

Each sub-tile region of a tile is assigned one or more corresponding sharpening masks. In the example of FIG. 8B (and similar to the example of FIG. 8A), two color channels 804A, 804B are assumed merely as an example, although there may be any different number of color channels. For example, sharpening masks 840Ax correspond to color channel 804A, and sharpening masks 840Bx correspond to color channel 804B, where the "A" in the sharpening masks 840Ax implies that these masks are for processing images for color channel 804A, and the "B" in the sharpening masks 840Bx implies that these masks are for processing images for color channel 804B.

Furthermore, the indices "x" in masks 840Ax and 840Bx are associated with corresponding sub-tiles 832x, 834x for which the masks are to be used. For example, mask 840Aa is used for section of the sequencing images 702 generated from sub-tile 832a of the tile 832 and also for the sub-tile 834a of the tile 834; mask 840Ba is used for section of the sequencing images 702 generated from sub-tile 832a of the tile 832 and also for the sub-tile 834a of the tile 834. Similarly, masks 840Ab and 840Bb are used for section of the sequencing images 702 generated from sub-tile 832b of the tile 832 and also from sub-tile 834b of the tile 834, and so on.

Thus, mask 840Aa is used for sections of the sequencing images 702 that corresponds to color channel 804A and for sub-tile regions 832a and 834a; mask 840Ba is used for sections of the sequencing images 702 that corresponds to color channel 804B and for sub-tile regions 832a and 834a; mask 840Ab is used for sections of the sequencing images 702 that corresponds to color channel 804A and for sub-tile regions 832b and 834b; mask 840Bb is used for sections of the sequencing images 702 that corresponds to color channel 804B and for sub-tile regions 832b and 834b; and so on.

Thus, in the example of FIG. 8B where each tile is divided in 1×9 sub-tile regions and 2 color channels are assumed, there are 9*2 or 18 sharpening masks. In general, if each tile is divided in N number of sub-tile regions and M color channels are assumed, then there are M*N number of sharpening masks.

In an example, the 1×k (such as 1×9) subdivision of a tile may be used for scenarios where a line scan image capturing system is used to capture the sequencing image. For example, in a line scan image capturing system, various vertical sub-regions of the image may be captured differently. Accordingly, the image is divided in different vertical sub-regions, as illustrated in FIG. 8B, with each sub-region assigned its own corresponding sharpening mask.

Figure 8C:
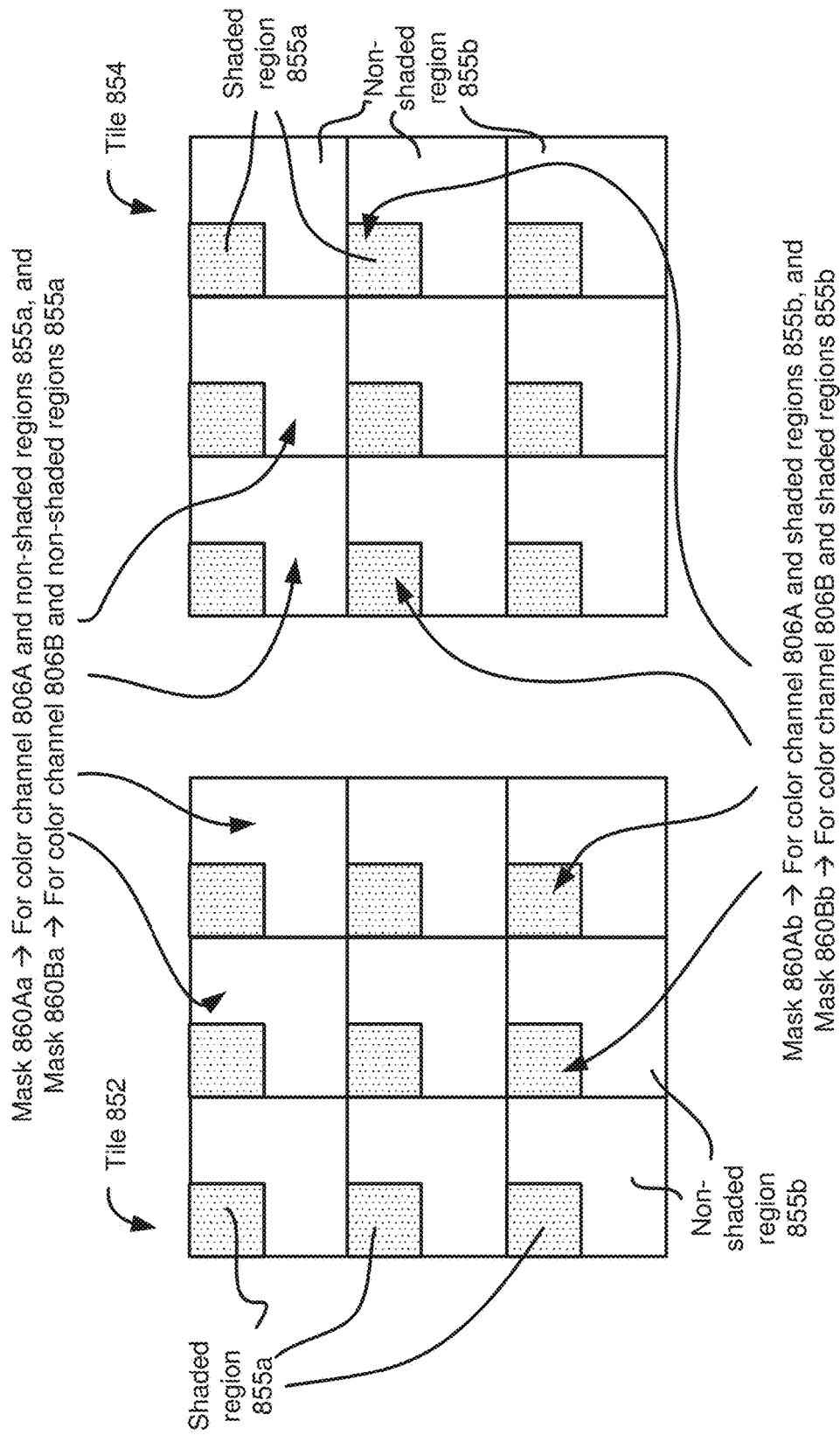
FIG. 8C illustrates a plurality of sharpening masks used for corresponding sections of sequencing images generated for corresponding regions of a flow cell, where each tile of the flow cell is divided in multiple periodically occurring sub-tile regions, with similar sub-regions occurring periodically in a tile are assigned one or more corresponding sharpening masks.

FIG. 8C illustrates a plurality of sharpening masks 860 used for corresponding sections of the sequencing images generated for corresponding regions of a flow cell, where each tile of the flow cell is divided in multiple sub-tile regions, with similar sub-regions occurring periodically in a tile are assigned one or more corresponding sharpening masks.

For example, in FIG. 8C, two example tiles 852 and 854 of a flow-cell are illustrated, where the flow-cell generates the sequencing images 702 of FIG. 7. Tile 852 is divided in 3×3 sub-tile regions, wherein a corner region of each sub-tile is illustrated using grey shadings. The shaded regions in various sub-tiles of the tiles 852 and 858 are labelled as shaded regions 855a, and the non-shaded regions in various sub-tiles of the tiles 852 and 858 are labelled as non-shaded regions 855b.

Although in the example of FIG. 8C the shaded regions 855a occur with a specific periodicity (e.g., top-left corner of each sub-tile), this is merely an example, and the shaded regions 855a can occur with any other type of periodicity as well. For example, two horizontal lines of pixel of a tile can be included in a shaded region 855a, followed by a non-shaded region 855b including five horizontal lines of pixel, and this pattern may repeat. Thus, in this example, the two lines of pixels of the shaded regions 855a and the five lines of pixels of the non-shaded regions 855b are interleaved and occur in a repeating pattern. Any other pattern of shaded regions 855a and non-shaded regions 855b may also be possible. Merely as an example, intersection of every other (fourth row) and (fifth and sixth columns) of pixels can be included in the shaded region 855a, and this pattern of shaded region can be repeated throughout the image.

In an example, the use of repeating patterns of shaded and non-shaded regions illustrated in FIG. 8C can be used for scenarios where CMOS (complementary metal oxide semiconductor) image capturing sensors are used for capturing the sequencing images. For example, some sequencing platforms use flowcells that have embedded CMOS sensors. Sequencing chemistry is performed directly on top of the CMOS sensor, and then imaged with the assistance of LED exciting the fluorescent molecules on the sensor. In an example (e.g., due to design and cost requirements to satisfy both imaging and chemistry), the CMOS sensor read-out circuitry is embedded into the sensor itself as repeating rows and columns of "dark pixels," where such periodic patches of dark pixels are symbolically represented as the shaded region 855a in FIG. 8C. This design pattern creates a unique intensity extraction challenge that necessitates use of different extraction kernels at certain periodicity, as discussed with respect to FIG. 8C. Use of CMOS sensor embedded within the flow cell may be found in PCT Publication No. WO 2020/236945, which is incorporated by reference as if fully set forth herein.

Each shaded region 855a of a tile is assigned one or more corresponding sharpening masks. In the example of FIG. 8C (and similar to the example of FIG. 8A), two color channels 806A, 806B are assumed merely as an example, although there may be any different number of color channels. For example, sharpening masks 860Ax correspond to color channel 806A, and sharpening masks 860Bx correspond to color channel 806B, where the "A" in the sharpening masks 840Bx implies that these masks are for processing images for color channel 806A, and the "B" in the sharpening masks 860Bx implies that these masks are for processing images for color channel 806B.

Furthermore, the indices "x" in masks 860Ax and 860Bx are associated with corresponding shaded/non-shaded regions 855x for which the masks are to be used. For example, masks 860Aa and 860Ba are used for section of the sequencing images 702 generated from the shaded regions 855a of various tiles. Similarly, masks 860Ab and 860Bb are used for section of the sequencing images 702 generated from the non-shaded regions 855b of various tiles.

Thus, mask 860Aa is used for sections of the sequencing images 702 that corresponds to color channel 806A and for shaded regions 855a; mask 860Ba is used for sections of the sequencing images 702 that corresponds to color channel 806B and for shaded regions 855a; mask 860Ab is used for sections of the sequencing images 702 that corresponds to color channel 806A and for non-shaded regions 855b; and mask 860Bb is used for sections of the sequencing images 702 that corresponds to color channel 806B and for non-shaded regions 855b.

Thus, in the example of FIG. 8C where each tile is divided in shaded and non-shaded regions and 2 color channels are assumed, there are 2*2 or 4 sharpening masks.

Training

Referring again to FIG. 7, the base caller 704 generates one or more sharpening masks 706 (e.g., such as the sharpening masks discussed with respect to FIGS. 8A-8C), which are used to sharpen the sequencing images 702 (the sharpening operations are discussed in further detail with respect to FIGS. 10A-10K and 11). The sharpening operations involve intensity extraction from the sequencing image to generate corresponding feature map, and subsequent interpolation operation to assign weighted feature values of various clusters, based on sub-pixel location of the clusters, as discussed in further detail herein later. The clusters, with the corresponding assigned weighted feature values, are then base called.

In one implementation, the number of sharpening masks 706 generated by the base caller 704 may be implementation specific, as discussed with respect to FIGS. 8A-8C. For example, each color channel may have corresponding sharpening mask 706. In another example, a tile of the flow cell from which the sequencing images 702 are generated may be divided in two or more sections, with a dedicated sharpening mask for individual section of the tile, as discussed in further detail with respect to FIGS. 8A-8C.

As will be discussed in further detail (e.g., in FIG. 10F herein later), the sharpening masks 706 act as convolution kernels, and a sharpening mask is convolved with a corresponding section of the image. Merely as an example, referring to FIG. 8A, the sharpening mask 820Aa is convolved with a section of the sequencing image 702 generated by the sub-tile 812a for the color channel 802A. In one implementation of the training, the coefficients of each sharpening masks 706 are determined using least squares estimation on the corresponding subset of data from the corresponding sections of the images. Thus, again referring to FIGS. 7 and 8A, for example, data for color channel 802A and from the sub-tile 812a are used to generate and/or train the sharpening mask 820a.

As illustrated in FIG. 7, the input to the base caller 704 is the raw sensory pixels of the sequencing images from various tile of the flow cell. Each sharpening mask 706 has a plurality of coefficients that are learned from the training. In one implementation, the number of coefficients in a sharpening mask corresponds to the number of sensor pixels that are used for base calling a cluster. In an example, a sharpening mask is a square matrix having k×k coefficients, where k is an appropriate positive integer, such as 3, 5, 7, 9, or the like. Thus, each sharpening mask 706 has $k^2$ coefficients.

The training produces sharpening mask coefficients that are configured to mix/combine intensity values of pixels that depict intensity emissions from a cluster being base called and intensity emissions from one or more adjacent clusters in a manner that maximizes a signal-to-noise ratio. The signal maximized in the signal-to-noise ratio is the intensity emissions from a target cluster, and the noise minimized in the signal-to-noise ratio in the intensity emissions from the adjacent clusters, i.e., spatial crosstalk, plus some random noise (e.g., to account for background intensity emissions). The sharpening mask coefficients are used as weights and the mixing/combining includes executing element-wise multiplication between the sharpening mask coefficients and the intensity values of the pixels, to calculate a weighted sum of the intensity values of the pixels (e.g., which are features in a feature map, see FIGS. 10E and 10F).

During training, the base caller 704 learns to improve and/or maximize the signal-to-noise ratio by least squares estimation, according to one implementation. Using the least squares estimation, the base caller 704 is trained to estimate shared sharpening mask coefficients from the pixel intensities around a subject well and a desired output. Least squares estimation is well suited for this purpose because it outputs coefficients that minimize squared error and take into account the effects of noise amplification.

Figure 9A:
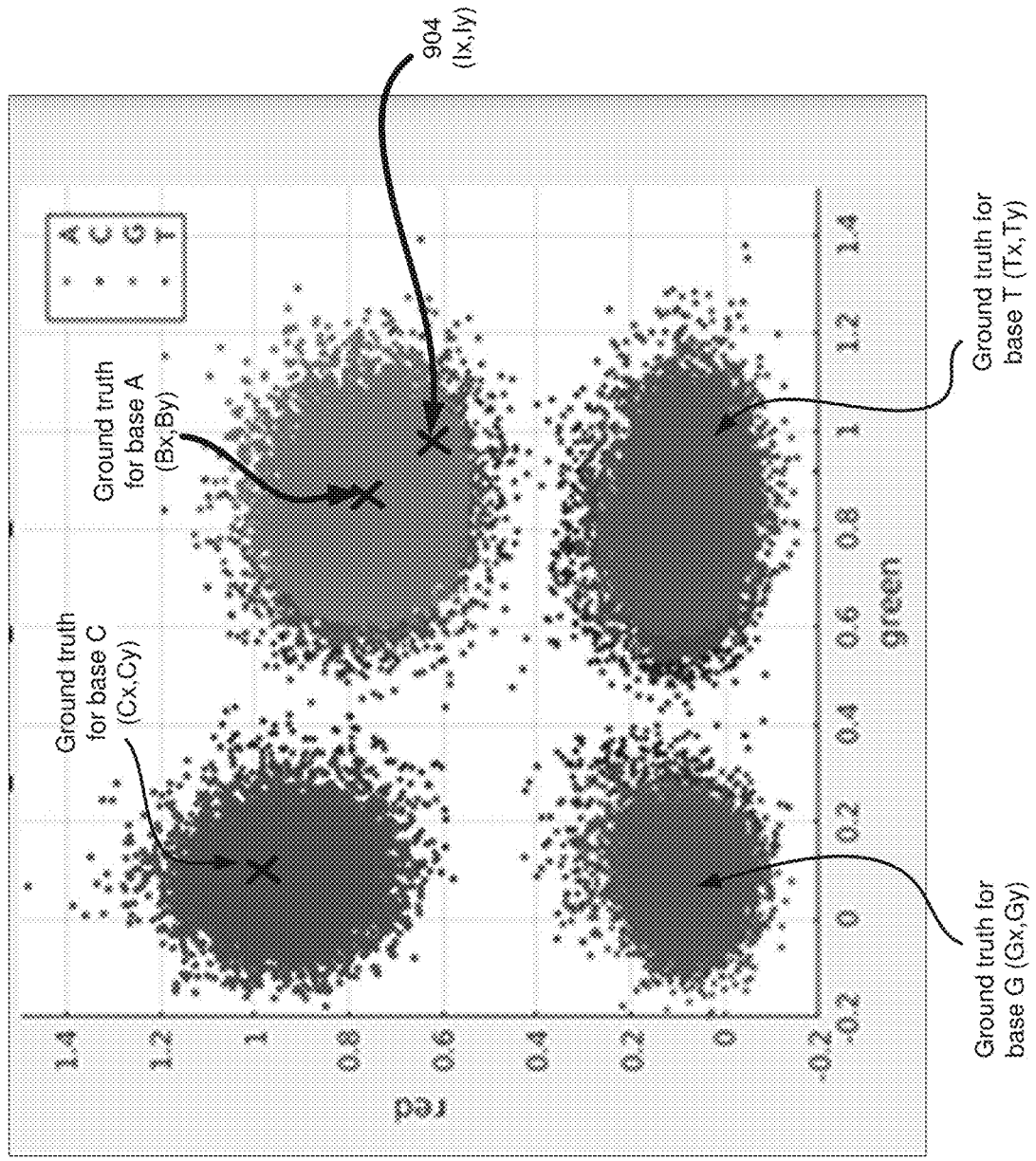
FIG. 9A shows one implementation of base-wise Gaussian fits that contain at their centers base-wise intensity targets which are used as ground truth values for error calculation during training.

The desired output is an impulse at the well (i.e., cluster) location (the point source) when the intensity channel is ON and the background level when the intensity channels is OFF. In some implementations, ground truth 712 are used to generate the desired output. In an example, the ground truth 712 comprises ground truth base calls. Additionally or alternatively, in some examples, the ground truth comprises a center of a cloud (or an average) for each base, as illustrated in FIG. 9A and as will be discussed herein in further detail.

In some implementations, the ground truth 712 are modified to account for per-well DC offset, amplification coefficient, degree of polyclonality, and gain offset parameters that are included in the least squares estimate. In one implementation, during the training, a DC offset, i.e., a fixed offset is calculated as part of the least squares estimate. During inference, the DC offset is added as a bias to each sharpening mask calculation.

In one implementation, the desired output is estimated using Illumina's Real-time Analysis (RTA) base caller. Details about the RTA can be found in U.S. patent application Ser. No. 13/006,206, which is incorporated by reference as if fully set forth herein. The base calling errors get averaged out across many training examples. In another implementation, the ground truth 712 are sourced using aligned genomic data, which has better quality because aligned genomic data can use reference genome and truth information which incorporate the knowledge gained from multiple sequencing platforms and sequencing runs to average out the noise.

The ground truth 712 are base-specific intensity values (or feature values, discussed herein later) that reliably represent intensity profiles of bases A, C, G, and T, respectively. A base caller like the RTA base calls clusters by processing the sequencing images 702 and producing, for each base call, color-wise intensity values/outputs. The color-wise intensity values can be considered base-wise intensity values because, depending on the type of chemistry (e.g., 2-color chemistry or 4-color chemistry), the colors map to each of the bases A, C, G, and T. The base with the closest matching intensity profile is called.

FIG. 9A shows one implementation of base-wise Gaussian fits that contain at their centers base-wise intensity targets which are used as ground truth values for error calculation during training. Base-wise intensity outputs produced by the base caller for a multiplicity of base calls in the training data (e.g., tens, hundreds, thousands, or millions of base calls) are used to produce a base-wise intensity distribution. FIG. 9A shows a chart with four Gaussian clouds that are a probabilistic distribution of the base-wise intensity outputs of the bases A, C, G, and T, respectively. Intensity values at the centers of the four Gaussian clouds are used as the ground truth intensity targets (or feature value targets) of the ground truth 712 for the bases A, C, G, and T, respectively, and referred to herein as the targets (e.g., intensity or feature value targets).

Consider that, during the training, input image data that is fed to the base caller 704 is annotated with base "A" as the ground truth base call. The ground truth 712 also includes base-specific intensity values that reliably represent intensity profiles of bases A, C, G, and T, respectively. Thus, for example, the ground truth 712 also includes, for base A, coordinates of an average intensity or average feature value for base A (i.e., a center of the green cloud in FIG. 9A), as illustrated in FIG. 9A (feature values have been discussed herein later). Then, the target/desired output of the base caller 704 is the intensity value or feature value at the center of the green cloud in FIG. 9A, i.e., the intensity target for base A. Similarly, for base "C," ground truth comprises the intensity value or feature value at the center of the blue cloud in FIG. 9A, i.e., the intensity target (or the feature value target) for base C having coordinates (Cx,Cy). Similarly, for base "T," ground truth comprises the intensity value or feature value at the center of the red cloud in FIG. 9A, i.e., the intensity target (or the feature value target) for base T having coordinates (Tx,Ty). Also, for base "G," ground truth comprises the intensity value or feature value at the center of the brown cloud in FIG. 9A, i.e., the intensity target (or the feature value target) for base G having coordinates (Gx,Gy).

Accordingly, targets or desired outputs during the training of the base caller 704 are the average intensities (or average feature values) for the respective bases A, C, G, and T after averaging in the training data. In one implementation, the trainer 714 uses the least squares estimation to fit the coefficients of the sharpening masks 706, to minimize the output error to these targets.

In one implementation, during the training, the base caller 704 applies the coefficients in a given sharpening mask to pixels of a sequencing image labelled with a given base. This includes element-wise multiplying the coefficients with the intensity values of the pixels and generating a weighted sum of the intensity values of a feature map, with the coefficients serving/acting/used as the weights. The feature map includes various features having corresponding feature values. Note that a center of a cluster may not align with a center of a pixel of the sequencing images 702. To account for such misalignment, in the feature map generated from the sequencing images 702 (where the feature map is generated by convolving a sharpening mask with a corresponding section of the image), a weighted feature value assigned to a cluster is generated by bilinear interpolation, e.g., where neighboring features are interpolated to generate the weighted feature value corresponding to a cluster, as will be discussed herein in further detail in turn. The interpolated feature value corresponding to the cluster then becomes the predicted output of the base caller 704 for that cluster. Then, based on a cost/error function (e.g., sum of squared errors (SSE)), an error (e.g., the least square error, the least means squared error) is calculated between the interpolated weighted feature value and the intensity target determined for the given base of the cluster (e.g., from the center of the corresponding intensity Gaussian fit as the average intensity observed for the given base). The cost function, such as the SSE, is a differentiable function used to estimate sharpening mask coefficients using an adaptive approach, and we can therefore evaluate the derivatives of the error with respect to the coefficients, and these derivatives are then used to update the coefficients with values that minimize the error. This process is repeated until the updated coefficients do not reduce the error anymore. In other implementations, batch least squares approach is used to train the base caller 704.

For example, assume that the center of the green cloud in FIG. 9A, i.e., the intensity target for base A is (Ax,Ay), which is the target or desired output (e.g., a target feature value) for base A base calls. Assume that during a sequencing run, a cluster 904 has a weighted feature value represented at coordinate (Ix,Iy). In an embodiment, the base caller 704 updates coefficients in a given sharpening mask, such that the intensity of cluster 904 is transposed to the coordinates (Ax, Ay) from the coordinates (Ix,Iy). Thus, the training aims to minimize or reduce the distance between the coordinates (Ax,Ay) and (Ix,Iy).

In an example, the base-wise intensity distributions/Gaussian clouds shown in FIG. 9A can be generated on a well-by-well basis and corrected for noise by addition of a DC offset, amplification coefficient, and/or phasing parameter. This way, depending upon the well location of a particular well, the corresponding base-wise Gaussian clouds can be used to generate target intensity values for that particular well (or a cluster corresponding to the well).

In one implementation, a bias term is added to the dot product that produces the output of the base caller 704. During training, the bias parameter can be estimated using a similar approach used to learn the coefficients of the sharpening masks, i.e., least squares or least mean squares (LMS). In some implementations, the value for the bias parameter is a constant value equal to one, i.e., a value that does not vary with the input pixel intensities. There is one bias per set of coefficients. The bias is learned during the training and thereafter fixed for use during inference. The learned bias represents a DC offset that is used in every calculation during the inference, along with the learned coefficients of each sharpening mask. The bias accounts for random noise caused by different cluster sizes, different background intensities, varying stimulation responses, varying focus, varying sensor sensitivities, and varying lens aberrations.

In yet other decision-directed implementations, the outputs of the base caller 704 are presumed to be correct for the training purposes.

The trainer 714 can train the base caller 704 and generate the trained coefficients of the sharpening masks 706 using a plurality of training techniques. Examples of the training techniques include least squares estimation, ordinary least squares, least-mean squares, and recursive least-squares. The least squares technique adjusts the parameters of a function to best fit a data set so that the sum of the squared residuals is minimized. In other implementations, other estimation algorithms and adaptive algorithms can be used to train the base caller 704.

The base caller 704 can be trained in an offline mode or online mode of adaptation. According to one implementation, the trained coefficients of the base caller 704 are generated and/or updated using the following batch least squares logic:

$$\hat{\beta} = (X^T X)^{-1} X^T y. \qquad \text{Equation 1}$$

In the equation above, the sharpening mask coefficients are beta hat ($\hat{\beta}$). For example, if a sharpening mask 706 has a dimension of k×k, then the beta hat ($\hat{\beta}$) is a vector having a dimension of (k×k). Thus, for a 3×3 dimensional sharpening mask, the beta hat ($\hat{\beta}$) is a vector of size 9.

X is a matrix with pixel values of size m×(k×k), i.e., m rows and (k×k) column, where m is an appropriate positive integer. Each row of the matrix X corresponds to one cluster, and each column is the value of image pixels after adjusting for subpixel interpolation.

y is a vector of size m that corresponds to a centroid location of each cluster. For example, y is a target output for every training example, i.e., each value is the intensity center of an ON/OFF cloud depending upon the training example truth. Beta hat is then the set of coefficients that minimize the sum of the squared residuals.

In an example, the base caller 704 can also be trained in an online mode to adapt the coefficients of the sharpening masks 706, e.g., to track changes in the temperature (e.g., optical distortion), focus, chemistry, machine-specific variation, etc., while the sequencing machine is running and the sequencing run is cyclically progressing. In the online mode, the trained coefficients of the sharpening masks 706 are updated using adaptive techniques. The online mode uses the least-mean squares as the training algorithm, which is a form of stochastic gradient descent. Further details about online adaptation of the coefficients of the sharpening masks 706 have been discussed herein later, e.g., with respect to FIGS. 12 and 13.

The least-mean squares technique uses the gradient of the squared error with respect to each coefficient, to move the coefficients in a direction that minimizes the cost function which is the expected value of the squared error. This has a very low computational cost—only a multiply and accumulate operation per coefficient is executed. No long-term storage is needed, except for the coefficients. The least-mean squares technique is well suited to for processing huge amounts of data (e.g., processing data from billions of clusters in parallel). Extensions of the least-mean squares technique include normalized least-mean-square and frequency-domain least-mean-square, which can also be used herein. In some implementations, the least-mean squares technique can be applied in a decision-directed fashion in which we assume that our decisions are correct, i.e., our error rate is very low and small mu values will filter out any disturbed updates due to incorrect base calls.

Figure 9B:
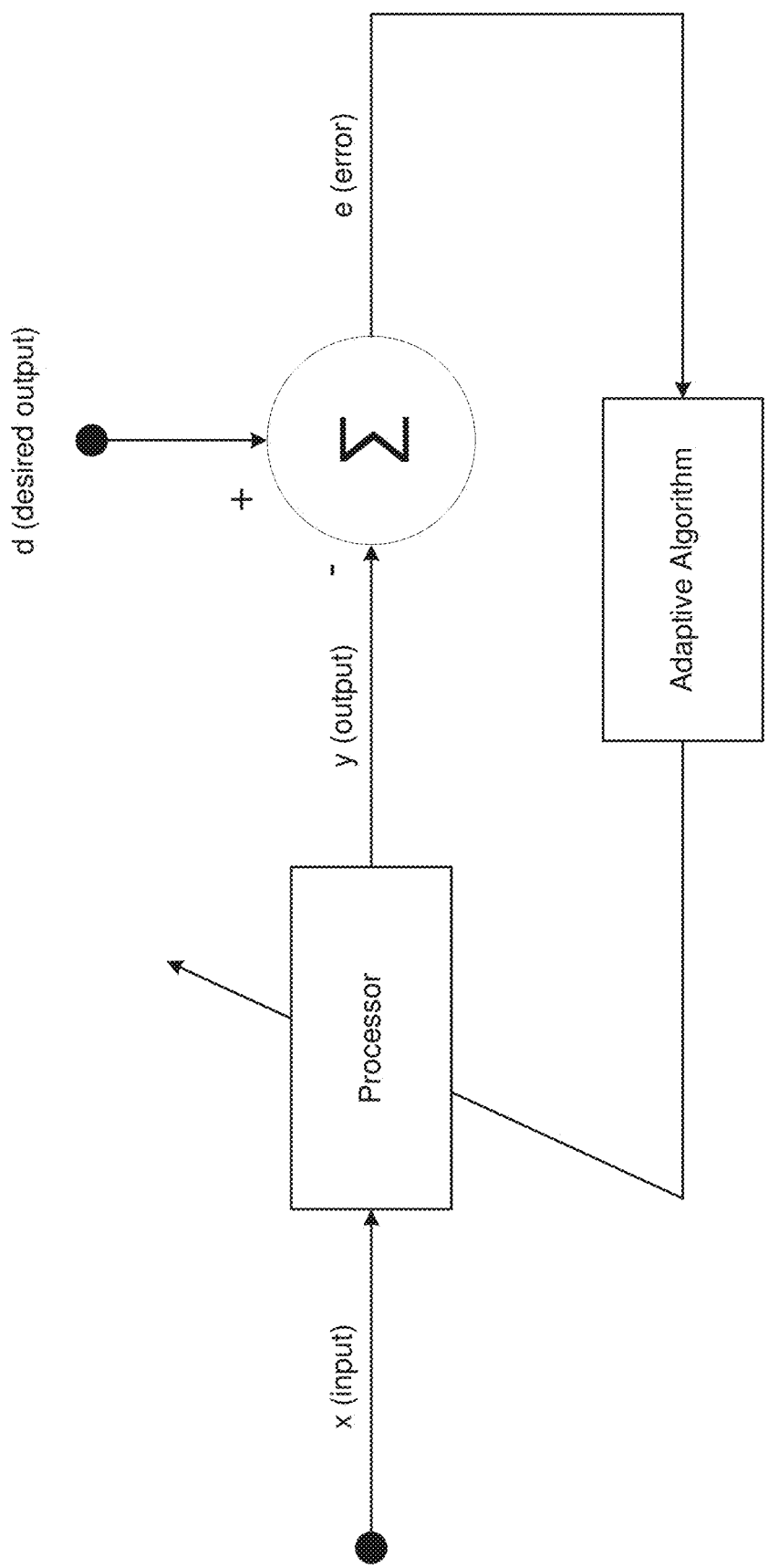
FIG. 9B shows one implementation of an adaptive technique that can be used to train a base caller.

FIG. 9B shows one implementation of an adaptive technique that can be used to train the base caller 104, e.g., using an offline or online mode. Here, the logic is y=x·h+d, where x is the input pixel intensities, h is the sharpening mask coefficients, d is the DC offset. In one implementation, x and h are row and column vectors respectively, with length 81. This vector model is equivalent to a dot product of 9×9 matrices representing input pixels and coefficients. The cost is the expected value of error squared. The gradient update moves each coefficient in a direction that reduces the expected value of error squared. This leads to the following update:

$$\hat{h}(n+1) = \hat{h}(n) - \frac{\mu}{2} \nabla C(n) = \hat{h}(n) + \mu E\{x(n)e^*(n)\}$$

For most systems the expectation function $E\{x(n)e^*(n)\}$ must be approximated. This can be done with the following unbiased estimator $$\hat{E}\{x(n)e^*(n)\} = \frac{1}{N} \sum_{i=0}^{N-1} x(n-i)e^*(n-i)$$

where N indicates the number of samples we use for that estimate. The simplest case is N=1

$$\hat{E}\{x(n)e^*(n)\} = x(n)e^*(n)$$

For that simple case the update algorithm follows as $$\hat{h}(n-1) = \hat{h}(n) + \mu x(n)e^*(n)$$

Indeed, this constitutes the update algorithm for the LMS filter.

In equations above, h is a vector of sharpening mask coefficients, x is a vector of input intensities, and e is the error for the calculation that was performed using the values in x, i.e., only 1 error term per output.

Applying this update generates a new estimate of the coefficients that moves them in a direction that (on average) reduces the mean squared error (MSE). In some implementations, Mu is a small constant used to change the adaptation rate/convergence speed. A DC term update can be calculated in a similar way. A gain term update also can be calculated in a similar way.

In some implementations, since linear interpolation is applied on the coefficient sets, the updates are applied slightly differently in the following manner:

$$h(q, n+1) = h(q, n) + \text{lambda\_q}.mu.x.(n).e(n)$$

In the equation above, h(q, n) is weight q at cycle n, lambda_q is the linear interpolation weight for a particular set of coefficients and can include four updates per output due to linear interpolation in two dimensions.

The recursive least-squares technique extends the least squares technique to a recursive algorithm.

Spatial Crosstalk Attenuator

Figure 10A:
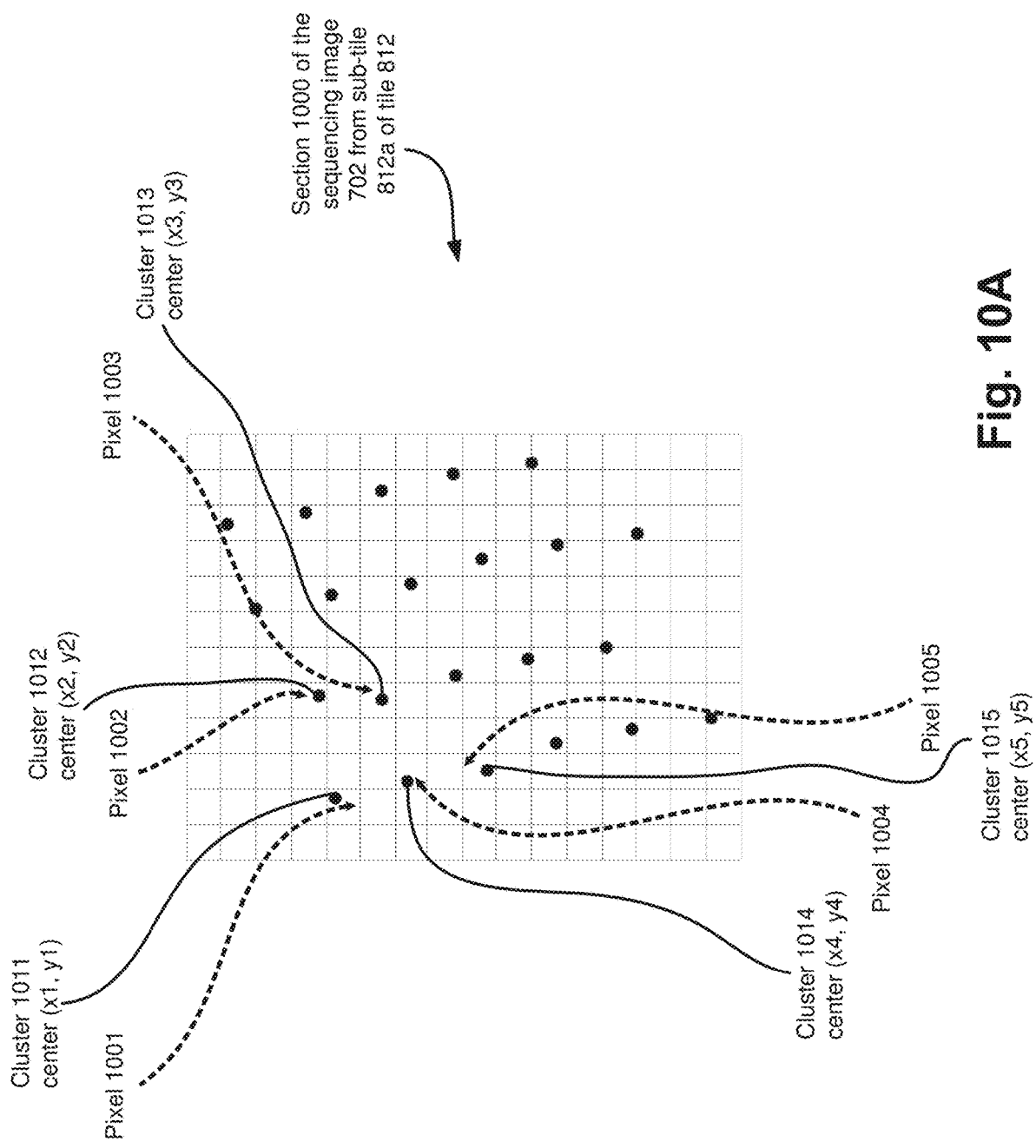

FIGS. 10A-10K, in combination, illustrate various implementations of using the trained sharpening masks 706 of FIGS. 7-8C, to attenuate spatial crosstalk from sensor pixels and to base call clusters using crosstalk-corrected sensor data. Specifically, FIG. 10A illustrates a section 1000 of the sequencing image 702 from a sub-tile of a tile (e.g., sub-tile 812a of tile 812, see FIG. 8A), in which various cluster centers are offset with respect to centers of corresponding pixels.

Although a sub-tile is likely to generate a large number of pixels of the sequencing image 706, the section 1000 of FIG. 10A corresponding to a sub-tile includes merely a few pixels, for purposes of simplicity.

FIG. 10A further illustrates centers of a plurality of clusters within the sub-tile, where the centers of the clusters are superimposed on the section 1000 of the sequencing image 706. Also assume that the section 1000 displayed in FIG. 10 is for a specific color channel. Consider an optical system of a sequencer that uses two different imaging channels: a red channel and a green channel (although the sequencer may generate any different number of color channels, such as 1, 3, 4, or higher). Then, at each sequencing cycle, the optical system produces a red image with red channel intensities and a green image with green channel intensities, which together form a single sequencing image (like RGB channels of a typical color image). In an example, the pixels depicted in FIG. 10 are for a specific color channel.

In FIG. 10A, some of the clusters, whose centers are illustrated using black dots, are labelled. For example, I the X-Y coordinate plane, cluster 1011 has a center disposed at location (x1,y1); cluster 1012 has a center disposed at location (x2,y2); cluster 1013 has a center disposed at location (x3,y3); cluster 1014 has a center disposed at location (x4,y4); and cluster 1015 has a center disposed at location (x5,y5).

In an example, locations (e.g., coordinates) of clusters on a tile are identified using fiducial markers. A solid support upon which a biological specimen is imaged can include such fiducial markers, to facilitate determination of the orientation of the specimen or the image thereof in relation to probes that are attached to the solid support. Exemplary fiducials include, but are not limited to beads (with or without fluorescent moieties or moieties such as nucleic acids to which labeled probes can be bound), fluorescent molecules attached at known or determinable features, or structures that combine morphological shapes with fluorescent moieties. Exemplary fiducials are set forth in U.S. Patent Publication No. 2002/0150909, which is incorporated herein by reference. Thus, in an example, fiducial markers are used to determine the locations of the clusters with respect to the section 1000 of the sequencing image 706, and the coordinates of the clusters illustrated in FIG. 10A.

Note that the center of a cluster may not coincide with a center of a corresponding pixel. For example, the center of the cluster 1011 is within, but off-centered, with respect to a pixel 1001; the center of the cluster 1012 is within, but off-centered, with respect to a pixel 1002; the center of the cluster 1013 is within, but off-centered, with respect to a pixel 1003; the center of the cluster 1014 is within, but off-centered, with respect to a pixel 1004; and the center of the cluster 1015 is within, but off-centered, with respect to a pixel 1005.

FIG. 10B visualizes one example of cluster-to-pixel signals 1033. In one implementation, the sensor pixels are in a pixel plane. The spatial crosstalk is caused by periodical distribution 1037 of clusters in a sample plane (e.g., a flow cell). In one implementation, the clusters are periodically distributed on the flow cell in a diamond shape and immobilized on wells of the flow cell. In another implementation, the clusters are periodically distributed on the flow cell in a hexagonal shape and immobilized on wells of the flow cell. Signal cones 1035 from the cluster are optically coupled to local grids of the sensor pixels through at least one lens (e.g., one or more lenses of overhead or adjacent CCD cameras).

In addition to the diamond shape and hexagonal shape, the clusters can be arranged in other regular shapes such as a square, a rhombus, a triangle, and so on. In yet other implementations, the clusters are arranged on the sample plane in a random, non-periodic arrangement. One skilled in the art will appreciate that the clusters can be arranged on the sample plane in any arrangement, as needed by a particular sequencing implementation.

Figure 10C:
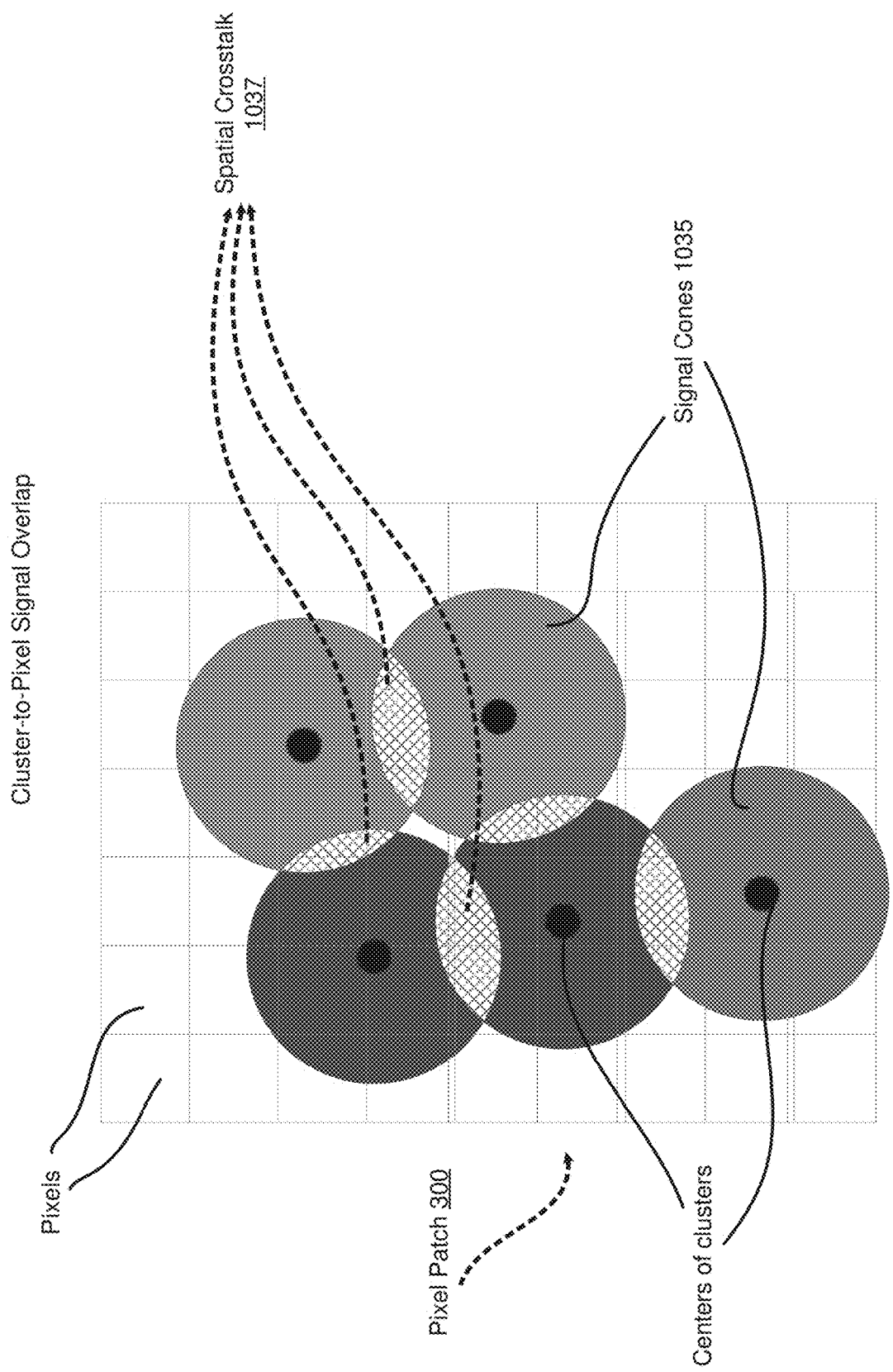

FIG. 10C visualizes one example of cluster-to-pixel signal overlap. The signal cones 1035 (see FIG. 10B) overlap and impinge on the sensor pixels, creating spatial crosstalk 1037.

FIG. 10D visualizes one example of cluster signal pattern. In one implementation, the cluster signal pattern follows an attenuation pattern 1039 in which the cluster signal is strongest at a cluster center and attenuates as it propagates away from the cluster center.

Figure 10E:
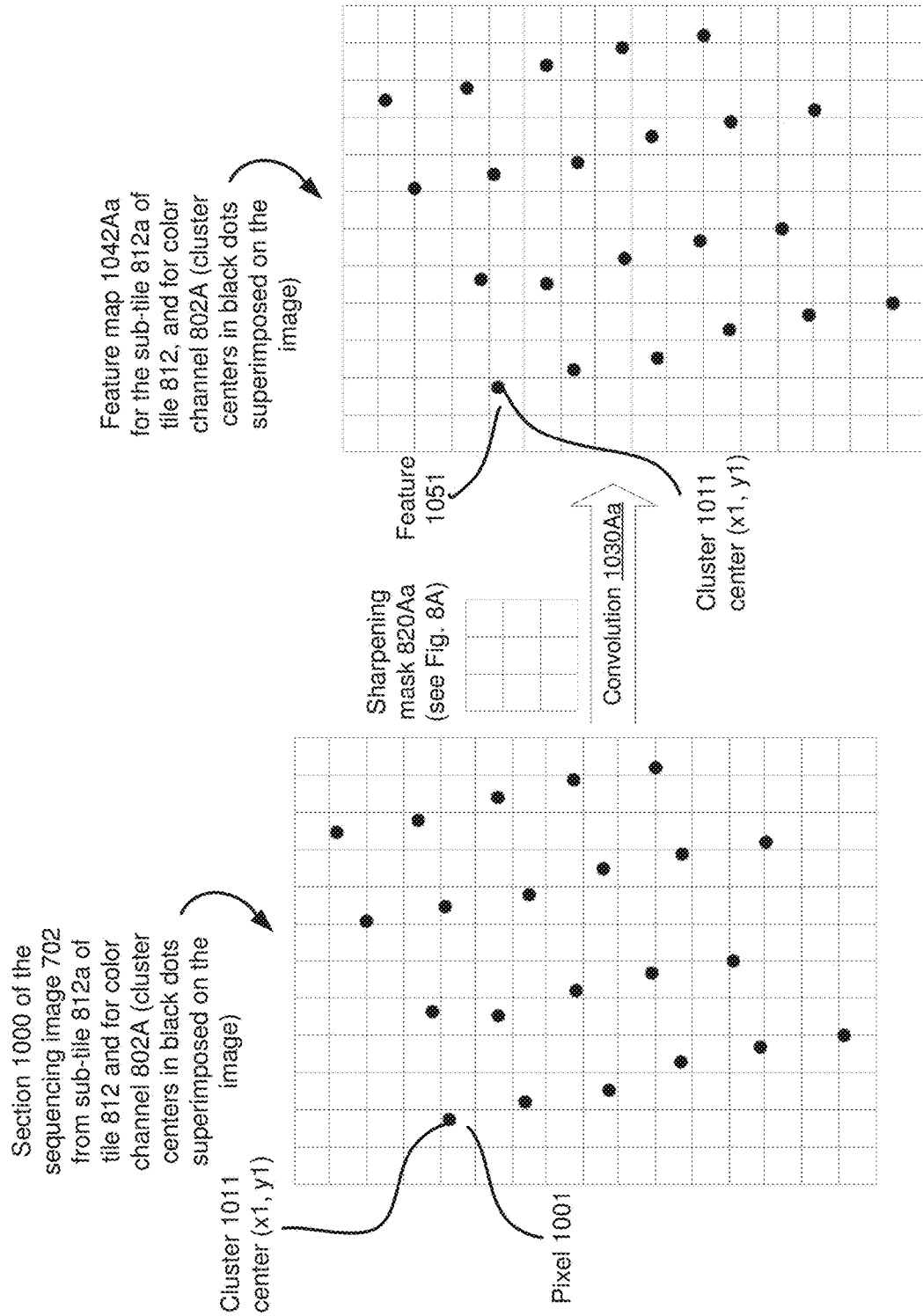

FIG. 10E illustrates a convolution operation 1030Aa, where a sharpening mask 820Aa is convolved with a corresponding section of the sequencing image, to generate a corresponding feature map. In the example of FIG. 10E, a k×k (where k=3 in this example, although k can be another appropriate positive integer) sharpening mask 820Aa (see FIG. 8A) is convolved with the section 1000 of the sequencing image 702 from sub-tile 812a of tile 812 (see FIG. 10A depicting the section 1000), and for color channel 802A. Similar to FIG. 10A, cluster centers in black dots are superimposed on the section 1000 of the sequencing image 702.

Feature map 1042Aa is generated as a result of the convolution operation. Note that the feature map 1042Aa is specific to the sub-tile 812a of the tile 812 and is specific for the color channel 802A. Again, cluster centers in black dots are superimposed on the feature map 1042Aa.

The section 1000 has dimensions w×h, where w (width) and h (height) can be as high as 100,000 or even more, e.g., depending on a size of the sub-tile 812a. Thus, w and h are based on the sectioning of the tile into different sub-tiles. In one implementation, due to the convolution 1030Aa, a dimensionality of the feature map 1042Aa can be different from (e.g., less than) a dimensionality of the section 1000. In another implementation, the dimensionality can be preserved by, for example, appropriately padding the section 1000 prior to the convolution 1030Aa, or by appropriately padding the feature map 1042A after the convolution operation.

The feature map 1042Aa comprises a plurality of features, where each feature corresponds to a respective pixel in the section 1000 of the sequencing image 702. Merely as an example, feature 1051 of the feature map 1042Aa corresponds to the pixel 1001 of the section 1000. For example, during the convolution 1030Aa, the sharpening mask 820Aa is moved across the section 1000, and multiplication and summation operations are performed at each position of the sharpening mask 820Aa. The feature 1051 is generated due to the multiplication and summation operation, e.g., when the sharpening mask 820Aa is convolved with a patch of the section 1000 centering the pixel 1001—thus, the feature 1051 corresponds to the pixel 1001. Similarly, other features of the feature map 1042Aa correspond to respective pixels of the section 1000 (i.e., on-to-one positional mapping between pixels of the section 1000 and features of the feature map 1042Aa).

In the example of FIG. 10E, the locations of the clusters are also superimposed on the features of the feature map 1042Aa. For example, as illustrated in FIG. 10A, the cluster centers of one or more clusters were off centered with respect to the center of the corresponding pixels. Similarly, in FIG. 10E, the cluster centers of one or more clusters are also off centered with respect to the center of the corresponding features.

Figure 10F:
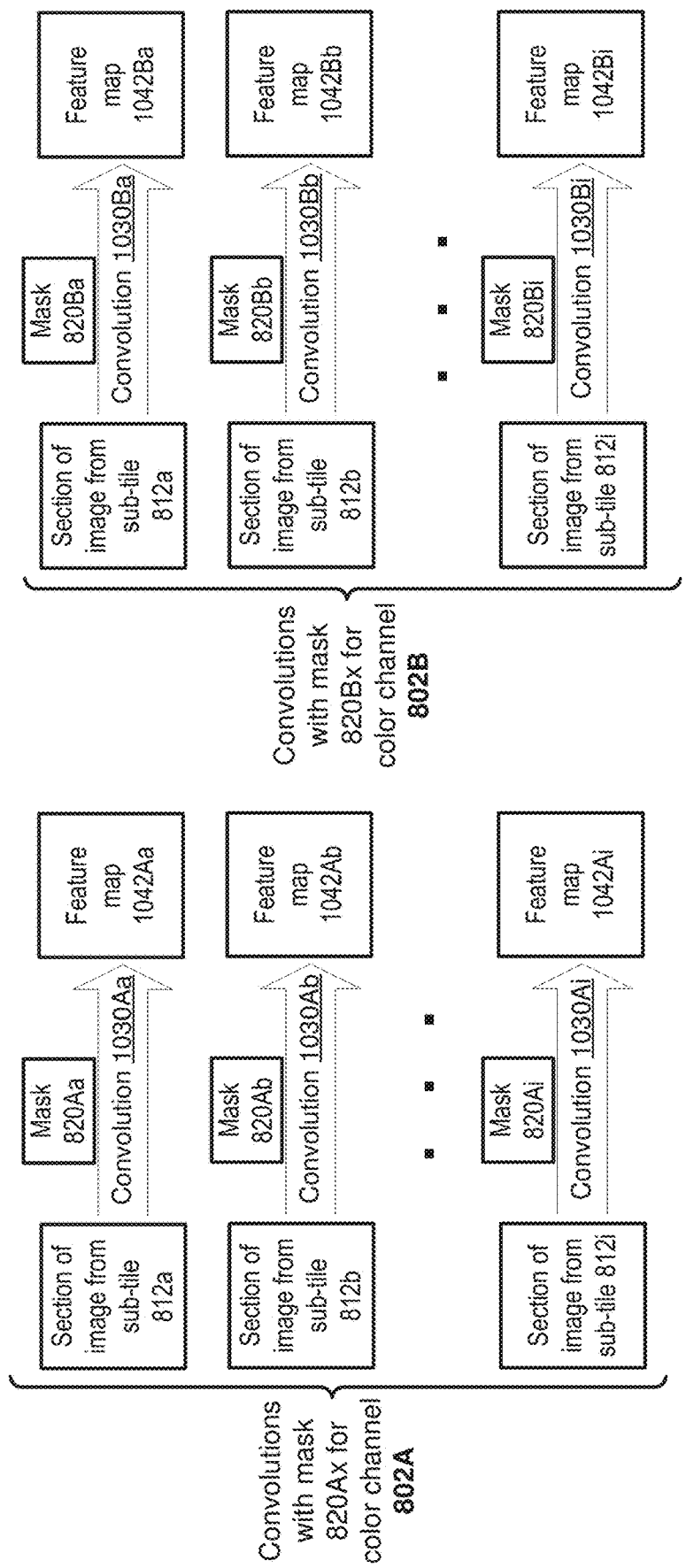

FIG. 10F illustrates a plurality of convolution operations, where each of a plurality of sharpening masks is convolved with a corresponding section of a plurality of sections of the sequencing images 702, to generate a corresponding one of a plurality of feature maps. For example, referring to FIGS. 8A and 10F, the sharpening mask 820Aa is convolved with the section 1000 of the sequencing image 702 corresponding to the sub-tile 812a and for the color channel 802A, to generate corresponding feature map 1042Aa, where this convolution operation is discussed in further detail with respect to FIG. 10E. Similarly, the sharpening mask 820Ab is convolved with a respective section of the sequencing image 702 corresponding to the sub-tile 812b and for the color channel 802A, to generate corresponding feature map 1042Ab. Similarly, the sharpening mask 820Ai is convolved with a respective section of the sequencing image 702 corresponding to the sub-tile 812i and for the color channel 802A, to generate corresponding feature map 1042Ai. Generally speaking, the sharpening mask 820Ax is convolved with a respective section of the sequencing image 702 corresponding to the sub-tile 812x and for the color channel 802A, to generate corresponding feature map 1042Ax, where x=a . . . i. The convolution operations 1030Ax (where x=a . . . i) on the left side of FIG. 10F are for the example color channel 802A.

The convolution operations 1030By (where y=a . . . i) on the right side of FIG. 10F are for the example color channel 802B. For example, the sharpening mask 820Ba is convolved with a respective section of the sequencing image 702 corresponding to the sub-tile 812a and for the color channel 802B, to generate corresponding feature map 1042Ba. Similarly, the sharpening mask 820Bb is convolved with a respective section of the sequencing image 702 corresponding to the sub-tile 812b and for the color channel 802B, to generate corresponding feature map 1042Bb, and so on. Generally speaking, the sharpening mask 820Bx is convolved with a respective section of the sequencing image 702 corresponding to the sub-tile 812y and for the color channel 802B, to generate corresponding feature map 1042By, where y=a . . . i.

As also discussed earlier, the two color channels 802A and 802B are merely examples, and the sequencer can include any different number of color channels, such as one color channel, or three or another higher number of color channels.

Figure 10G:
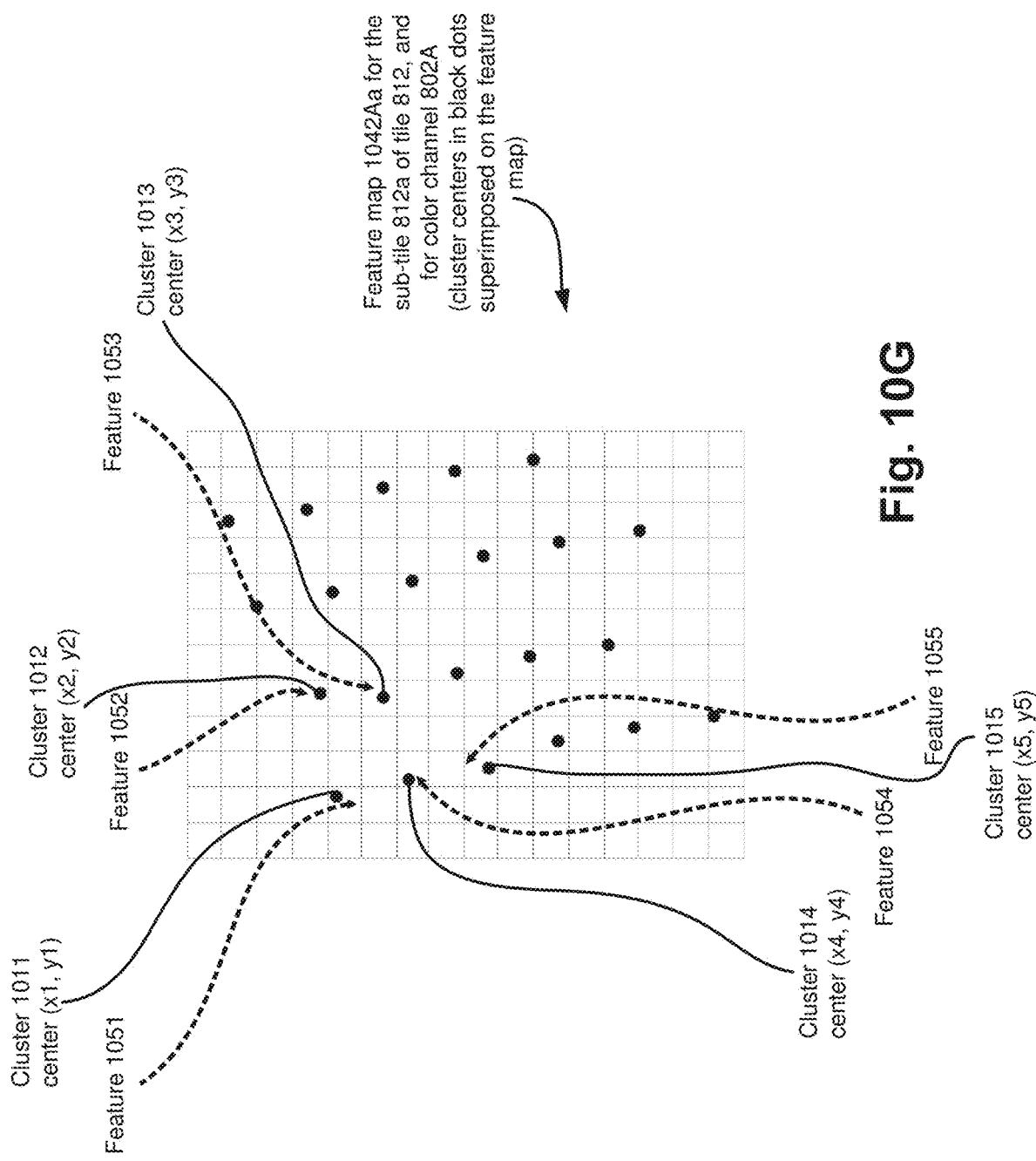

FIG. 10G illustrates the feature map 1042Aa of FIG. 10E in further detail, where some of the features and center of the clusters are labelled. For example, cluster 1011 has a center at location (x1,y1) and within the feature 1051, cluster 1012 has a center at location (x2,y2) and within the feature 1052, and so on (also see FIG. 10A for cluster center coordinates in the section 1000 of the sequencing image).

Figure 10H:
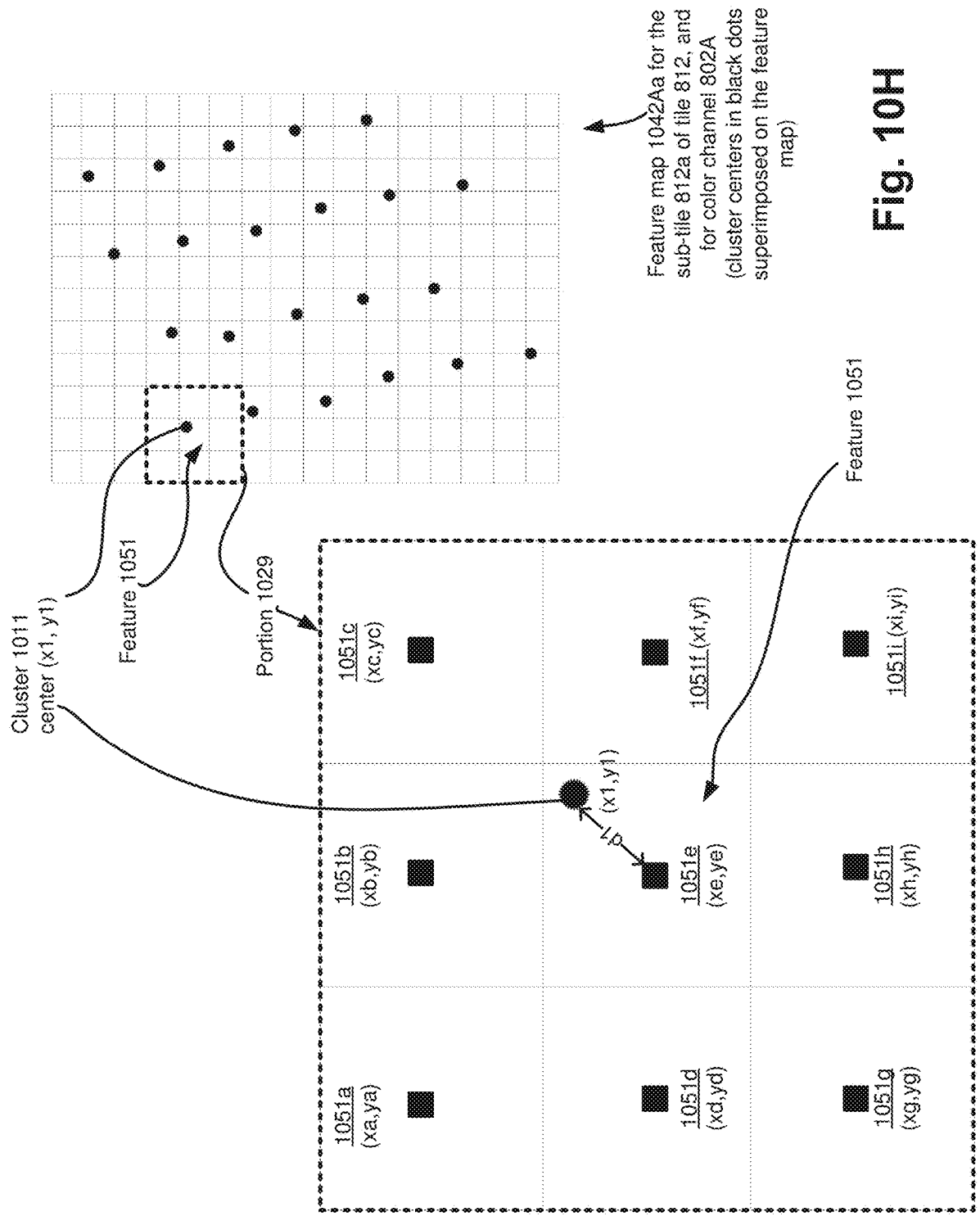

FIG. 10H illustrates the feature map 1042Aa of FIGS. 10E and 10G, wherein a portion 1029 of the feature map 1042Aa including a target cluster 1011 is illustrated in further detail in a zoomed-in view. For example, the view of the portion 1029 of the feature map 1042Aa is amplified or zoomed in, and the center of the cluster 1011 at location (x1,y1) is superimposed on the portion 1029 of the feature map 1042Aa.

As discussed, the cluster 1011 is within the feature 1051 (labelled as 1051e in FIG. 10H), but off centered with respect to a center of the feature 1051e. Eight neighboring features 1051a . . . 1051d. 1051f . . . 1051i, which surround the feature 1051e, are also labelled.

Centers of each feature is represented using black squares in FIG. 10H and some subsequent figures. A center of the feature 1051a has coordinates (xa,ya), a center of the feature 1051b has coordinates (xb,yb), and so on, and a center of the feature 1051i has coordinates (xi,yi), as illustrated in FIG. 10H.

As discussed with respect to FIG. 10E, each feature 1051 (a,e) of FIG. 10H has a corresponding feature value that is generated by the convolution 1030Aa. Referring to FIG. 10H, in an example, the cluster 1011 is assigned a weighted feature value, where the weighted feature value is assigned based on an appropriate interpolation technique. For example, if the center of the cluster 1011 coincides with the center of the feature 1051e, then the feature value of the feature 1051e can be assigned to the cluster 1011. However, as the center of the cluster 1011 does not coincide with the center of the feature 1051*e* in the example of FIG. 10H, the weighted feature value to be assigned to the cluster 1011 is influenced by not only the feature 1051*e*, but also one or more features that are neighboring the feature 1051*e*.

In an embodiment, an appropriate interpolation technique is used to assign a weighted feature value to the cluster 1011, e.g., based on (i) feature value of the feature 1051*e* within which the center of the cluster 1011 resides, (ii) feature values of one or more neighboring features that are within a threshold distance from the center of the cluster 1011, (iii) center-to-center distance between a cluster center and a feature center, (iv) center-to-center distance between a cluster center and a pixel center, and (v) center-to-center distance associated with a cluster.

Note that FIG. 10H is in the feature map domain—i.e., illustrates the feature map 1042A, with the cluster 1011 superimposed on the feature map. Coordinates of the centers of the features and the center of the cluster 1011 are also illustrated. As the name implies, center-to-center distance between a cluster center and a feature center refers to the distance between a center of a cluster and a center of a feature, and is also referred to as center-to-center distance between cluster and feature. For example, center-to-center distance d1 between the cluster 1011 and the feature 1051*e* is the distance between the coordinates (x1,y1) and (xe,ye), determined, for example, as:

$$d1 = \sqrt{(x1-xe)^2 + (y1-ye)^2}$$

Similarly, center-to-center distance between the cluster 1011 and any other feature may also be determined.

On the other hand, a center-to-center distance between a cluster center and a pixel center, also referred to as center-to-center distance between cluster and pixel, refers to a distance between a center of a cluster and a center of a pixel. For example, referring to FIG. 10A, illustrated is the section 1000 of the sequencing image 702. Similar to FIG. 10H, coordinates of center of various pixels can be determined, and accordingly, center-to-center distance between the cluster 1011 and various pixels can also be determined.

For example, FIG. 10I illustrates the convolution operation 1030Aa of FIG. 10E, and further illustrates a center-to-center distance d2 between the cluster 1011 and the pixel 1011, as well as a center-to-center distance d1 between the cluster 1011 and the feature 1051*e*. Note that as discussed with respect to FIG. 10E, the feature 1051*e* corresponds to the pixel 1011. For example, during the convolution 1030Aa, the sharpening mask 820Aa is moved across the section 1000, and multiplication and summation operations are performed at each position of the sharpening mask 820Aa. The feature 1051*e* is generated due to the multiplication and summation operation, e.g., when the sharpening mask 820Aa is convolved with a patch of the section 1000 centering the pixel 1001—thus, the feature 1051 corresponds to the pixel 1001. Thus, the position of the cluster 1011 relative to the center of the pixel 1001 is same as the position of the cluster 1011 relative to the center of the feature 1051*e*. That is, the distances d1 and d2 are the same.

For at least some of the interpolation operations discussed herein later, either of (i) the center-to-center distance between cluster and pixel, or (ii) the center-to-center distance between cluster and feature may be used. For example, one implementation may use the center-to-center distance between cluster and pixel, while another implementation may use the center-to-center distance between cluster and feature—these two center-to-center distances are numerically the same.

Some of the interpolation examples discussed herein later discusses the center-to-center distance between cluster and feature. However, as will be readily appreciated by those skilled in the art, the center-to-center distance between cluster and pixel may also be used instead.

For the purposes of this disclosure and unless mentioned otherwise, a center-to-center distance associated with a cluster implies a center-to-center distance between the cluster and a corresponding pixel, or a center-to-center distance between the cluster and a corresponding feature.

In an example, a subpixel position of a cluster comprises a position of a center of the cluster relative to a boundary of a pixel or a center of the pixel within which the cluster is located. For example, if the pixel 1001 of FIG. 10I is divided into a grid of 3×3 subpixels, then the cluster 1011 is likely to be included within a top-right subpixel of the pixel 1001.

In an example, a sub-feature position of a cluster comprises a position of a center of the cluster relative to a boundary of a feature or a center of the feature within which the cluster is located. For example, if the feature 1051*e* of FIG. 10I is divided into a grid of 3×3 sub-features, then the cluster 1011 is likely to be included within a top-right sub-feature of the pixel 1001.

Interpolation for Determining Weighted Feature Value of a Target Cluster

As discussed with respect to FIG. 10H herein above, any appropriate interpolation technique may be used to assign the weighted feature value to the cluster 1011, e.g., based on (i) feature value of the feature 1051*e* within which the center of the cluster 1011 resides, and (ii) feature values of one or more neighboring features that are within a threshold distance from the center of the cluster 1011. Some such interpolation techniques are discussed herein below. Note that the list of interpolation techniques discussed below is not exclusive, and another appropriate interpolation technique known to those skilled in the art may also be used.

A. Nearest Neighbor Interpolation

In this interpolation technique, a feature nearest to the cluster 1011 is determined, and the feature value of the nearest feature is assigned to the cluster 1011. As illustrated in FIG. 10H, the center of the feature 1051*e* at location (xe,ye) is closest to the center (x1,y1) of the cluster 1011. Accordingly, the cluster 1011 is assigned the feature value of the feature 1051*e*.

Thus, this technique involves determining center-to-center distances, where for example, a center-to-center distance between the center of the cluster 1011 (i.e., coordinate (x1,y1)) and centers of neighboring features are determined (although center-to-center distance between cluster and pixels can also be used). The feature corresponding to the nearest center-to-center distance is selected as being the nearest neighbor, and the feature value of the nearest feature is assigned to the cluster. Note that the interpolation is also based on subpixel or sub-feature location of the cluster.

B. Average of Nearest Neighbor Interpolation

Another example interpolation technique involves averaging feature values of n number of nearest neighboring pixels, where n is an appropriate integer, such as 1, 4, 9, or the like. For example, assuming n=4, then the weighted feature value assigned to the cluster 1011 is an average of feature values of nearest four neighboring features, which are features 1051*b*, 1051*c*, 1051*e*, and 1051*f* in the example of FIG. 10H. Thus, this technique involves determining center-to-center distances between the center of the cluster

1011 (i.e., coordinate (x1,y1)) and centers of neighboring features (although center-to-center distances between the cluster and neighboring pixels can also be used). Four nearest features are selected, and their intensities are averaged, to determine the weighted feature value to be assigned to the cluster 1011. Thus, the interpolation is also based on subpixel or sub-feature location of the cluster. Note that n=4 is merely an example, and n can be any other appropriate value, as would be readily appreciated by those skilled in the art based on the teachings of this disclosure.

C. Bilinear Interpolation

In an embodiment, bilinear interpolation may be used to determine weighted feature value to be assigned to the cluster 1011, based on feature values of adjacent features.

Bilinear interpolation is an extension of linear interpolation for interpolating functions of two variables (e.g., x and y) on a rectilinear 2D grid. Bilinear interpolation is performed using linear interpolation first in one direction, and then again in the other direction. Although each step is linear in the sampled values and in the position, the interpolation as a whole is not linear but rather quadratic in the sample location. Bilinear interpolation is one of the basic resampling techniques in computer vision and image processing, where it is also called bilinear filtering or bilinear texture mapping.

Figure 10J:
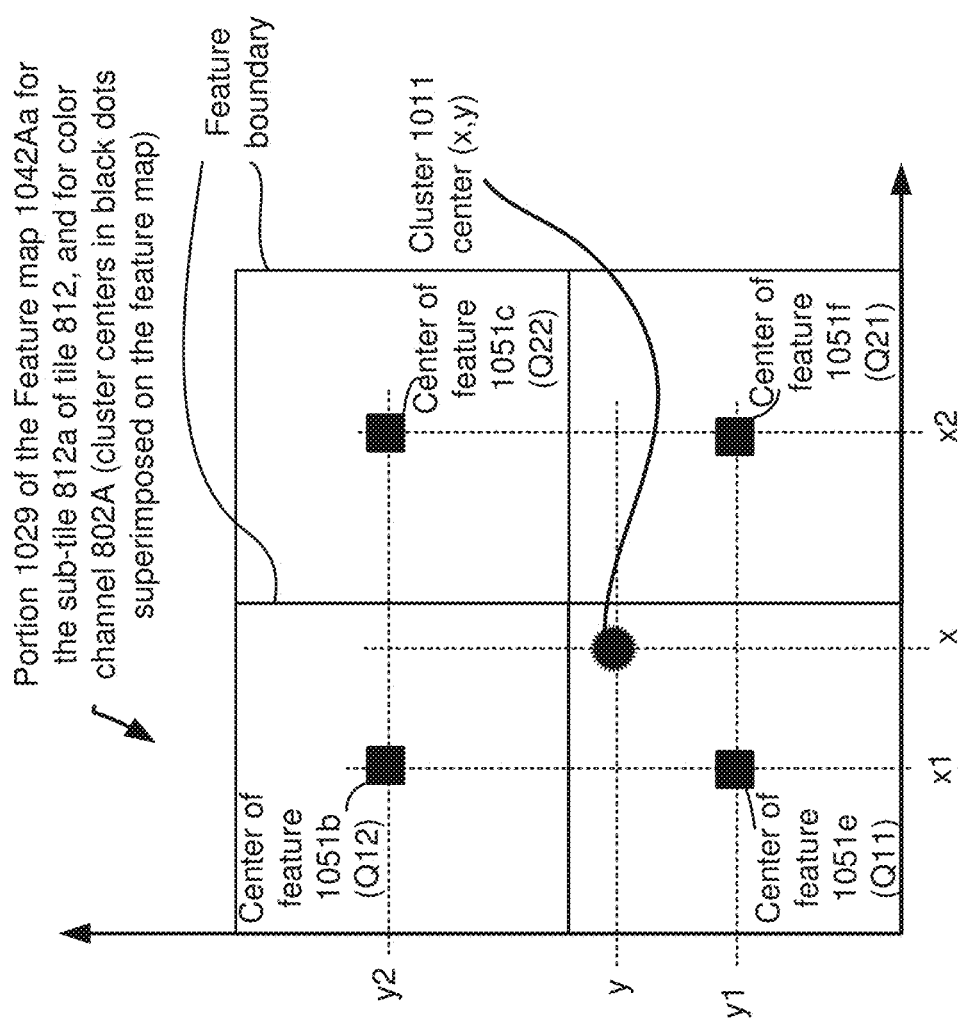

FIG. 10J illustrate an example scheme depicting bilinear interpolation. In FIG. 10J, four features 1051b, 1051e, 1051c, and 1051f are four nearest features to a center of the cluster 1011 (see FIG. 10H for further detail), and the features values of the features 1051b, 1051e, 1051c, and 1051f are to be bilinearly interpolated to generate a weighted feature value for the cluster 1011.

Assume that the coordinate of the center of the feature 1051b is (x1,y2); the coordinate of the center of the feature 1051e is (x1,y1); the coordinate of the center of the feature 1051c is (x2,y2); the coordinate of the center of the feature 1051f is (x2,y1); and the coordinate of the center of the cluster 1011 is (x,y), as illustrated in FIG. 10J. Note that such labelling of the coordinates is contrary to the labelling of FIG. 10H. The coordinates of the centers are labelled in this manner in FIG. 10J for purposes of simplicity.

Assume that the features 1051b, 1051e, 1051c, and 1051f are labelled as Q12, Q11, Q22, and Q21, respectively, based on the above discussed coordinates. The feature values of the features 1051b, 1051e, 1051c, and 1051f are accordingly labelled as f(Q12), f(Q11), f(Q22), and f(Q21), respectively, which are known. For example, during the convolution operation discussed with respect to FIG. 10E, the feature values f(Q12), f(Q11), f(Q22), and f(Q21) are determined.

Bilinear interpolation aims to interpolate the feature values f(Q12), f(Q11), f(Q22), and f(Q21) to the cluster center at (x,y), to assign a weighted feature value to the cluster 1011.

Initially, linear interpolation in the x-direction is performed for coordinates (x,y1) and (x,y2), as follows:

$$f(x, y_1) = \frac{x_2 - x}{x_2 - x_1} f(Q_{11}) + \frac{x - x_1}{x_2 - x_1} f(Q_{21}),$$

$$f(x, y_2) = \frac{x_2 - x}{x_2 - x_1} f(Q_{12}) + \frac{x - x_1}{x_2 - x_1} f(Q_{22}).$$

Then, linear interpolation in the y-direction is performed for coordinate (x,y), as follows:

$$\begin{aligned} f(x, y) &= \frac{y_2 - y}{y_2 - y_1} f(x, y_1) + \frac{y - y_1}{y_2 - y_1} f(x, y_2) \\ &= \frac{y_2 - y}{y_2 - y_1} \left( \frac{x_2 - x}{x_2 - x_1} f(Q_{11}) + \frac{x - x_1}{x_2 - x_1} f(Q_{21}) \right) + \\ &\quad \frac{y - y_1}{y_2 - y_1} \left( \frac{x_2 - x}{x_2 - x_1} f(Q_{12}) + \frac{x - x_1}{x_2 - x_1} f(Q_{22}) \right) \\ &= \frac{1}{(x_2 - x_1)(y_2 - y_1)} (f(Q_{11})(x_2 - x)(y_2 - y) + \\ &\quad f(Q_{21})(x - x_1)(y_2 - y) + f(Q_{12})(x_2 - x) \\ &\quad (y - y_1) + f(Q_{22})(x - x_1)(y - y_1)) \\ &= \frac{1}{(x_2 - x_1)(y_2 - y_1)} [x_2 - x \ x - x_1] \begin{bmatrix} f(Q_{11}) & f(Q_{12}) \\ f(Q_{21}) & f(Q_{22}) \end{bmatrix} \begin{bmatrix} y_2 - y \\ y - y_1 \end{bmatrix} \end{aligned}$$

Thus, f(x,y) provides the weighted feature at coordinate (x,y) using bilear interpolation, which is the center of the cluster 1011. Thus, f(x,y) is the weighted feature assigned to the cluster 1011.

D. Bicubic Interpolation

In mathematics, bicubic interpolation is an extension of cubic interpolation for interpolating data points on a two-dimensional regular grid. The interpolated surface is smoother than corresponding surfaces obtained by bilinear interpolation or nearest-neighbor interpolation. Bicubic interpolation can be accomplished using either Lagrange polynomials, cubic splines, or cubic convolution algorithm. In an example, bicubic interpolation is sometimes chosen over bilinear or nearest-neighbor interpolation in image resampling, when processing speed is not an issue.

In contrast to the above discussed bilinear interpolation that takes four neighboring features into account when determining the weighted feature value for the cluster 1011, bicubic interpolation considers 16 feature values (such as in a grid of 4×4 features surrounding the center of the cluster 1011). For example, center-to-center distance between the cluster center and feature centers (or pixel centers, as discussed herein previously) are considered, to select a 4×4 grid of features that are nearest to the cluster center. Then, the feature values of the 4×4 grid of features are used to determine the weighted feature value of the cluster 1011, e.g., in accordance with bicubic interpolation.

E. Interpolation Based on Weighted Area Coverage

Figure 10K:
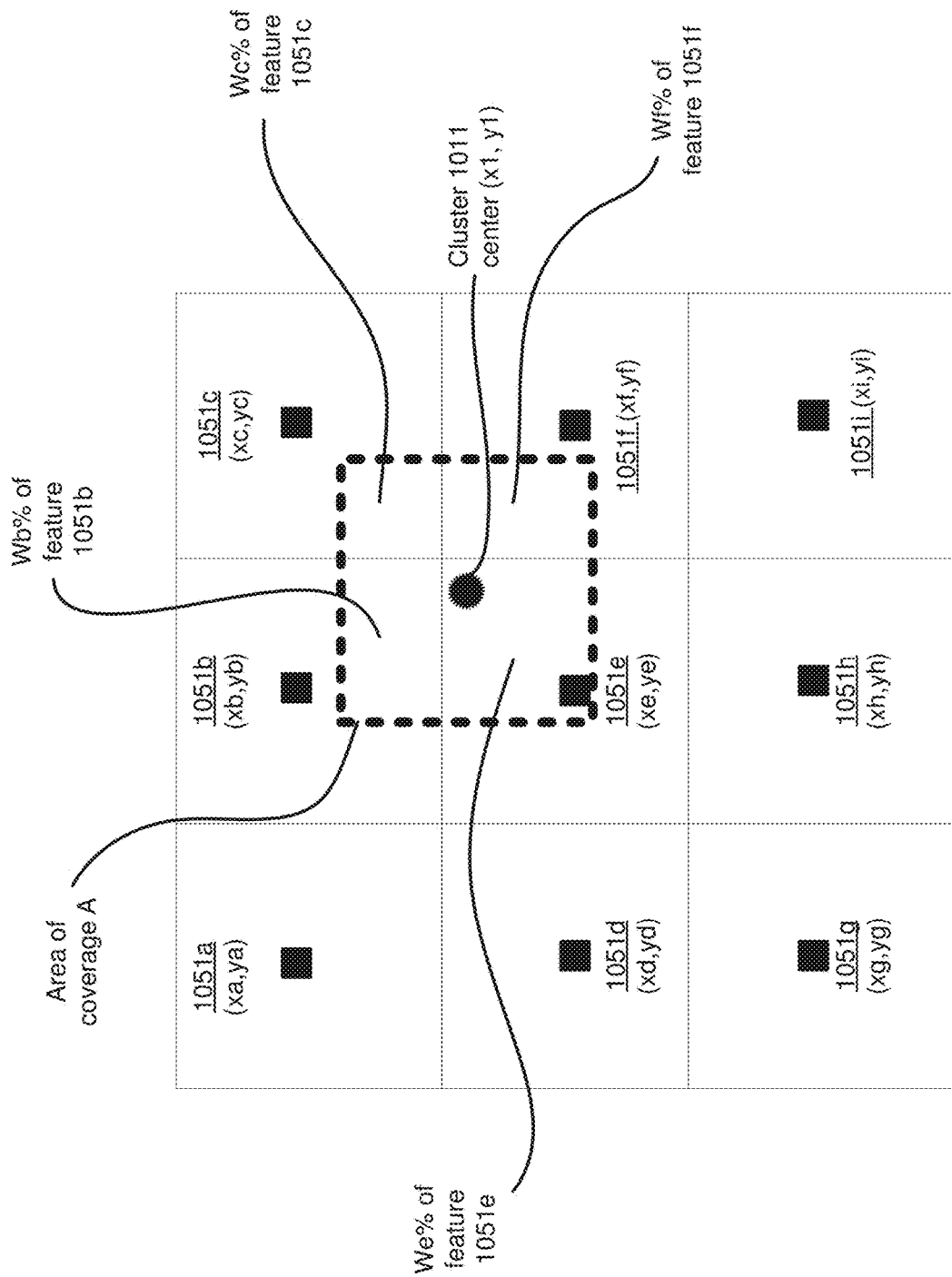

Another interpolation technique assigns weighted feature values to the cluster 1011, based on an area of coverage around the central cluster, as illustrated in FIG. 10K. For example, as illustrated in FIG. 10K, an area of coverage A is drawn around the cluster 1011, such that a center of the cluster 1011 and a center of the area of coverage A coincides. In an example, the area of coverage A has a square shape. In an example, the area of coverage A has a size that is equal to, merely as an example, a size of a feature. Assume, for example, that the area of coverage A covers Wb % of feature 1051b, Wc % of feature 1051c, Wf % of feature 1051f, and We % of feature 1051e. Then, the weighted feature value assigned to the cluster 1011 would be:

Weighted feature value of cluster 1011 =

$$\sum_{p=b,c,e,f} (Wp \times (\text{feature value of feature } 1051p))$$

Note that FIG. 10K assumes that the area of coverage A has a size that is equal to a size of a feature. In another example, the area of coverage A may have a size that is equal to, for example, twice or thrice a size of a feature, or may even be a non-integer multiple of a feature (e.g., 1.5 times a size of a feature, for example). In such an example, the weighted feature value of cluster 1011 can be based on feature values of more than four features, as would be readily appreciated by those skilled in the art based on the teachings of this disclosure.

F. Other Example Interpolation Techniques

Some examples of interpolation techniques are discussed herein above. In an embodiment, any other appropriate interpolation technique may also be used. For example, Lanczos resampling or Lanczos interpolation may be used for interpolation, to determine the weighted feature value to be assigned to the cluster 1011. Lanczos filtering and Lanczos resampling are two applications of a mathematical formula, which can be used to smoothly interpolate the value of a digital signal between its samples. For example, the technique maps each sample of the given signal to a translated and scaled copy of a Lanczos kernel, which is a sinc function windowed by the central lobe of a second, longer, sinc function. The sum of these translated and scaled kernels is then evaluated at the desired points. The filter is named after its inventor, Cornelius Lanczos.

Another example type of interpolation technique uses Hanning window, which can be used for interpolation to determine the weighted feature value to be assigned to the cluster 1011. In signal processing and statistics, a window function is a mathematical function that is zero-valued outside of some chosen interval, normally symmetric around the middle of the interval, usually near a maximum in the middle, and usually tapering away from the middle. Hanning window, also known as raised cosine because of zero-phase version, is an example of a window function. Unlike the Hamming window, the end points of the Hanning window just touch zero. In an embodiment, another appropriate window function may also be used for interpolation.

Base Calling

Subsequent to the interpolation discussed herein above, the weighted feature value(s) of a cluster is fed as input to the base caller 704, to produce a base call for that cluster. The base caller 704 can be a non-neural network-based base caller or a neural network-based base caller, examples of both are described in applications incorporated herein by reference such as U.S. Patent Application No. 62/821,766 and U.S. patent application Ser. No. 16/826,168.

As discussed, the assignment of the weighted feature value to a cluster maximizes or increases a signal to noise ratio, and reduces spatial cross talk between adjacent clusters. For example, due to the convolution (see FIG. 10E) and the interpolation, spatial cross talk between adjacent clusters is reduced or eliminated. For example, the coefficients of the sharpening masks 820 are tuned in a manner that maximizes or increase the signal-to-noise ratio. The signal maximized or increased in the signal-to-noise ratio is the intensity emissions from a target cluster, and the noise minimized or reduced in the signal-to-noise ratio is the intensity emissions from the adjacent cluster, i.e., spatial crosstalk, plus some random noise (e.g., to account for background intensity emissions).

Once a weighted feature value is assigned to a cluster, a base call is made by the base caller for the cluster, based on the weighted feature value assigned to the cluster. Thus, for a sequencing run comprising a plurality of sequencing cycles, sequencing images 702 are generated for each sequencing cycle. The sequencing images 702, for a given sequencing cycle, includes images for a plurality of clusters and for one or more color channels.

For example, as discussed, for a specific sequencing cycle, a first weighted feature value can be assigned to a specific cluster for a first color channel, and a second weighted feature value can be assigned to the specific cluster for a second color channel (e.g., assuming that there are two color channels, although there may be one, three, or any other higher number of color channels). In such an example, the base call for the specific cluster and for the specific sequencing cycle can be based on the first weighted feature and the second weighted feature. Further details of base calling are described in applications incorporated herein by reference such as U.S. Patent Application No. 62/821,766 and U.S. patent application Ser. No. 16/826,168.

Base Calling Method Using Convolution and Interpolation, and Performance Results FIG. 11A illustrates a method 1100 of base calling, based on convolution of at least a section of a sequencing image and subsequent interpolation to assign one or more weighted feature values to a cluster, and base calling the cluster based on the assigned one or more weighted feature values.

At 1104 of the method 1100, for a specific sequencing cycle of a sequencing run, sequencing images (e.g., sequencing images 702 of FIG. 7) output by the flow cell (e.g., flow cell discussed with respect to FIG. 1) during the corresponding sequencing cycle is accessed by a base caller, such as the base caller 704 of FIG. 7.

At 1108, the sequencing image is sectioned in a plurality of sections, based on color channels and/or spatial portions of the flow cell, where each section of the sequencing image includes, for a corresponding color channel, a plurality of clusters.

For example, in FIG. 8A, each tile of the flow cell is divided in 3×3 spatial portions, and thus, the sequencing image generated from a tile for a specific color channel is sectioned in a corresponding 3×3 section. Furthermore, in FIG. 8A, without limiting the scope of this disclosure and merely as an example, two color channels are assumed. Accordingly, for a specific tile, the sequencing image is sectioned in first 3×3 section for a first color channel and second 3×3 section for a second color channel.

Similarly, in the example of FIG. 8B, each tile of the flow cell is divided in 1×9 portions, and thus, the sequencing image generated from a tile for a specific color channel is sectioned in a corresponding first 1×9 section for a first color channel and second 1×9 section for a second color channel (i.e., assuming two color channels).

Other example sectioning of the sequencing images can also be envisioned by those skilled in the art based on the teachings of this disclosure, e.g., for different example portioning of a tile and a different number of color channels.

The method 1100 then proceeds to 1112, where each section of the sequencing image is convolved with a corresponding sharpening mask, to generate a corresponding feature map for a corresponding the section, such that a plurality of feature maps is generated for the plurality of sections. For example, as discussed with respect to FIGS. 8A and 8B, each section of the sequencing image has a corresponding sharpening mask. As illustrated in FIG. 10F, each section of the sequencing image is convolved with the corresponding sharpening mask, to generate a corresponding feature map. FIG. 10E illustrates a convolution operation for a specific section of the sequencing image.

Note that each section of the sequencing image has a corresponding plurality of clusters. For example, assume a first section and a second section of the sequencing image are generated for a first color channel and a second color channel, respectively, and are generated from a same first sub-tile portion of a tile-accordingly, both the first section and the second section will have the same first plurality of clusters. In another example, assume that a third section and a fourth section of the sequencing image are generated for the first color channel and the second color channel, respectively, and are generated from a same second sub-tile portion of a tile. Accordingly, both the third section and the fourth section will have the same second plurality of clusters that are different from the first plurality of clusters.

The method 1100 then proceeds to 1116, where for each cluster within each features map, a weighted feature value is assigned to the cluster, based on an appropriate interpolation technique, such that each cluster has one or more corresponding weighted feature values for one or more color channels. For example, assuming a two color channel example, each cluster is assigned two weighted feature values corresponding to the two color channels. Some example interpolation techniques are discussed herein previously, although any other interpolation techniques not discussed herein may also be used.

The method 1100 then proceeds to 1120, where the base caller calls the base of each cluster, based on the corresponding one or more weighted feature values for the corresponding cluster. For example, the weighted feature values of a cluster are fed as input to the base caller 704, to produce a base call for that cluster. The base caller 704 can be a non-neural network-based base caller or a neural network-based base caller, examples of both are described in applications incorporated herein by reference such as U.S. Patent Application No. 62/821,766 and U.S. Patent Application Ser. No. 16/826,168.

The method 1100 then proceeds to 1124, where the method 1100 proceeds to a next sequencing cycle of the sequencing run, and the method 1100 loops back to 1104. This iteration of the method 1100 continues, until all the sequencing cycles of the sequencing run is complete.

Figure 11B:
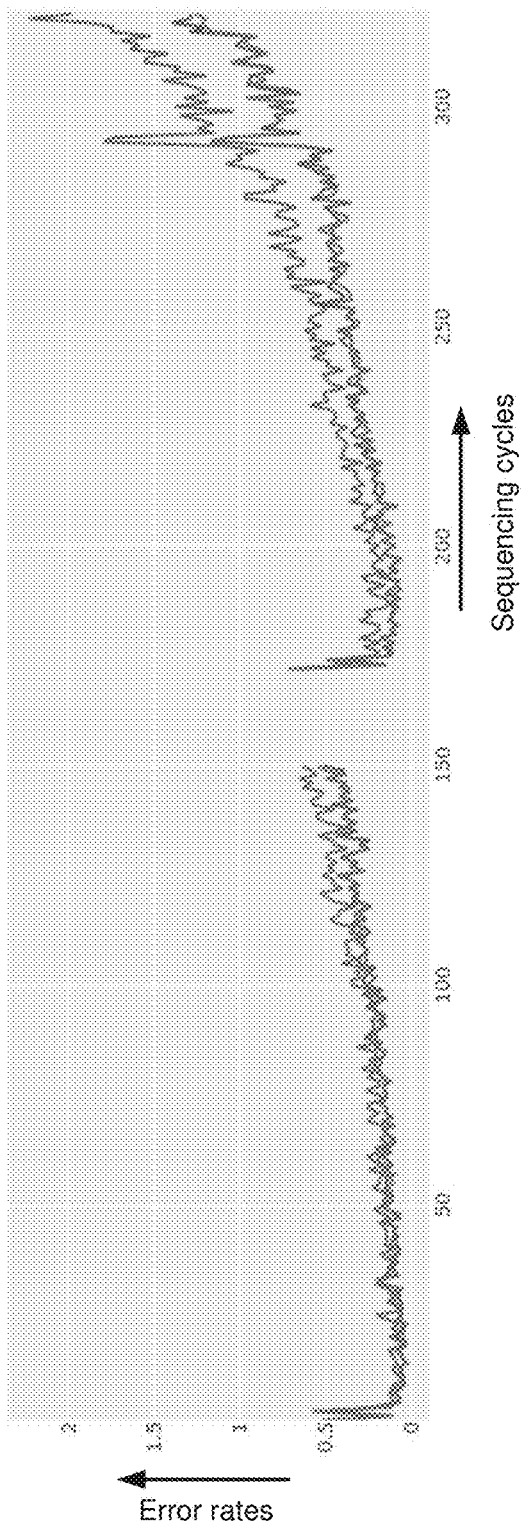
FIG. 11B illustrates comparison of performance results of the disclosed intensity extraction techniques using sharpening masks, with various other intensity extraction techniques associated with base calling.

FIG. 11B illustrates comparison of performance results of the disclosed intensity extraction techniques using sharpening masks, with various other intensity extraction techniques associated with base calling. The X axis of the plot of FIG. 11B represents the sequencing cycles, and the Y axis of the plot represents error rates for base calling. For example, the red line in the plot is for base calling without use of sharpening mask for intensity extraction; and the green line in the plot is for base calling with sharpening mask using equalizer techniques, as disclosed in co-pending U.S. patent application Ser. No. 17/308,035, entitled "EQUALIZATION-BASED IMAGE PROCESSING AND SPATIAL CROSSTALK ATTENUATOR," which is incorporated by reference for all purposes as if fully set forth herein. The blue line in the plot is for base calling with sharpening mask using techniques discussed herein with respect to FIGS. 7-11A. As seen, the blue line in the plot (for base calling with sharpening mask using techniques discussed) has substantially lower error rate than the red line in the plot (for base calling without use of sharpening mask for intensity extraction).

FIG. 11B also depicts a table illustrating average error rates for base calling and average pass filter percentage. The pass filter percentage represents a fraction of clusters that have good quality base calls (e.g., base calls having confidence levels above a threshold percentage), and are base called. So, a higher pass filter percentage improves throughput. As seen, base calling with sharpening mask using techniques discussed herein (represented in the third column of the table) has a lower error rate and a better pass filter percentage than the scenario using no sharpening mask (represented in the first column of the table). Furthermore, base calling with sharpening mask using techniques discussed herein (represented in the third column of the table) has slightly lower error rate and slightly higher pass filter percentage, relative to the scenario that uses sharpening mask using equalizer techniques, as disclosed in co-pending U.S. patent application Ser. No. 17/308,035, entitled "EQUALIZATION-BASED IMAGE PROCESSING AND SPATIAL CROSSTALK ATTENUATOR," also referred to herein as "scenario that uses sharpening mask using equalizer techniques". Note that the base calling with sharpening mask using techniques discussed herein uses lower number of sharpening mask and has faster execution time, compared to the scenario that uses sharpening mask using equalizer techniques, as will be discussed herein with respect to FIG. 11C.

Figure 11C:
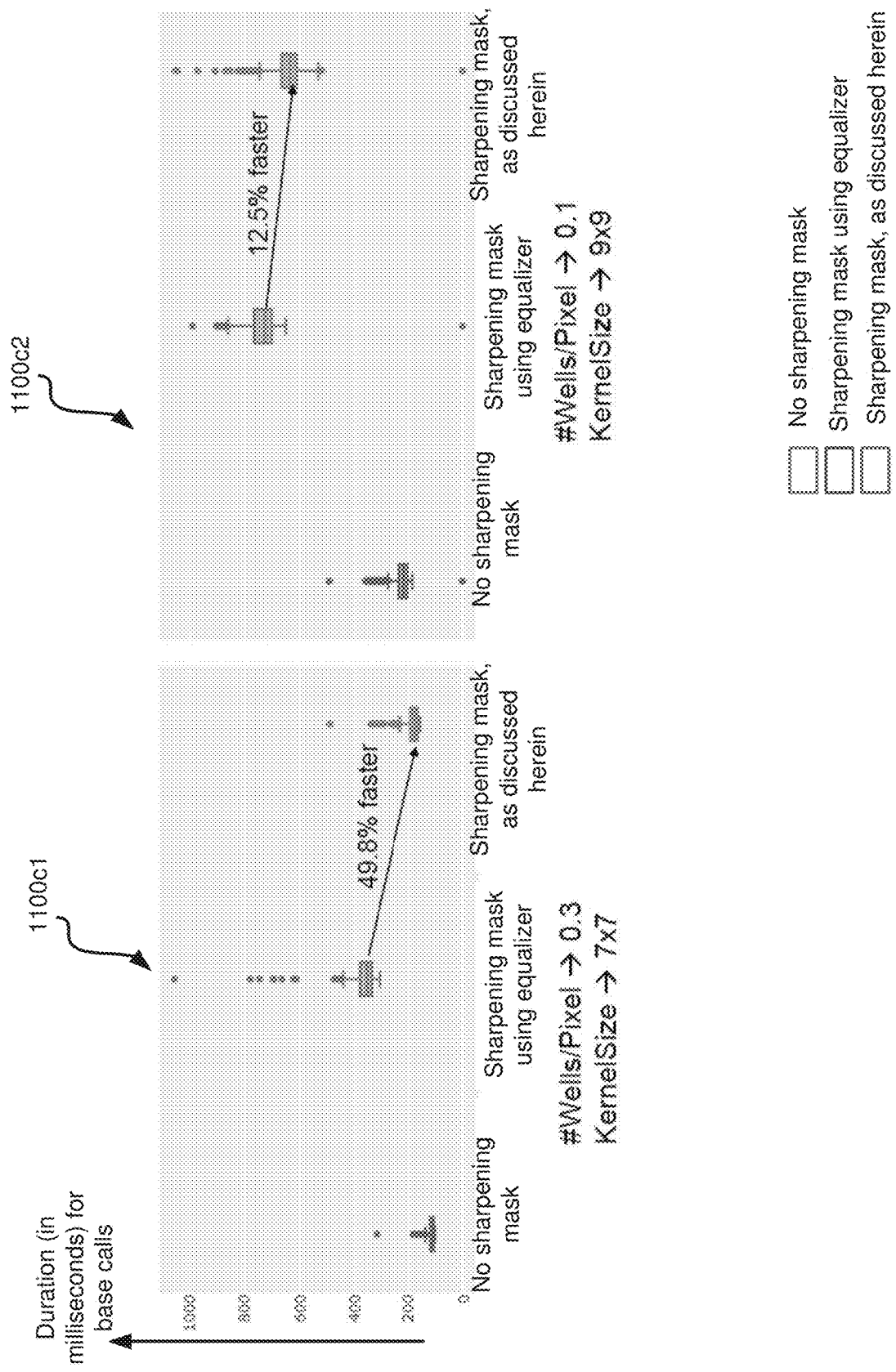
FIG. 11C illustrates comparison of other performance results of the disclosed techniques using sharpening masks, with various other techniques of base calling.

FIG. 11C illustrates another comparison of performance result of the disclosed techniques using sharpening masks, with various other techniques of base calling. Specifically, the speed of base calling (or base calling execution time) for various scenarios is compared in FIG. 11C.

Two plots are illustrated, plot 1100$c1$ and 1100$c2$. The plot 1100$c1$ is generated using sequencing data from a new sequencing platform under development, and the plot 1100$c2$ is generated using sequencing data from Illumina NextSeq 1000/NextSeq 2000 sequencers. Furthermore, for plot 1100$c1$, the number of wells or cluster per pixel is 0.3 and the kernel (or sharpening mask) size used in 7×7. For plot 1100$c2$, the number of wells or cluster per pixel is 0.1 and the kernel (or sharpening mask) size used in 9×9. Thus, the plot 1100$c1$ has a higher cluster density compared to the plot 1100$c2$.

As seen in the plot 1100$c2$, base calling with sharpening mask using techniques discussed herein (represented in green) is 12.5% faster than a scenario that uses sharpening mask using equalizer techniques. The improvement in performance is even more prominent in the plot 1100$c1$ that has a higher cluster density. For example, in the plot 1100$c1$, base calling with sharpening mask using techniques discussed herein (represented in green) is 49.8% faster than a scenario that uses sharpening mask using equalizer techniques.

Regular Cache Access

The scenario that uses sharpening mask using equalizer techniques (as disclosed in co-pending U.S. patent application Ser. No. 17/308,035, entitled "EQUALIZATION-BASED IMAGE PROCESSING AND SPATIAL CROSSTALK ATTENUATOR") uses different sharpening mask for different clusters. e.g., depending on a sub-pixel location of the cluster relative to a center of a pixel. Thus, for example, three adjacent clusters on a tile of the flow cell can arguably use three different sharpening masks.

In contrast, for the intensity extraction techniques disclosed in this disclosure (e.g., with respect to FIGS. 7-11A), clusters on an entire sub-tile region of a tile use the same sharpening mask. For example, referring to FIG. 8A, all clusters on the sub-tile 812$a$ uses the same sharpening mask 820Aa for the color channel 802A. Thus, in an example, when processing clusters on the sub-tile 812$a$ for the color channel 802A, the corresponding sharpening mask 820Aa is loaded in the cache, and the same sharpening mask 820Aa is repeatedly accessed from the cache during the convolution operation 1030Aa of FIG. 10F. In another example, once the sharpening mask 820Aa is loaded in a processing unit from the cache, the same sharpening mask 820Aa is used for entirety of the convolution operation 1030Aa. This improves cache access pattern, which is relatively more regular (i.e., regular cache access pattern) and results in less or no cache miss.

In contrast, as discussed, for the scenario that uses sharpening mask using equalizer techniques (as disclosed in co-pending U.S. patent application Ser. No. 17/308,035, entitled "EQUALIZATION-BASED IMAGE PROCESSING AND SPATIAL CROSSTALK ATTENUATOR"), different adjacent clusters on a tile of the flow cell can use corresponding different sharpening masks, which results in relatively irregular cache access pattern and higher number of cache miss. Accordingly, the intensity extraction techniques disclosed in this disclosure (e.g., with respect to FIGS. 7-11A) is relatively faster than the equalizer-based intensity extraction technique disclosed in co-pending U.S. patent application Ser. No. 17/308,035, as also reflected in FIG. 11C.

On-Line Adaptation of the Coefficients of the Sharpening Masks

Note that each sharpening mask used for the convolution of a corresponding section of the sequencing image is a k×k matrix, where k is an appropriate positive integer, such as three, five, seven, nine, or higher. Assuming there are "m" number of color channels (where m is a positive integer, such as one, two, or higher), for each sub-tile of a tile, there are m×k×k coefficients. Assuming that a tile is subdivided in "n" number of portions (e.g., see FIGS. 8A and 8B), there are n×m×k×k number of coefficients that are to be updated during a training process. Because of the relatively low values of n, m, and k, the number of coefficients to be updated is not significantly high. Merely as an example, if two color channels are assumed, a sharpening mask is assumed to have a dimension of 3×3, and each tile is divided in 3×3 or 9 sub-tiles, then total number of coefficients of all the sharpening masks is 2×9×3×3=162.

In addition to the offline training discussed herein previously, in an embodiment, the coefficients of the sharpening masks are also updated adaptively during the sequencing run. For example, in the above discussed example, there are merely 162 number of coefficients of all the sharpening masks, and it is relatively easy to adapt the 162 coefficients online, e.g., when the sequencing run is in progress (although note that the number 162 is merely an example). In contrast, the sharpening mask using equalizer techniques (as disclosed in co-pending U.S. patent application Ser. No. 17/308,035, entitled "EQUALIZATION-BASED IMAGE PROCESSING AND SPATIAL CROSSTALK ATTENUATOR") may have a higher number of parameters of the sharpening masks (such as 4050 in an example).

Figure 12:
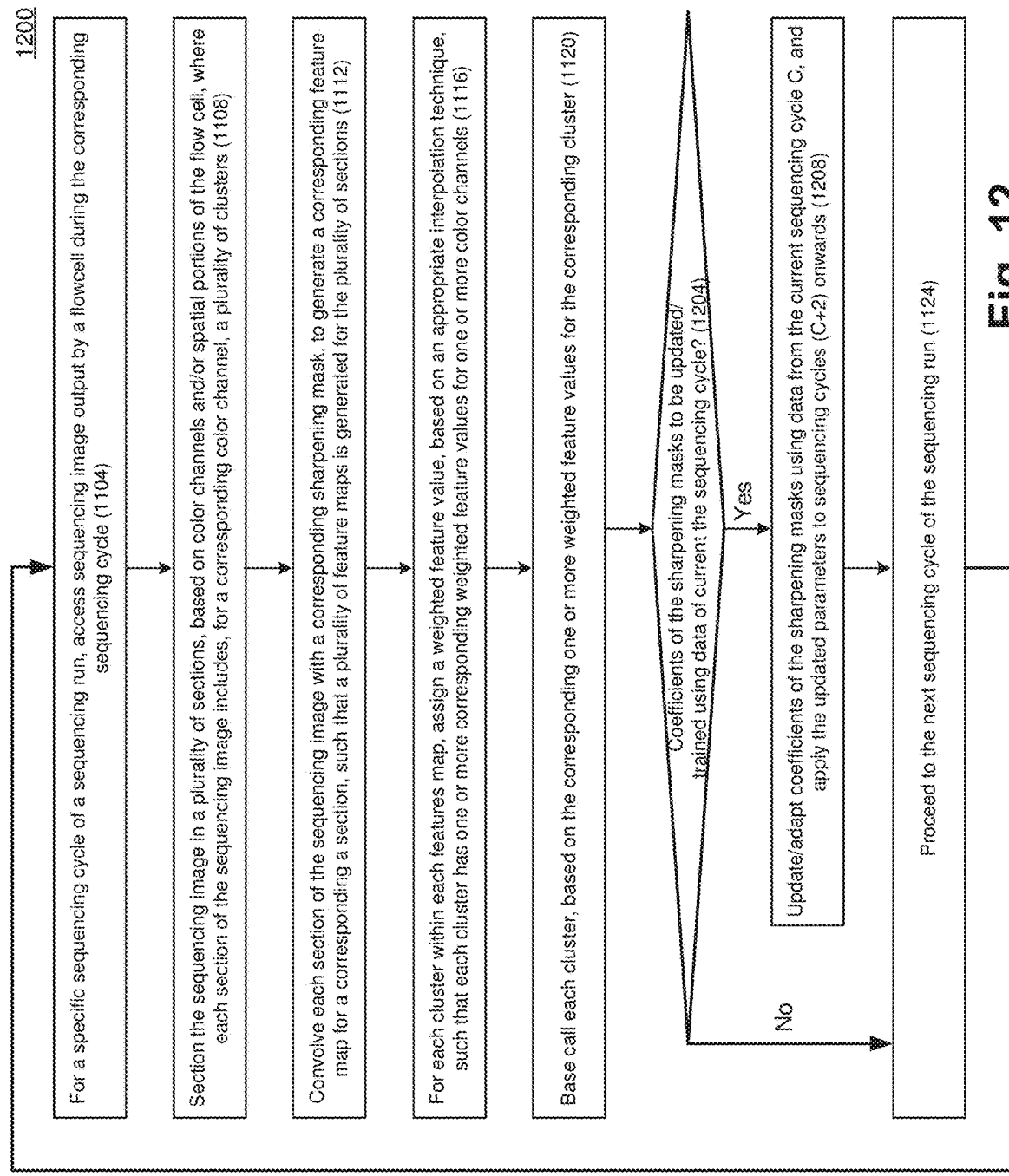
FIG. 12 illustrates a method of base calling, based on convolution of at least a section of a sequencing image and subsequent interpolation to assign one or more weighted feature values to a cluster, and base calling the cluster based on the assigned one or more weighted feature values, where coefficients of the sharpening masks are adaptively updated during the sequencing run.

FIG. 12 illustrates a method 1200 of base calling, based on convolution of at least a section of a sequencing image and subsequent interpolation to assign one or more weighted feature values to a cluster, and base calling the cluster based on the assigned one or more weighted feature values, where coefficients of the sharpening masks are adaptively updated during the sequencing run.

In an example, the online adaptation of the coefficients of the sharpening masks enables the coefficients to track changes in operating parameters of the sequencing run, such as changes in temperature, focus (e.g., optical distortion), chemistry, machine-specific variation, etc., while the sequencing machine is running and the sequencing run is cyclically progressing. For example, temperature (e.g., optical distortion), focus, chemistry, and/or machine-specific variation may at least partly invalidate the offline training of the sharpening mask coefficients. The online adaptation of the coefficients, e.g., when the sequencing run is cyclically progressing, can bring the coefficients back on track, to adapt to any change on any parameter(s) affecting the sequencing run.

The method 1200 and the method 1100 share various common operations, which are labelled using the same labels in the two figures. For example, blocks 1104, 1108, 1112, 1116, 1120, and 1124 in both figures are the same and labelled the same, and operations for these blocks are not discussed again with respect to FIG. 12.

After complete operations discussed with respect to blocks 1104 to 1120 (which are discussed with respect to FIG. 11A), the method 1200 of FIG. 12 proceeds to 1204, where it is determined whether coefficients of the sharpening masks are to be updated/trained using data of the current sequencing cycle. For example, the coefficients of the sharpening masks may not be updated at every sequencing cycle of the sequencing run. Rather, in an example, the coefficients of the sharpening masks may be updated during one or more selected sequencing cycles (but not necessarily all) of the sequencing run (although in another example, the coefficients may be updated during each sequencing cycle).

For example, the sequencing cycle(s) during which the coefficients are to be updated may be implementation specific, and may be a user configurable parameter. For example, as will be seen herein later in FIG. 14, results are presented for a scenario in which the sharpening mask coefficients are updated during sequencing cycles 10 and 30.

If "No" at 1204 (i.e., the coefficients are not to be updated during the current sequencing run), the method 1200 proceeds to 1124 and then loops back to 1104, as discussed with respect to the method 1100 of FIG. 11A.

If "Yes" at 1204 (i.e., the coefficients are to be updated during the current sequencing run), the method 1200 proceeds to 1208, where coefficients of the sharpening masks are updated or adapted using data from a current sequencing cycle C. In an example, the updated coefficients of the sharpening masks are applied for intensity extraction during sequencing cycles (C+2) and subsequent sequencing cycles. The adaptation or updating process is discussed herein previously in further detail, with respect to equation1 and FIGS. 9A and 9B. Then, the method proceeds to block 1124, and then loops back to block 1104.

In an example and although not illustrated in FIG. 12, the updating or adapting of the coefficients of the sharpening masks using data from sequencing cycle C occurs at least in part on next iteration of at least some of the operations of blocks 1104 to 1102. That is, while the base caller is processing data from sequencing cycle (C+1), the base caller in parallel may also perform the updating of the coefficients using data from sequencing cycle C. Accordingly, in an example, the updated coefficients may not be applied to the images of the sequencing cycle (C+1) and may be applied to the images of the sequencing cycle (C+2).

Note that to base call a current sequencing cycle C, intensity of sequencing cycle (C+1) has to be extracted first. For example, intensity of sequencing cycle (C+1) is used to correct pre-phasing/phasing of sequencing cycle C. Further detail about phasing and pre-phasing are discussed in co-pending U.S. Provisional Patent application No. 63/228,954, entitled "BASE CALLING USING MULTIPLE BASE CALLER MODELS." which is incorporated by reference for all purposes as if fully set forth herein.

Figure 13:
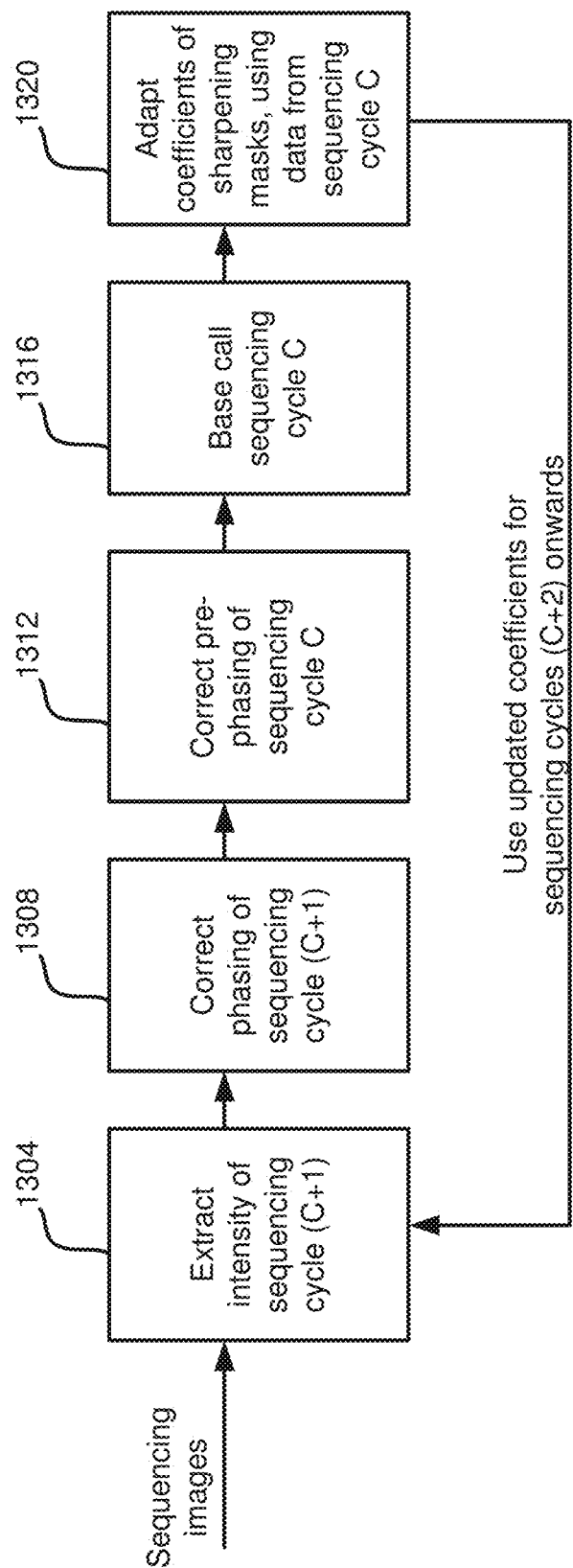
FIG. 13 illustrates adaptation of coefficients of sharpening masks used for intensity extraction.

FIG. 13 illustrates adaptation of coefficients of sharpening masks used for intensity extraction. For example, at 1304, the base caller receives sequencing images from the flow cell for sequencing cycle (C+1) and extracts the intensity using the techniques disclosed herein (e.g., using convolution, followed by interpolation). Note that it is assumed that intensity extraction for earlier cycles, such as sequencing cycle C, has already been completed when the operations 1304 are executed for the sequencing cycle (C+1).

At 1308, the base caller corrects phasing error of cycle (C+1). At 1312, the base caller corrects pre-phasing error of sequencing cycle C, e.g., using extracted (and phasing-corrected) intensity of sequencing cycle (C+1). At 1316, the base caller calls the bases of various clusters for the sequencing cycle C. At 1320, the base caller adapts or updates coefficients of sharpening masks, using data from sequencing cycle C. Finally, the updated coefficients of the sharpening masks are used for sequencing cycle (C+2) onwards. The actual adaptation or updating process is discussed herein previously, with respect to equation1 and FIGS. 9A and 9B.

Figure 14:
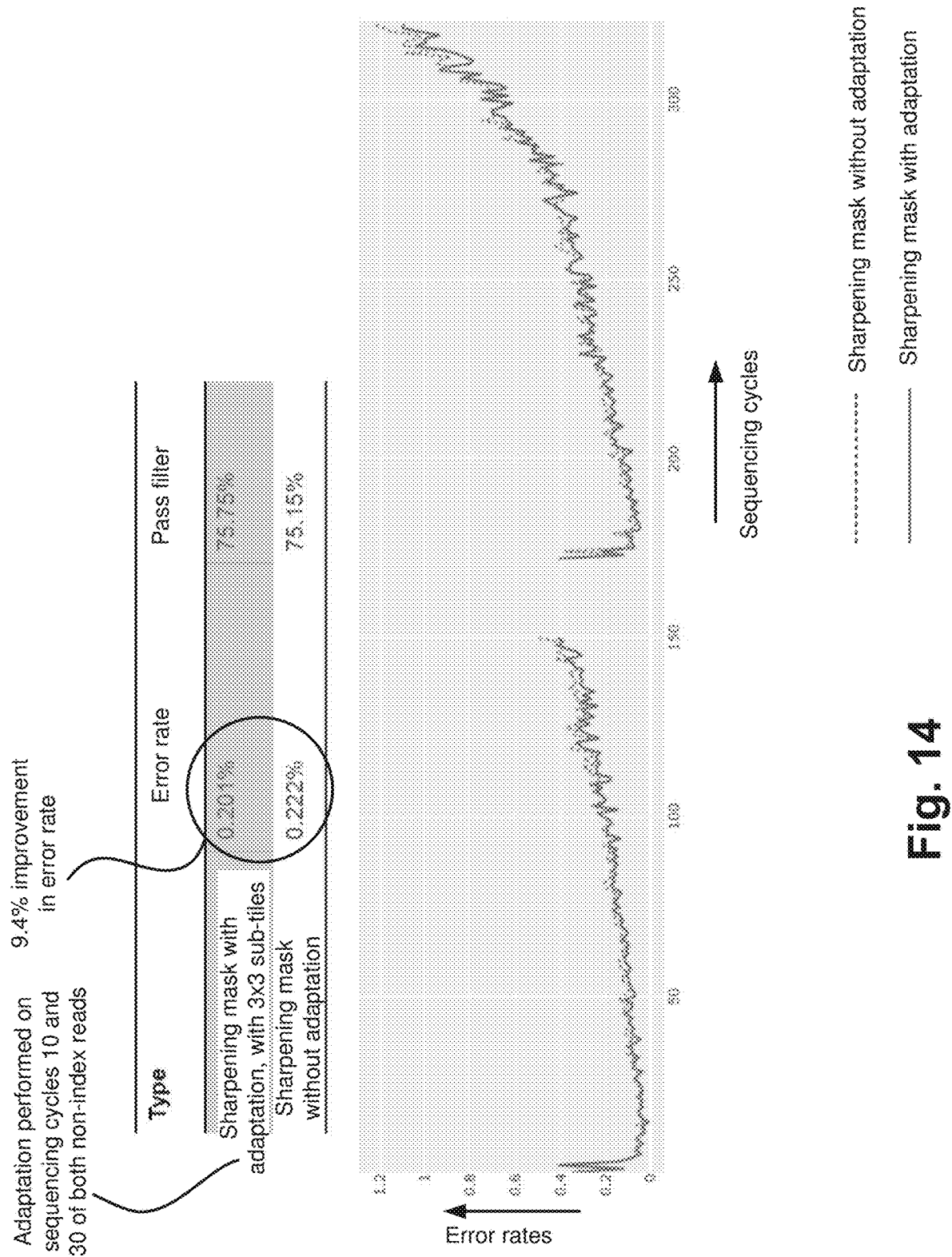
FIG. 14 illustrates comparison of performance results of the disclosed intensity extraction techniques using sharpening masks and adaptation, with another intensity extraction techniques that does not use adaptation.

FIG. 14 illustrates comparison of performance results of the disclosed intensity extraction techniques using sharpening masks and adaptation, with another intensity extraction techniques that does not use adaptation. A plot and a Table in FIG. 14 were generated based on sequencing data from the NextSeq 1000/NextSeq 2000 sequencer. The X axis of the plot of FIG. 14 represents the sequencing cycles, and the Y axis of the plot represents error rates for base calling. For example, the red dotted line in the plot is for base calling without use of adaptation for the sharpening mask for intensity extraction; and the blue line in the plot is for base calling with adaptation of the sharpening mask as disclosed in this disclosure (see FIG. 12). The Table in FIG. 14 compares the error rate and the pass filter percentage for the two scenarios. As seen in the Table, the average error rate improves by about 9.4%, when adaptation is used for the sharpening mask. In the example of FIG. 14, adaptation is performed on sequencing cycles 10 and 30 of non-index reads. The discontinuity in the graph at and after sequencing cycle 150 is due to index reads occurring during those sequencing cycles. Further detail about index reads may be found in U.S. Provisional Patent Application No. 62/979,384, entitled. "Artificial Intelligence-Based Base Calling of Index Sequences." filed Feb. 20, 2020, which is incorporated herein by reference.

Figure 15:
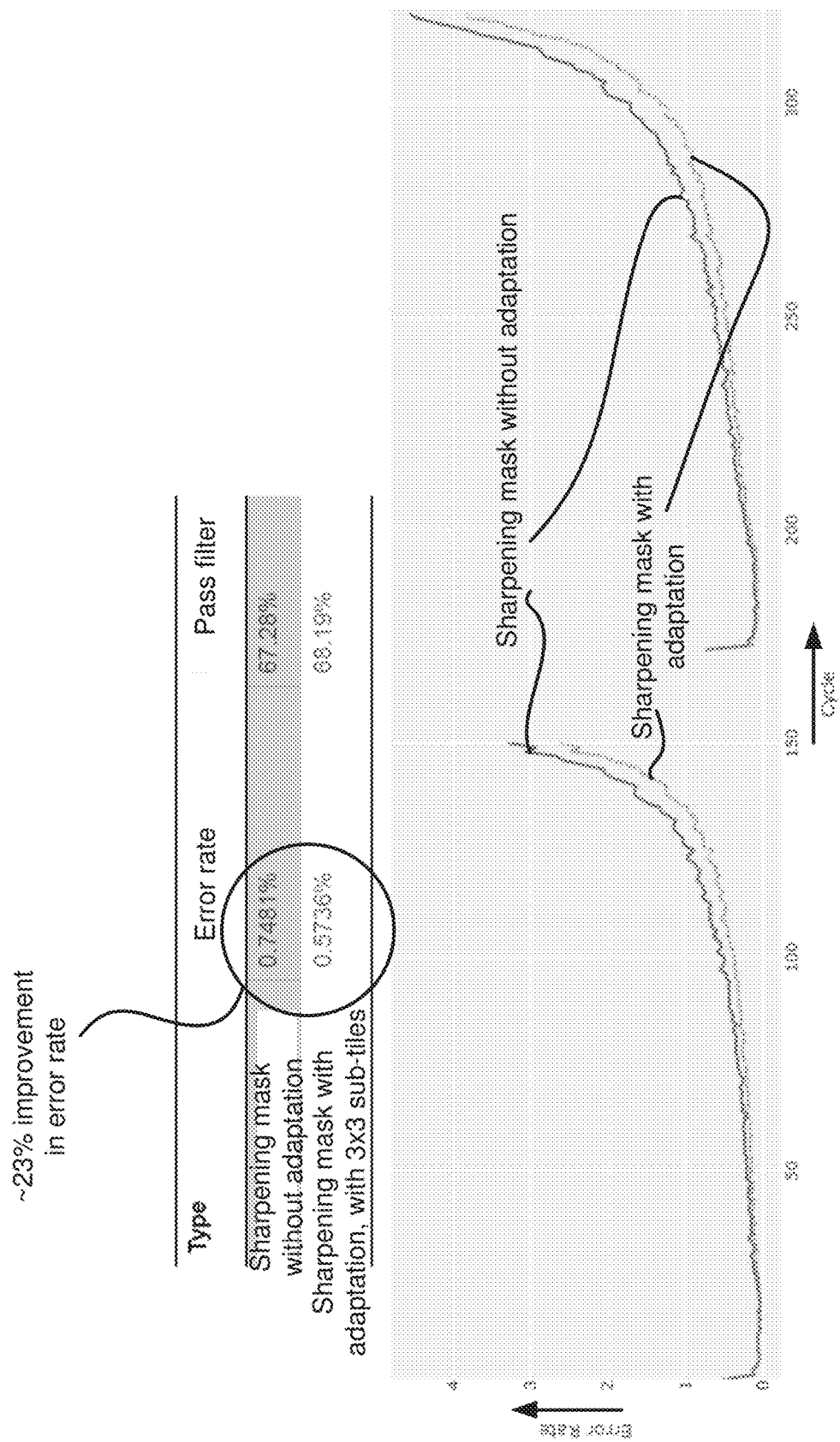
FIG. 15 illustrates comparison of performance results of the disclosed intensity extraction techniques using sharpening masks and adaptation, with another intensity extraction techniques that does not use adaptation.

FIG. 15 illustrates comparison of performance results of the disclosed intensity extraction techniques using sharpening masks and adaptation, with another intensity extraction techniques that does not use adaptation. The plot and the Table in FIG. 15 were generated based on sequencing data from a new sequencing platform under development by Illumina, Inc. (San Diego, Calif.). The X axis of the plot of FIG. 15 represents the sequencing cycles, and the Y axis of the plot represents error rates for base calling. For example, the red line in the plot is for base calling with use of adaptation for the sharpening mask for intensity extraction, as disclosed in this disclosure (e.g., see FIG. 12); and the blue line in the plot is for base calling without adaptation of the sharpening mask. The Table in FIG. 15 compares the error rate and the pass filter percentage for the two intensity extraction techniques. As seen in the Table, the average error rate improves by about 23%, when adaptation is used for the sharpening mask, along with some improvements in the pass filter percentage as well. The discontinuity in the graph at and after sequencing cycle 150 is due to index reads occurring during those sequencing cycles. Further detail about index reads may be found in U.S. Provisional Patent Application No. 62/979,384, entitled, "Artificial Intelligence-Based Base Calling of Index Sequences." filed Feb. 20, 2020, which is incorporated herein by reference.

In this application, the terms "cluster", "well", "sample", and "fluorescent sample" are interchangeably used because a well contains a corresponding cluster/sample/fluorescent sample. As defined herein, "sample" and its derivatives, is used in its broadest sense and includes any specimen, culture and the like that is suspected of including a target. In some implementations, the sample comprises DNA, RNA, PNA, LNA, chimeric or hybrid forms of nucleic acids. The sample can include any biological, clinical, surgical, agricultural, atmospheric or aquatic-based specimen containing one or more nucleic acids. The term also includes any isolated nucleic acid sample such a genomic DNA, fresh-frozen or formalin-fixed paraffin-embedded nucleic acid specimen. It is also envisioned that the sample can be from a single individual, a collection of nucleic acid samples from genetically related members, nucleic acid samples from genetically unrelated members, nucleic acid samples (matched) from a single individual such as a tumor sample and normal tissue sample, or sample from a single source that contains two distinct forms of genetic material such as maternal and fetal DNA obtained from a maternal subject, or the presence of contaminating bacterial DNA in a sample that contains plant or animal DNA. In some implementations, the source of nucleic acid material can include nucleic acids obtained from a newborn, for example as typically used for newborn screening.

The nucleic acid sample can include high molecular weight material such as genomic DNA (gDNA). The sample can include low molecular weight material such as nucleic acid molecules obtained from FFPE or archived DNA samples. In another implementation, low molecular weight material includes enzymatically or mechanically fragmented DNA. The sample can include cell-free circulating DNA. In some implementations, the sample can include nucleic acid molecules obtained from biopsies, tumors, scrapings, swabs, blood, mucus, urine, plasma, semen, hair, laser capture micro-dissections, surgical resections, and other clinical or laboratory obtained samples. In some implementations, the sample can be an epidemiological, agricultural, forensic or pathogenic sample. In some implementations, the sample can include nucleic acid molecules obtained from an animal such as a human or mammalian source. In another implementation, the sample can include nucleic acid molecules obtained from a non-mammalian source such as a plant, bacteria, virus or fungus. In some implementations, the source of the nucleic acid molecules may be an archived or extinct sample or species.

Further, the methods and compositions disclosed herein may be useful to amplify a nucleic acid sample having low-quality nucleic acid molecules, such as degraded and/or fragmented genomic DNA from a forensic sample. In one implementation, forensic samples can include nucleic acids obtained from a crime scene, nucleic acids obtained from a missing persons DNA database, nucleic acids obtained from a laboratory associated with a forensic investigation or include forensic samples obtained by law enforcement agencies, one or more military services or any such personnel. The nucleic acid sample may be a purified sample or a crude DNA containing lysate, for example derived from a buccal swab, paper, fabric or other substrate that may be impregnated with saliva, blood, or other bodily fluids. As such, in some implementations, the nucleic acid sample may comprise low amounts of, or fragmented portions of DNA, such as genomic DNA. In some implementations, target sequences can be present in one or more bodily fluids including but not limited to, blood, sputum, plasma, semen, urine and serum. In some implementations, target sequences can be obtained from hair, skin, tissue samples, autopsy or remains of a victim. In some implementations, nucleic acids including one or more target sequences can be obtained from a deceased animal or human. In some implementations, target sequences can include nucleic acids obtained from non-human DNA such a microbial, plant or entomological DNA. In some implementations, target sequences or amplified target sequences are directed to purposes of human identification. In some implementations, the disclosure relates generally to methods for identifying characteristics of a forensic sample. In some implementations, the disclosure relates generally to human identification methods using one or more target specific primers disclosed herein or one or more target specific primers designed using the primer design criteria outlined herein. In one implementation, a forensic or human identification sample containing at least one target sequence can be amplified using any one or more of the target-specific primers disclosed herein or using the primer criteria outlined herein.

As used herein, the term "adjacent" when used with respect to two reaction sites means no other reaction site is located between the two reaction sites. The term "adjacent" may have a similar meaning when used with respect to adjacent detection paths and adjacent light detectors (e.g., adjacent light detectors have no other light detector therebetween). In some cases, a reaction site may not be adjacent to another reaction site, but may still be within an immediate vicinity of the other reaction site. A first reaction site may be in the immediate vicinity of a second reaction site when fluorescent emission signals from the first reaction site are detected by the light detector associated with the second reaction site. More specifically, a first reaction site may be in the immediate vicinity of a second reaction site when the light detector associated with the second reaction site detects, for example crosstalk from the first reaction site. Adjacent reaction sites can be contiguous such that they abut each other or the adjacent sites can be non-contiguous having an intervening space between.

Upsampled Implementations

In one implementation, an image can be upsampled, for example, by using one or more interpolation techniques or transpose convolution techniques, to generate an upsampled image. In some implementations, the image can have a pixel resolution, and the upsampled image can have a subpixel resolution. In one implementation, a convolution kernel/sharpening mask/mask can be upsampled, for example, by using the one or more interpolation techniques or the transpose convolution techniques, to generate an upsampled convolution kernel/sharpening mask/mask. In some implementations, the convolution kernel/sharpening mask/mask can have a pixel resolution, and the upsampled convolution kernel/sharpening mask/mask can have a subpixel resolution. Then, the upsampled convolution kernel/sharpening mask/mask is applied to the upsampled image to generate upsampled features. In some implementations, features can have a pixel resolution, and the upsampled features can have a subpixel resolution. The upsampled features can then be analyzed on a pixel-by-pixel correspondence to base call target clusters. In other implementations, the upsampled features can then be analyzed on a cluster-by-cluster correspondence to base call target clusters.

Technical Improvements and Terminology

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls. Additional information about the terminology can be found in U.S. Nonprovisional patent application Ser. No. 16/826,168, entitled "Artificial Intelligence-Based Sequencing." filed 21 Mar. 2020 and U.S. Provisional Patent Application No. 62/821,766, entitled "Artificial Intelligence-Based Sequencing." filed 21 Mar. 2019.

The technology disclosed uses neural networks to improve the quality and quantity of nucleic acid sequence information that can be obtained from a nucleic acid sample such as a nucleic acid template or its complement, for instance, a DNA or RNA polynucleotide or other nucleic acid sample. Accordingly, certain implementations of the technology disclosed provide higher throughput polynucleotide sequencing, for instance, higher rates of collection of DNA or RNA sequence data, greater efficiency in sequence data collection, and/or lower costs of obtaining such sequence data, relative to previously available methodologies.

The technology disclosed uses neural networks to identify the center of a solid-phase nucleic acid cluster and to analyze optical signals that are generated during sequencing of such clusters, to discriminate unambiguously between adjacent, abutting or overlapping clusters in order to assign a sequencing signal to a single, discrete source cluster. These and related implementations thus permit retrieval of meaningful information, such as sequence data, from regions of high-density cluster arrays where useful information could not previously be obtained from such regions due to confounding effects of overlapping or very closely spaced adjacent clusters, including the effects of overlapping signals (e.g., as used in nucleic acid sequencing) emanating therefrom.

As described in greater detail below, in certain implementations there is provided a composition that comprises a solid support having immobilized thereto one or a plurality of nucleic acid clusters as provided herein. Each cluster comprises a plurality of immobilized nucleic acids of the same sequence and has an identifiable center having a detectable center label as provided herein, by which the identifiable center is distinguishable from immobilized nucleic acids in a surrounding region in the cluster. Also described herein are methods for making and using such clusters that have identifiable centers.

The presently disclosed implementations will find uses in numerous situations where advantages are obtained from the ability to identify, determine, annotate, record or otherwise assign the position of a substantially central location within a cluster, such as high-throughput nucleic acid sequencing, development of image analysis algorithms for assigning optical or other signals to discrete source clusters, and other applications where recognition of the center of an immobilized nucleic acid cluster is desirable and beneficial.

In certain implementations, the present invention contemplates methods that relate to high-throughput nucleic acid analysis such as nucleic acid sequence determination (e.g., "sequencing"). Exemplary high-throughput nucleic acid analyses include without limitation de novo sequencing, re-sequencing, whole genome sequencing, gene expression analysis, gene expression monitoring, epigenetic analysis, genome methylation analysis, allele specific primer extension (APSE), genetic diversity profiling, whole genome polymorphism discovery and analysis, single nucleotide polymorphism analysis, hybridization based sequence determination methods, and the like. One skilled in the art will appreciate that a variety of different nucleic acids can be analyzed using the methods and compositions of the present invention.

Although the implementations of the present invention are described in relation to nucleic acid sequencing, they are applicable in any field where image data acquired at different time points, spatial locations or other temporal or physical perspectives is analyzed. For example, the methods and systems described herein are useful in the fields of molecular and cell biology where image data from microarrays, biological specimens, cells, organisms and the like is acquired and at different time points or perspectives and analyzed. Images can be obtained using any number of techniques known in the art including, but not limited to, fluorescence microscopy, light microscopy, confocal microscopy, optical imaging, magnetic resonance imaging, tomography scanning or the like. As another example, the methods and systems described herein can be applied where image data obtained by surveillance, aerial or satellite imaging technologies and the like is acquired at different time points or perspectives and analyzed. The methods and systems are particularly useful for analyzing images obtained for a field of view in which the analytes being viewed remain in the same locations relative to each other in the field of view. The analytes may however have characteristics that differ in separate images, for example, the analytes may appear different in separate images of the field of view. For example, the analytes may appear different with regard to the color of a given analyte detected in different images, a change in the intensity of signal detected for a given analyte in different images, or even the appearance of a signal for a given analyte in one image and disappearance of the signal for the analyte in another image.

As used herein, the term "analyte" is intended to mean a point or area in a pattern that can be distinguished from other points or areas according to relative location. An individual analyte can include one or more molecules of a particular type. For example, an analyte can include a single target nucleic acid molecule having a particular sequence or an analyte can include several nucleic acid molecules having the same sequence (and/or complementary sequence, thereof). Different molecules that are at different analytes of a pattern can be differentiated from each other according to the locations of the analytes in the pattern. Example analytes include without limitation, wells in a substrate, beads (or other particles) in or on a substrate, projections from a substrate, ridges on a substrate, pads of gel material on a substrate, or channels in a substrate.

Any of a variety of target analytes that are to be detected, characterized, or identified can be used in an apparatus, system or method set forth herein. Exemplary analytes include, but are not limited to, nucleic acids (e.g., DNA, RNA or analogs thereof), proteins, polysaccharides, cells, antibodies, epitopes, receptors, ligands, enzymes (e.g., kinases, phosphatases or polymerases), small molecule drug candidates, cells, viruses, organisms, or the like.

The terms "analyte." "nucleic acid." "nucleic acid molecule." and "polynucleotide" are used interchangeably herein. In various implementations, nucleic acids may be used as templates as provided herein (e.g., a nucleic acid template, or a nucleic acid complement that is complementary to a nucleic acid nucleic acid template) for particular types of nucleic acid analysis, including but not limited to nucleic acid amplification, nucleic acid expression analysis, and/or nucleic acid sequence determination or suitable combinations thereof. Nucleic acids in certain implementations include, for instance, linear polymers of deoxyribonucleotides in 3'-5' phosphodiester or other linkages, such as deoxyribonucleic acids (DNA), for example, single- and double-stranded DNA, genomic DNA, copy DNA or complementary DNA (cDNA), recombinant DNA, or any form of synthetic or modified DNA. In other implementations, nucleic acids include for instance, linear polymers of ribonucleotides in 3'-5' phosphodiester or other linkages such as ribonucleic acids (RNA), for example, single- and double-stranded RNA, messenger (mRNA), copy RNA or complementary RNA (cRNA), alternatively spliced mRNA, ribosomal RNA, small nucleolar RNA (snoRNA), microRNAs (miRNA), small interfering RNAs (sRNA), piwi RNAs (piRNA), or any form of synthetic or modified RNA. Nucleic acids used in the compositions and methods of the present invention may vary in length and may be intact or full-length molecules or fragments or smaller parts of larger nucleic acid molecules. In particular implementations, a nucleic acid may have one or more detectable labels, as described elsewhere herein.

The terms "analyte." "cluster." "nucleic acid cluster." "nucleic acid colony." and "DNA cluster" are used interchangeably and refer to a plurality of copies of a nucleic acid template and/or complements thereof attached to a solid support. Typically and in certain preferred implementations, the nucleic acid cluster comprises a plurality of copies of template nucleic acid and/or complements thereof, attached via their 5' termini to the solid support. The copies of nucleic acid strands making up the nucleic acid clusters may be in a single or double stranded form. Copies of a nucleic acid template that are present in a cluster can have nucleotides at corresponding positions that differ from each other, for example, due to presence of a label moiety. The corresponding positions can also contain analog structures having different chemical structure but similar Watson-Crick base-pairing properties, such as is the case for uracil and thymine.

Colonies of nucleic acids can also be referred to as "nucleic acid clusters". Nucleic acid colonies can optionally be created by cluster amplification or bridge amplification techniques as set forth in further detail elsewhere herein. Multiple repeats of a target sequence can be present in a single nucleic acid molecule, such as a concatamer created using a rolling circle amplification procedure.

The nucleic acid clusters of the invention can have different shapes, sizes and densities depending on the conditions used. For example, clusters can have a shape that is substantially round, multi-sided, donut-shaped or ring-shaped. The diameter of a nucleic acid cluster can be designed to be from about 0.2 μm to about 6 μm, about 0.3 μm to about 4 μm, about 0.4 μm to about 3 μm, about 0.5 μm to about 2 μm, about 0.75 μm to about 1.5 μm, or any intervening diameter. In a particular implementation, the diameter of a nucleic acid cluster is about 0.5 μm, about 1 μm, about 1.5 μm, about 2 μm, about 2.5 μm, about 3 μm, about 4 μm, about 5 μm, or about 6 μm. The diameter of a nucleic acid cluster may be influenced by a number of parameters, including, but not limited to the number of amplification cycles performed in producing the cluster, the length of the nucleic acid template or the density of primers attached to the surface upon which clusters are formed. The density of nucleic acid clusters can be designed to typically be in the range of $0.1/mm^2$, $1/mm^2$, $10/mm^2$, $100/mm^2$, $1,000/mm^2$, $10,000/mm^2$ to $100,000/mm^2$. The present invention further contemplates, in part, higher density nucleic acid clusters, for example, $100,000/mm^2$ to $1,000,000/mm^2$ and $1,000,000/mm^2$ to $10,000,000/mm^2$.

As used herein, an "analyte" is an area of interest within a specimen or field of view. When used in connection with microarray devices or other molecular analytical devices, an analyte refers to the area occupied by similar or identical molecules. For example, an analyte can be an amplified oligonucleotide or any other group of a polynucleotide or polypeptide with a same or similar sequence. In other implementations, an analyte can be any element or group of elements that occupy a physical area on a specimen. For example, an analyte could be a parcel of land, a body of water or the like. When an analyte is imaged, each analyte will have some area. Thus, in many implementations, an analyte is not merely one pixel.

The distances between analytes can be described in any number of ways. In some implementations, the distances between analytes can be described from the center of one analyte to the center of another analyte. In other implementations, the distances can be described from the edge of one analyte to the edge of another analyte, or between the outer-most identifiable points of each analyte. The edge of an analyte can be described as the theoretical or actual physical boundary on a chip, or some point inside the boundary of the analyte. In other implementations, the distances can be described in relation to a fixed point on the specimen or in the image of the specimen.

Generally several implementations will be described herein with respect to a method of analysis. It will be understood that systems are also provided for carrying out the methods in an automated or semi-automated way. Accordingly, this disclosure provides neural network-based template generation and base calling systems, wherein the systems can include a processor; a storage device; and a program for image analysis, the program including instructions for carrying out one or more of the methods set forth herein. Accordingly, the methods set forth herein can be carried out on a computer, for example, having components set forth herein or otherwise known in the art.

The methods and systems set forth herein are useful for analyzing any of a variety of objects. Particularly useful objects are solid supports or solid-phase surfaces with attached analytes. The methods and systems set forth herein provide advantages when used with objects having a repeating pattern of analytes in an xy plane. An example is a microarray having an attached collection of cells, viruses, nucleic acids, proteins, antibodies, carbohydrates, small molecules (such as drug candidates), biologically active molecules or other analytes of interest.

An increasing number of applications have been developed for arrays with analytes having biological molecules such as nucleic acids and polypeptides. Such microarrays typically include deoxyribonucleic acid (DNA) or ribonucleic acid (RNA) probes. These are specific for nucleotide sequences present in humans and other organisms. In certain applications, for example, individual DNA or RNA probes can be attached at individual analytes of an array. A test sample, such as from a known person or organism, can be exposed to the array, such that target nucleic acids (e.g., gene fragments, mRNA, or amplicons thereof) hybridize to complementary probes at respective analytes in the array. The probes can be labeled in a target specific process (e.g., due to labels present on the target nucleic acids or due to enzymatic labeling of the probes or targets that are present in hybridized form at the analytes). The array can then be examined by scanning specific frequencies of light over the analytes to identify which target nucleic acids are present in the sample.

Biological microarrays may be used for genetic sequencing and similar applications. In general, genetic sequencing comprises determining the order of nucleotides in a length of target nucleic acid, such as a fragment of DNA or RNA. Relatively short sequences are typically sequenced at each analyte, and the resulting sequence information may be used in various bioinformatics methods to logically fit the sequence fragments together so as to reliably determine the sequence of much more extensive lengths of genetic material from which the fragments were derived. Automated, computer-based algorithms for characteristic fragments have been developed, and have been used more recently in genome mapping, identification of genes and their function, and so forth. Microarrays are particularly useful for characterizing genomic content because a large number of variants are present and this supplants the alternative of performing many experiments on individual probes and targets. The microarray is an ideal format for performing such investigations in a practical manner.

Any of a variety of analyte arrays (also referred to as "microarrays") known in the art can be used in a method or system set forth herein. A typical array contains analytes, each having an individual probe or a population of probes. In the latter case, the population of probes at each analyte is typically homogenous having a single species of probe. For example, in the case of a nucleic acid array, each analyte can have multiple nucleic acid molecules each having a common sequence. However, in some implementations the populations at each analyte of an array can be heterogeneous. Similarly, protein arrays can have analytes with a single protein or a population of proteins typically, but not always, having the same amino acid sequence. The probes can be attached to the surface of an array for example, via covalent linkage of the probes to the surface or via non-covalent interaction(s) of the probes with the surface. In some implementations, probes, such as nucleic acid molecules, can be attached to a surface via a gel layer as described, for example, in U.S. patent application Ser. No. 13/784,368 and US Pat. App. Pub. No. 2011/0059865 A1, each of which is incorporated herein by reference.

Example arrays include, without limitation, a BeadChip Array available from Illumina, Inc. (San Diego, Calif.) or others such as those where probes are attached to beads that are present on a surface (e.g., beads in wells on a surface) such as those described in U.S. Pat. Nos. 6,266,459; 6,355, 431; 6,770,441; 6,859,570; or 7,622,294; or PCT Publication No. WO 00/63437, each of which is incorporated herein by reference. Further examples of commercially available microarrays that can be used include, for example, an Affymetrix® GeneChip® microarray or other microarray synthesized in accordance with techniques sometimes referred to as VLSIPS™ (Very Large Scale Immobilized Polymer Synthesis) technologies. A spotted microarray can also be used in a method or system according to some implementations of the present disclosure. An example spotted microarray is a CodeLink™ Array available from Amersham Biosciences. Another microarray that is useful is one that is manufactured using inkjet printing methods such as SurePrint™ Technology available from Agilent Technologies.

Other useful arrays include those that are used in nucleic acid sequencing applications. For example, arrays having amplicons of genomic fragments (often referred to as clusters) are particularly useful such as those described in Bentley et al., Nature 456:53-59 (2008), WO 04/018497; WO 91/06678; WO 07/123744; U.S. Pat. Nos. 7,329,492; 7,211,414; 7,315,019; 7,405,281, or 7,057,026; or US Pat. App. Pub. No. 2008/0108082 A1, each of which is incorporated herein by reference. Another type of array that is useful for nucleic acid sequencing is an array of particles produced from an emulsion PCR technique. Examples are described in Dressman et al., Proc. Natl. Acad. Sci. USA 100:8817-8822 (2003), WO 05/010145, US Pat. App. Pub.

No. 2005/0130173 or US Pat. App. Pub. No. 2005/0064460, each of which is incorporated herein by reference in its entirety.

Arrays used for nucleic acid sequencing often have random spatial patterns of nucleic acid analytes. For example, HiSeq or MiSeq sequencing platforms available from Illumina Inc. (San Diego, Calif.) utilize flow cells upon which nucleic acid arrays are formed by random seeding followed by bridge amplification. However, patterned arrays can also be used for nucleic acid sequencing or other analytical applications. Example patterned arrays, methods for their manufacture and methods for their use are set forth in U.S. Ser. No. 13/787,396; U.S. Ser. No. 13/783,043; U.S. Ser. No. 13/784,368; US Pat. App. Pub. No. 2013/0116153 A1; and US Pat. App. Pub. No. 2012/0316086 A1, each of which is incorporated herein by reference. The analytes of such patterned arrays can be used to capture a single nucleic acid template molecule to seed subsequent formation of a homogenous colony, for example, via bridge amplification. Such patterned arrays are particularly useful for nucleic acid sequencing applications.

The size of an analyte on an array (or other object used in a method or system herein) can be selected to suit a particular application. For example, in some implementations, an analyte of an array can have a size that accommodates only a single nucleic acid molecule. A surface having a plurality of analytes in this size range is useful for constructing an array of molecules for detection at single molecule resolution. Analytes in this size range are also useful for use in arrays having analytes that each contain a colony of nucleic acid molecules. Thus, the analytes of an array can each have an area that is no larger than about 1 mm$^2$, no larger than about 500 μm$^2$, no larger than about 100 μm$^2$, no larger than about 10 μm$^2$, no larger than about 1 μm$^2$, no larger than about 500 nm$^2$, or no larger than about 100 nm$^2$, no larger than about 10 nm$^2$, no larger than about 5 nm$^2$, or no larger than about 1 nm$^2$. Alternatively or additionally, the analytes of an array will be no smaller than about 1 mm$^2$, no smaller than about 500 μm$^2$, no smaller than about 100 μm$^2$, no smaller than about 10 μm$^2$, no smaller than about 1 μm$^2$, no smaller than about 500 nm$^2$, no smaller than about 100 nm$^2$, no smaller than about 10 nm$^2$, no smaller than about 5 nm$^2$, or no smaller than about 1 nm$^2$. Indeed, an analyte can have a size that is in a range between an upper and lower limit selected from those exemplified above. Although several size ranges for analytes of a surface have been exemplified with respect to nucleic acids and on the scale of nucleic acids, it will be understood that analytes in these size ranges can be used for applications that do not include nucleic acids. It will be further understood that the size of the analytes need not necessarily be confined to a scale used for nucleic acid applications.

For implementations that include an object having a plurality of analytes, such as an array of analytes, the analytes can be discrete, being separated with spaces between each other. An array useful in the invention can have analytes that are separated by edge to edge distance of at most 100 μm, 50 μm, 10 μm, 5 μm, 1 μm, 0.5 μm, or less. Alternatively or additionally, an array can have analytes that are separated by an edge to edge distance of at least 0.5 μm, 1 μm, 5 μm, 10 μm, 50 μm, 100 μm, or more. These ranges can apply to the average edge to edge spacing for analytes as well as to the minimum or maximum spacing.

In some implementations the analytes of an array need not be discrete and instead neighboring analytes can abut each other. Whether or not the analytes are discrete, the size of the analytes and/or pitch of the analytes can vary such that arrays can have a desired density. For example, the average analyte pitch in a regular pattern can be at most 100 μm, 50 μm, 10 μm, 5 μm, 1 μm, 0.5 μm, or less. Alternatively or additionally, the average analyte pitch in a regular pattern can be at least 0.5 μm, 1 μm, 5 μm, 10 μm, 50 μm, 100 μm, or more. These ranges can apply to the maximum or minimum pitch for a regular pattern as well. For example, the maximum analyte pitch for a regular pattern can be at most 100 μm, 50 μm, 10 μm, 5 μm, 1 μm, 0.5 μm, or less; and/or the minimum analyte pitch in a regular pattern can be at least 0.5 μm, 1 μm, 5 μm, 10 μm, 50 μm, 100 μm, or more.

The density of analytes in an array can also be understood in terms of the number of analytes present per unit area. For example, the average density of analytes for an array can be at least about $1 \times 10^3$ analytes/mm$^2$, $1 \times 10^4$ analytes/mm$^2$, $1 \times 10^5$ analytes/mm$^2$, $1 \times 10^6$ analytes/mm$^2$, $1 \times 10^7$ analytes/mm$^2$, $1 \times 10^8$ analytes/mm$^2$, or $1 \times 10^9$ analytes/mm$^2$, or higher. Alternatively or additionally the average density of analytes for an array can be at most about $1 \times 10^9$ analytes/mm$^2$, $1 \times 10^8$ analytes/mm$^2$, $1 \times 10^7$ analytes/mm$^2$, $1 \times 10^6$ analytes/mm$^2$, $1 \times 10^5$ analytes/mm$^2$, $1 \times 10^4$ analytes/mm$^2$, or $1 \times 10^3$ analytes/mm$^2$, or less.

The above ranges can apply to all or part of a regular pattern including, for example, all or part of an array of analytes.

The analytes in a pattern can have any of a variety of shapes. For example, when observed in a two dimensional plane, such as on the surface of an array, the analytes can appear rounded, circular, oval, rectangular, square, symmetric, asymmetric, triangular, polygonal, or the like. The analytes can be arranged in a regular repeating pattern including, for example, a hexagonal or rectilinear pattern. A pattern can be selected to achieve a desired level of packing. For example, round analytes are optimally packed in a hexagonal arrangement. Of course other packing arrangements can also be used for round analytes and vice versa.

A pattern can be characterized in terms of the number of analytes that are present in a subset that forms the smallest geometric unit of the pattern. The subset can include, for example, at least about 2, 3, 4, 5, 6, 10 or more analytes. Depending upon the size and density of the analytes the geometric unit can occupy an area of less than 1 mm$^2$, 500 μm$^2$, 100 μm$^2$, 50 μm$^2$, 10 μm$^2$, 1 μm$^2$, 500 nm$^2$, 100 nm$^2$, 50 nm$^2$, 10 nm$^2$, or less. Alternatively or additionally, the geometric unit can occupy an area of greater than 10 nm$^2$, 50 nm$^2$, 100 nm$^2$, 500 nm$^2$, 1 μm$^2$, 10 μm$^2$, 50 μm$^2$, 100 μm$^2$, 500 μm$^2$, 1 mm$^2$, or more. Characteristics of the analytes in a geometric unit, such as shape, size, pitch and the like, can be selected from those set forth herein more generally with regard to analytes in an array or pattern.

An array having a regular pattern of analytes can be ordered with respect to the relative locations of the analytes but random with respect to one or more other characteristic of each analyte. For example, in the case of a nucleic acid array, the nuclei acid analytes can be ordered with respect to their relative locations but random with respect to one's knowledge of the sequence for the nucleic acid species present at any particular analyte. As a more specific example, nucleic acid arrays formed by seeding a repeating pattern of analytes with template nucleic acids and amplifying the template at each analyte to form copies of the template at the analyte (e.g., via cluster amplification or bridge amplification) will have a regular pattern of nucleic acid analytes but will be random with regard to the distribution of sequences of the nucleic acids across the array. Thus, detection of the presence of nucleic acid material generally on the array can yield a repeating pattern of analytes, whereas sequence specific detection can yield non-repeating distribution of signals across the array.

It will be understood that the description herein of patterns, order, randomness and the like pertain not only to analytes on objects, such as analytes on arrays, but also to analytes in images. As such, patterns, order, randomness and the like can be present in any of a variety of formats that are used to store, manipulate or communicate image data including, but not limited to, a computer readable medium or computer component such as a graphical user interface or other output device.

As used herein, the term "image" is intended to mean a representation of all or part of an object. The representation can be an optically detected reproduction. For example, an image can be obtained from fluorescent, luminescent, scatter, or absorption signals. The part of the object that is present in an image can be the surface or other xy plane of the object. Typically, an image is a 2 dimensional representation, but in some cases information in the image can be derived from 3 or more dimensions. An image need not include optically detected signals. Non-optical signals can be present instead. An image can be provided in a computer readable format or medium such as one or more of those set forth elsewhere herein.

As used herein, "image" refers to a reproduction or representation of at least a portion of a specimen or other object. In some implementations, the reproduction is an optical reproduction, for example, produced by a camera or other optical detector. The reproduction can be a non-optical reproduction, for example, a representation of electrical signals obtained from an array of nanopore analytes or a representation of electrical signals obtained from an ion-sensitive CMOS detector. In particular implementations non-optical reproductions can be excluded from a method or apparatus set forth herein. An image can have a resolution capable of distinguishing analytes of a specimen that are present at any of a variety of spacings including, for example, those that are separated by less than 100 μm, 50 μm, 10 μm, 5 μm, 1 μm or 0.5 μm.

As used herein, "acquiring", "acquisition" and like terms refer to any part of the process of obtaining an image file. In some implementations, data acquisition can include generating an image of a specimen, looking for a signal in a specimen, instructing a detection device to look for or generate an image of a signal, giving instructions for further analysis or transformation of an image file, and any number of transformations or manipulations of an image file.

As used herein, the term "template" refers to a representation of the location or relation between signals or analytes. Thus, in some implementations, a template is a physical grid with a representation of signals corresponding to analytes in a specimen. In some implementations, a template can be a chart, table, text file or other computer file indicative of locations corresponding to analytes. In implementations presented herein, a template is generated in order to track the location of analytes of a specimen across a set of images of the specimen captured at different reference points. For example, a template could be a set of x,y coordinates or a set of values that describe the direction and/or distance of one analyte with respect to another analyte.

As used herein, the term "specimen" can refer to an object or area of an object of which an image is captured. For example, in implementations where images are taken of the surface of the earth, a parcel of land can be a specimen. In other implementations where the analysis of biological molecules is performed in a flow cell, the flow cell may be divided into any number of subdivisions, each of which may be a specimen. For example, a flow cell may be divided into various flow channels or lanes, and each lane can be further divided into 2, 3, 4, 5, 6, 7, 8, 9, 10, 20, 30, 40, 50, 60 70, 80, 90, 100, 110, 120, 140, 160, 180, 200, 400, 600, 800, 1000 or more separate regions that are imaged. One example of a flow cell has 8 lanes, with each lane divided into 120 specimens or tiles. In another implementation, a specimen may be made up of a plurality of tiles or even an entire flow cell. Thus, the image of each specimen can represent a region of a larger surface that is imaged.

It will be appreciated that references to ranges and sequential number lists described herein include not only the enumerated number but all real numbers between the enumerated numbers.

As used herein, a "reference point" refers to any temporal or physical distinction between images. In a preferred implementation, a reference point is a time point. In a more preferred implementation, a reference point is a time point or cycle during a sequencing reaction. However, the term "reference point" can include other aspects that distinguish or separate images, such as angle, rotational, temporal, or other aspects that can distinguish or separate images.

As used herein, a "subset of images" refers to a group of images within a set. For example, a subset may contain 1, 2, 3, 4, 6, 8, 10, 12, 14, 16, 18, 20, 30, 40, 50, 60 or any number of images selected from a set of images. In particular implementations, a subset may contain no more than 1, 2, 3, 4, 6, 8, 10, 12, 14, 16, 18, 20, 30, 40, 50, 60 or any number of images selected from a set of images. In a preferred implementation, images are obtained from one or more sequencing cycles with four images correlated to each cycle. Thus, for example, a subset could be a group of 16 images obtained through four cycles.

A base refers to a nucleotide base or nucleotide, A (adenine), C (cytosine), T (thymine), or G (guanine). This application uses "base(s)" and "nucleotide(s)" interchangeably.

The term "chromosome" refers to the heredity-bearing gene carrier of a living cell, which is derived from chromatin strands comprising DNA and protein components (especially histones). The conventional internationally recognized individual human genome chromosome numbering system is employed herein.

The term "site" refers to a unique position (e.g., chromosome ID, chromosome position and orientation) on a reference genome. In some implementations, a site may be a residue, a sequence tag, or a segment's position on a sequence. The term "locus" may be used to refer to the specific location of a nucleic acid sequence or polymorphism on a reference chromosome.

The term "sample" herein refers to a sample, typically derived from a biological fluid, cell, tissue, organ, or organism containing a nucleic acid or a mixture of nucleic acids containing at least one nucleic acid sequence that is to be sequenced and/or phased. Such samples include, but are not limited to sputum/oral fluid, amniotic fluid, blood, a blood fraction, fine needle biopsy samples (e.g., surgical biopsy, fine needle biopsy, etc.), urine, peritoneal fluid, pleural fluid, tissue explant, organ culture and any other tissue or cell preparation, or fraction or derivative thereof or isolated therefrom. Although the sample is often taken from a human subject (e.g., patient), samples can be taken from any organism having chromosomes, including, but not limited to dogs, cats, horses, goats, sheep, cattle, pigs, etc. The sample may be used directly as obtained from the biological source or following a pretreatment to modify the character of the sample. For example, such pretreatment may include preparing plasma from blood, diluting viscous fluids and so forth. Methods of pretreatment may also involve, but are not limited to, filtration, precipitation, dilution, distillation, mixing, centrifugation, freezing, lyophilization, concentration, amplification, nucleic acid fragmentation, inactivation of interfering components, the addition of reagents, lysing, etc.

The term "sequence" includes or represents a strand of nucleotides coupled to each other. The nucleotides may be based on DNA or RNA. It should be understood that one sequence may include multiple sub-sequences. For example, a single sequence (e.g., of a PCR amplicon) may have 350 nucleotides. The sample read may include multiple sub-sequences within these 350 nucleotides. For instance, the sample read may include first and second flanking subsequences having, for example, 20-50 nucleotides. The first and second flanking sub-sequences may be located on either side of a repetitive segment having a corresponding sub-sequence (e.g., 40-100 nucleotides). Each of the flanking sub-sequences may include (or include portions of) a primer sub-sequence (e.g., 10-30 nucleotides). For ease of reading, the term "sub-sequence" will be referred to as "sequence." but it is understood that two sequences are not necessarily separate from each other on a common strand. To differentiate the various sequences described herein, the sequences may be given different labels (e.g., target sequence, primer sequence, flanking sequence, reference sequence, and the like). Other terms, such as "allele." may be given different labels to differentiate between like objects. The application uses "read(s)" and "sequence read(s)" interchangeably.

The term "paired-end sequencing" refers to sequencing methods that sequence both ends of a target fragment. Paired-end sequencing may facilitate detection of genomic rearrangements and repetitive segments, as well as gene fusions and novel transcripts. Methodology for paired-end sequencing are described in PCT publication WO07010252, PCT application Serial No. PCTGB2007/003798 and US patent application publication US 2009/0088327, each of which is incorporated by reference herein. In one example, a series of operations may be performed as follows; (a) generate clusters of nucleic acids; (b) linearize the nucleic acids; (c) hybridize a first sequencing primer and carry out repeated cycles of extension, scanning and deblocking, as set forth above; (d) "invert" the target nucleic acids on the flow cell surface by synthesizing a complimentary copy: (e) linearize the resynthesized strand; and (f) hybridize a second sequencing primer and carry out repeated cycles of extension, scanning and deblocking, as set forth above. The inversion operation can be carried out be delivering reagents as set forth above for a single cycle of bridge amplification.

The term "reference genome" or "reference sequence" refers to any particular known genome sequence, whether partial or complete, of any organism which may be used to reference identified sequences from a subject. For example, a reference genome used for human subjects as well as many other organisms is found at the National Center for Biotechnology Information at ncbi.nlm.nih.gov. A "genome" refers to the complete genetic information of an organism or virus, expressed in nucleic acid sequences. A genome includes both the genes and the noncoding sequences of the DNA. The reference sequence may be larger than the reads that are aligned to it. For example, it may be at least about 100 times larger, or at least about 1000 times larger, or at least about 10,000 times larger, or at least about 105 times larger, or at least about 106 times larger, or at least about 107 times larger. In one example, the reference genome sequence is that of a full length human genome. In another example, the reference genome sequence is limited to a specific human chromosome such as chromosome 13. In some implementations, a reference chromosome is a chromosome sequence from human genome version hg19. Such sequences may be referred to as chromosome reference sequences, although the term reference genome is intended to cover such sequences. Other examples of reference sequences include genomes of other species, as well as chromosomes, sub-chromosomal regions (such as strands), etc., of any species. In various implementations, the reference genome is a consensus sequence or other combination derived from multiple individuals. However, in certain applications, the reference sequence may be taken from a particular individual. In other implementations, the "genome" also covers so-called "graph genomes", which use a particular storage format and representation of the genome sequence. In one implementation, graph genomes store data in a linear file. In another implementation, the graph genomes refer to a representation where alternative sequences (e.g., different copies of a chromosome with small differences) are stored as different paths in a graph. Additional information regarding graph genome implementations can be found in https://www.biorxiv.org/content/biorxiv/early/2018/03/20/194530.full.pdf, the content of which is hereby incorporated herein by reference in its entirety.

The term "read" refer to a collection of sequence data that describes a fragment of a nucleotide sample or reference. The term "read" may refer to a sample read and/or a reference read. Typically, though not necessarily, a read represents a short sequence of contiguous base pairs in the sample or reference. The read may be represented symbolically by the base pair sequence (in ATCG) of the sample or reference fragment. It may be stored in a memory device and processed as appropriate to determine whether the read matches a reference sequence or meets other criteria. A read may be obtained directly from a sequencing apparatus or indirectly from stored sequence information concerning the sample. In some cases, a read is a DNA sequence of sufficient length (e.g., at least about 25 bp) that can be used to identify a larger sequence or region, e.g., that can be aligned and specifically assigned to a chromosome or genomic region or gene.

Next-generation sequencing methods include, for example, sequencing by synthesis technology (Illumina), pyrosequencing (454), ion semiconductor technology (Ion Torrent sequencing), single-molecule real-time sequencing (Pacific Biosciences) and sequencing by ligation (SOLID sequencing). Depending on the sequencing methods, the length of each read may vary from about 30 bp to more than 10,000 bp. For example, the DNA sequencing method using SOLID sequencer generates nucleic acid reads of about 50 bp. For another example, Ion Torrent Sequencing generates nucleic acid reads of up to 400 bp and 454 pyrosequencing generates nucleic acid reads of about 700 bp. For yet another example, single-molecule real-time sequencing methods may generate reads of 10,000 bp to 15,000 bp. Therefore, in certain implementations, the nucleic acid sequence reads have a length of 30-100 bp, 50-200 bp, or 50-400 bp.

The terms "sample read". "sample sequence" or "sample fragment" refer to sequence data for a genomic sequence of interest from a sample. For example, the sample read comprises sequence data from a PCR amplicon having a forward and reverse primer sequence. The sequence data can be obtained from any select sequence methodology. The sample read can be, for example, from a sequencing-by-synthesis (SBS) reaction, a sequencing-by-ligation reaction, or any other suitable sequencing methodology for which it is desired to determine the length and/or identity of a repetitive element. The sample read can be a consensus (e.g., averaged or weighted) sequence derived from multiple sample reads. In certain implementations, providing a reference sequence comprises identifying a locus-of-interest based upon the primer sequence of the PCR amplicon.

The term "raw fragment" refers to sequence data for a portion of a genomic sequence of interest that at least partially overlaps a designated position or secondary position of interest within a sample read or sample fragment. Non-limiting examples of raw fragments include a duplex stitched fragment, a simplex stitched fragment, a duplex un-stitched fragment and a simplex un-stitched fragment. The term "raw" is used to indicate that the raw fragment includes sequence data having some relation to the sequence data in a sample read, regardless of whether the raw fragment exhibits a supporting variant that corresponds to and authenticates or confirms a potential variant in a sample read. The term "raw fragment" does not indicate that the fragment necessarily includes a supporting variant that validates a variant call in a sample read. For example, when a sample read is determined by a variant call application to exhibit a first variant, the variant call application may determine that one or more raw fragments lack a corresponding type of "supporting" variant that may otherwise be expected to occur given the variant in the sample read.

The terms "mapping," "aligned," "alignment," or "aligning" refer to the process of comparing a read or tag to a reference sequence and thereby determining whether the reference sequence contains the read sequence. If the reference sequence contains the read, the read may be mapped to the reference sequence or, in certain implementations, to a particular location in the reference sequence. In some cases, alignment simply tells whether or not a read is a member of a particular reference sequence (i.e., whether the read is present or absent in the reference sequence). For example, the alignment of a read to the reference sequence for human chromosome 13 will tell whether the read is present in the reference sequence for chromosome 13. A tool that provides this information may be called a set membership tester. In some cases, an alignment additionally indicates a location in the reference sequence where the read or tag maps to. For example, if the reference sequence is the whole human genome sequence, an alignment may indicate that a read is present on chromosome 13, and may further indicate that the read is on a particular strand and/or site of chromosome 13.

The term "indel" refers to the insertion and/or the deletion of bases in the DNA of an organism. A micro-indel represents an indel that results in a net change of 1 to 50 nucleotides. In coding regions of the genome, unless the length of an indel is a multiple of 3, it will produce a frameshift mutation. Indels can be contrasted with point mutations. An indel inserts and deletes nucleotides from a sequence, while a point mutation is a form of substitution that replaces one of the nucleotides without changing the overall number in the DNA. Indels can also be contrasted with a Tandem Base Mutation (TBM), which may be defined as substitution at adjacent nucleotides (primarily substitutions at two adjacent nucleotides, but substitutions at three adjacent nucleotides have been observed.

The term "variant" refers to a nucleic acid sequence that is different from a nucleic acid reference. Typical nucleic acid sequence variant includes without limitation single nucleotide polymorphism (SNP), short deletion and insertion polymorphisms (Indel), copy number variation (CNV), microsatellite markers or short tandem repeats and structural variation. Somatic variant calling is the effort to identify variants present at low frequency in the DNA sample. Somatic variant calling is of interest in the context of cancer treatment. Cancer is caused by an accumulation of mutations in DNA. A DNA sample from a tumor is generally heterogeneous, including some normal cells, some cells at an early stage of cancer progression (with fewer mutations), and some late-stage cells (with more mutations). Because of this heterogeneity, when sequencing a tumor (e.g., from an FFPE sample), somatic mutations will often appear at a low frequency. For example, a SNV might be seen in only 10% of the reads covering a given base. A variant that is to be classified as somatic or germline by the variant classifier is also referred to herein as the "variant under test."

The term "noise" refers to a mistaken variant call resulting from one or more errors in the sequencing process and/or in the variant call application.

The term "variant frequency" represents the relative frequency of an allele (variant of a gene) at a particular locus in a population, expressed as a fraction or percentage. For example, the fraction or percentage may be the fraction of all chromosomes in the population that carry that allele. By way of example, sample variant frequency represents the relative frequency of an allele/variant at a particular locus/position along a genomic sequence of interest over a "population" corresponding to the number of reads and/or samples obtained for the genomic sequence of interest from an individual. As another example, a baseline variant frequency represents the relative frequency of an allele/variant at a particular locus/position along one or more baseline genomic sequences where the "population" corresponding to the number of reads and/or samples obtained for the one or more baseline genomic sequences from a population of normal individuals.

The term "variant allele frequency (VAF)" refers to the percentage of sequenced reads observed matching the variant divided by the overall coverage at the target position. VAF is a measure of the proportion of sequenced reads carrying the variant.

The terms "position", "designated position", and "locus" refer to a location or coordinate of one or more nucleotides within a sequence of nucleotides. The terms "position", "designated position", and "locus" also refer to a location or coordinate of one or more base pairs in a sequence of nucleotides.

The term "haplotype" refers to a combination of alleles at adjacent sites on a chromosome that are inherited together. A haplotype may be one locus, several loci, or an entire chromosome depending on the number of recombination events that have occurred between a given set of loci, if any occurred.

The term "threshold" herein refers to a numeric or non-numeric value that is used as a cutoff to characterize a sample, a nucleic acid, or portion thereof (e.g., a read). A threshold may be varied based upon empirical analysis. The threshold may be compared to a measured or calculated value to determine whether the source giving rise to such value suggests should be classified in a particular manner. Threshold values can be identified empirically or analytically. The choice of a threshold is dependent on the level of confidence that the user wishes to have to make the classification. The threshold may be chosen for a particular purpose (e.g., to balance sensitivity and selectivity). As used herein, the term "threshold" indicates a point at which a course of analysis may be changed and/or a point at which an action may be triggered. A threshold is not required to be a predetermined number. Instead, the threshold may be, for instance, a function that is based on a plurality of factors.

The threshold may be adaptive to the circumstances. Moreover, a threshold may indicate an upper limit, a lower limit, or a range between limits.

In some implementations, a metric or score that is based on sequencing data may be compared to the threshold. As used herein, the terms "metric" or "score" may include values or results that were determined from the sequencing data or may include functions that are based on the values or results that were determined from the sequencing data. Like a threshold, the metric or score may be adaptive to the circumstances. For instance, the metric or score may be a normalized value. As an example of a score or metric, one or more implementations may use count scores when analyzing the data. A count score may be based on number of sample reads. The sample reads may have undergone one or more filtering stages such that the sample reads have at least one common characteristic or quality. For example, each of the sample reads that are used to determine a count score may have been aligned with a reference sequence or may be assigned as a potential allele. The number of sample reads having a common characteristic may be counted to determine a read count. Count scores may be based on the read count. In some implementations, the count score may be a value that is equal to the read count. In other implementations, the count score may be based on the read count and other information. For example, a count score may be based on the read count for a particular allele of a genetic locus and a total number of reads for the genetic locus. In some implementations, the count score may be based on the read count and previously-obtained data for the genetic locus. In some implementations, the count scores may be normalized scores between predetermined values. The count score may also be a function of read counts from other loci of a sample or a function of read counts from other samples that were concurrently run with the sample-of-interest. For instance, the count score may be a function of the read count of a particular allele and the read counts of other loci in the sample and/or the read counts from other samples. As one example, the read counts from other loci and/or the read counts from other samples may be used to normalize the count score for the particular allele.

The terms "coverage" or "fragment coverage" refer to a count or other measure of a number of sample reads for the same fragment of a sequence. A read count may represent a count of the number of reads that cover a corresponding fragment. Alternatively, the coverage may be determined by multiplying the read count by a designated factor that is based on historical knowledge, knowledge of the sample, knowledge of the locus, etc.

The term "read depth" (conventionally a number followed by "x") refers to the number of sequenced reads with overlapping alignment at the target position. This is often expressed as an average or percentage exceeding a cutoff over a set of intervals (such as exons, genes, or panels). For example, a clinical report might say that a panel average coverage is 1,105× with 98% of targeted bases covered >100×.

The terms "base call quality score" or "Q score" refer to a PHRED-scaled probability ranging from 0-50 inversely proportional to the probability that a single sequenced base is correct. For example, a T base call with Q of 20 is considered likely correct with a probability of 99.99%. Any base call with Q<20 should be considered low quality, and any variant identified where a substantial proportion of sequenced reads supporting the variant are of low quality should be considered potentially false positive.

The terms "variant reads" or "variant read number" refer to the number of sequenced reads supporting the presence of the variant.

Regarding "strandedness" (or DNA strandedness), the genetic message in DNA can be represented as a string of the letters A, G, C, and T. For example, 5'-AGGACA-3'. Often, the sequence is written in the direction shown here, i.e., with the 5' end to the left and the 3' end to the right. DNA may sometimes occur as single-stranded molecule (as in certain viruses), but normally we find DNA as a double-stranded unit. It has a double helical structure with two antiparallel strands. In this case, the word "antiparallel" means that the two strands run in parallel, but have opposite polarity. The double-stranded DNA is held together by pairing between bases and the pairing is always such that adenine (A) pairs with thymine (T) and cytosine (C) pairs with guanine (G). This pairing is referred to as complementarity, and one strand of DNA is said to be the complement of the other. The double-stranded DNA may thus be represented as two strings, like this: 5'-AGGACA-3' and 3'-TCCTGT-5'. Note that the two strands have opposite polarity. Accordingly, the strandedness of the two DNA strands can be referred to as the reference strand and its complement, forward and reverse strands, top and bottom strands, sense and antisense strands, or Watson and Crick strands.

The reads alignment (also called reads mapping) is the process of figuring out where in the genome a sequence is from. Once the alignment is performed, the "mapping quality" or the "mapping quality score (MAPQ)" of a given read quantifies the probability that its position on the genome is correct. The mapping quality is encoded in the phred scale where P is the probability that the alignment is not correct. The probability is calculated as: $P=10^{(-MAQ/10)}$, where MAPQ is the mapping quality. For example, a mapping quality of 40=10 to the power of −4, meaning that there is a 0.01% chance that the read was aligned incorrectly. The mapping quality is therefore associated with several alignment factors, such as the base quality of the read, the complexity of the reference genome, and the paired-end information. Regarding the first, if the base quality of the read is low, it means that the observed sequence might be wrong and thus its alignment is wrong. Regarding the second, the mappability refers to the complexity of the genome. Repeated regions are more difficult to map and reads falling in these regions usually get low mapping quality. In this context, the MAPQ reflects the fact that the reads are not uniquely aligned and that their real origin cannot be determined. Regarding the third, in case of paired-end sequencing data, concordant pairs are more likely to be well aligned. The higher is the mapping quality, the better is the alignment. A read aligned with a good mapping quality usually means that the read sequence was good and was aligned with few mismatches in a high mappability region. The MAPQ value can be used as a quality control of the alignment results. The proportion of reads aligned with an MAPQ higher than 20 is usually for downstream analysis.

As used herein, a "signal" refers to a detectable event such as an emission, preferably light emission, for example, in an image. Thus, in preferred implementations, a signal can represent any detectable light emission that is captured in an image (i.e., a "spot"). Thus, as used herein, "signal" can refer to both an actual emission from an analyte of the specimen, and can refer to a spurious emission that does not correlate to an actual analyte. Thus, a signal could arise from noise and could be later discarded as not representative of an actual analyte of a specimen.

As used herein, the term "clump" refers to a group of signals. In particular implementations, the signals are derived from different analytes. In a preferred implementation, a signal clump is a group of signals that cluster together. In a more preferred implementation, a signal clump represents a physical region covered by one amplified oligonucleotide. Each signal clump should be ideally observed as several signals (one per template cycle, and possibly more due to cross-talk). Accordingly, duplicate signals are detected where two (or more) signals are included in a template from the same clump of signals.

As used herein, terms such as "minimum," "maximum," "minimize," "maximize" and grammatical variants thereof can include values that are not the absolute maxima or minima. In some implementations, the values include near maximum and near minimum values. In other implementations, the values can include local maximum and/or local minimum values. In some implementations, the values include only absolute maximum or minimum values.

As used herein, "cross-talk" refers to the detection of signals in one image that are also detected in a separate image. In a preferred implementation, cross-talk can occur when an emitted signal is detected in two separate detection channels. For example, where an emitted signal occurs in one color, the emission spectrum of that signal may overlap with another emitted signal in another color. In a preferred implementation, fluorescent molecules used to indicate the presence of nucleotide bases A, C, G and T are detected in separate channels. However, because the emission spectra of A and C overlap, some of the C color signal may be detected during detection using the A color channel. Accordingly, cross-talk between the A and C signals allows signals from one color image to appear in the other color image. In some implementations, G and T cross-talk. In some implementations, the amount of cross-talk between channels is asymmetric. It will be appreciated that the amount of cross-talk between channels can be controlled by, among other things, the selection of signal molecules having an appropriate emission spectrum as well as selection of the size and wavelength range of the detection channel.

As used herein. "register." "registering." "registration" and like terms refer to any process to correlate signals in an image or data set from a first time point or perspective with signals in an image or data set from another time point or perspective. For example, registration can be used to align signals from a set of images to form a template. In another example, registration can be used to align signals from other images to a template. One signal may be directly or indirectly registered to another signal. For example, a signal from image "S" may be registered to image "G" directly. As another example, a signal from image "N" may be directly registered to image "G." or alternatively, the signal from image "N" may be registered to image "S." which has previously been registered to image "G." Thus, the signal from image "N" is indirectly registered to image "G."

As used herein, the term "fiducial" is intended to mean a distinguishable point of reference in or on an object. The point of reference can be, for example, a mark, second object, shape, edge, area, irregularity, channel, pit, post or the like. The point of reference can be present in an image of the object or in another data set derived from detecting the object. The point of reference can be specified by an x and/or y coordinate in a plane of the object. Alternatively or additionally, the point of reference can be specified by a z coordinate that is orthogonal to the xy plane, for example, being defined by the relative locations of the object and a detector. One or more coordinates for a point of reference can be specified relative to one or more other analytes of an object or of an image or other data set derived from the object.

As used herein, the term "optical signal" is intended to include, for example, fluorescent, luminescent, scatter, or absorption signals. Optical signals can be detected in the ultraviolet (UV) range (about 200 to 390 nm), visible (VIS) range (about 391 to 770 nm), infrared (IR) range (about 0.771 to 25 microns), or other range of the electromagnetic spectrum. Optical signals can be detected in a way that excludes all or part of one or more of these ranges.

As used herein, the term "signal level" is intended to mean an amount or quantity of detected energy or coded information that has a desired or predefined characteristic. For example, an optical signal can be quantified by one or more of intensity, wavelength, energy, frequency, power, luminance or the like. Other signals can be quantified according to characteristics such as voltage, current, electric field strength, magnetic field strength, frequency, power, temperature, etc. Absence of signal is understood to be a signal level of zero or a signal level that is not meaningfully distinguished from noise.

As used herein, the term "simulate" is intended to mean creating a representation or model of a physical thing or action that predicts characteristics of the thing or action. The representation or model can in many cases be distinguishable from the thing or action. For example, the representation or model can be distinguishable from a thing with respect to one or more characteristic such as color, intensity of signals detected from all or part of the thing, size, or shape. In particular implementations, the representation or model can be idealized, exaggerated, muted, or incomplete when compared to the thing or action. Thus, in some implementations, a representation of model can be distinguishable from the thing or action that it represents, for example, with respect to at least one of the characteristics set forth above. The representation or model can be provided in a computer readable format or medium such as one or more of those set forth elsewhere herein.

As used herein, the term "specific signal" is intended to mean detected energy or coded information that is selectively observed over other energy or information such as background energy or information. For example, a specific signal can be an optical signal detected at a particular intensity, wavelength or color; an electrical signal detected at a particular frequency, power or field strength; or other signals known in the art pertaining to spectroscopy and analytical detection.

As used herein, the term "swath" is intended to mean a rectangular portion of an object. The swath can be an elongated strip that is scanned by relative movement between the object and a detector in a direction that is parallel to the longest dimension of the strip. Generally, the width of the rectangular portion or strip will be constant along its full length. Multiple swaths of an object can be parallel to each other. Multiple swaths of an object can be adjacent to each other, overlapping with each other, abutting each other, or separated from each other by an interstitial area.

As used herein, the term "variance" is intended to mean a difference between that which is expected and that which is observed or a difference between two or more observations. For example, variance can be the discrepancy between an expected value and a measured value. Variance can be represented using statistical functions such as standard deviation, the square of standard deviation, coefficient of variation or the like.

As used herein, the term "xy coordinates" is intended to mean information that specifies location, size, shape, and/or orientation in an xy plane. The information can be, for example, numerical coordinates in a Cartesian system. The coordinates can be provided relative to one or both of the x and y axes or can be provided relative to another location in the xy plane. For example, coordinates of a analyte of an object can specify the location of the analyte relative to location of a fiducial or other analyte of the object.

As used herein, the term "xy plane" is intended to mean a 2 dimensional area defined by straight line axes x and y. When used in reference to a detector and an object observed by the detector, the area can be further specified as being orthogonal to the direction of observation between the detector and object being detected.

As used herein, the term "z coordinate" is intended to mean information that specifies the location of a point, line or area along an axes that is orthogonal to an xy plane. In particular implementations, the z axis is orthogonal to an area of an object that is observed by a detector. For example, the direction of focus for an optical system may be specified along the z axis.

In some implementations, acquired signal data is transformed using an affine transformation. In some such implementations, template generation makes use of the fact that the affine transforms between color channels are consistent between runs. Because of this consistency, a set of default offsets can be used when determining the coordinates of the analytes in a specimen. For example, a default offsets file can contain the relative transformation (shift, scale, skew) for the different channels relative to one channel, such as the A channel. In other implementations, however, the offsets between color channels drift during a run and/or between runs, making offset-driven template generation difficult. In such implementations, the methods and systems provided herein can utilize offset-less template generation, which is described further below.

In some aspects of the above implementations, the system can comprise a flow cell. In some aspects, the flow cell comprises lanes, or other configurations, of tiles, wherein at least some of the tiles comprise one or more arrays of analytes. In some aspects, the analytes comprise a plurality of molecules such as nucleic acids. In certain aspects, the flow cell is configured to deliver a labeled nucleotide base to an array of nucleic acids, thereby extending a primer hybridized to a nucleic acid within a analyte so as to produce a signal corresponding to a analyte comprising the nucleic acid. In preferred implementations, the nucleic acids within a analyte are identical or substantially identical to each other.

In some of the systems for image analysis described herein, each image in the set of images includes color signals, wherein a different color corresponds to a different nucleotide base. In some aspects, each image of the set of images comprises signals having a single color selected from at least four different colors. In some aspects, each image in the set of images comprises signals having a single color selected from four different colors. In some of the systems described herein, nucleic acids can be sequenced by providing four different labeled nucleotide bases to the array of molecules so as to produce four different images, each image comprising signals having a single color, wherein the signal color is different for each of the four different images, thereby producing a cycle of four color images that corresponds to the four possible nucleotides present at a particular position in the nucleic acid. In certain aspects, the system comprises a flow cell that is configured to deliver additional labeled nucleotide bases to the array of molecules, thereby producing a plurality of cycles of color images.

In preferred implementations, the methods provided herein can include determining whether a processor is actively acquiring data or whether the processor is in a low activity state. Acquiring and storing large numbers of high-quality images typically requires massive amounts of storage capacity. Additionally, once acquired and stored, the analysis of image data can become resource intensive and can interfere with processing capacity of other functions, such as ongoing acquisition and storage of additional image data. Accordingly, as used herein, the term low activity state refers to the processing capacity of a processor at a given time. In some implementations, a low activity state occurs when a processor is not acquiring and/or storing data. In some implementations, a low activity state occurs when some data acquisition and/or storage is taking place, but additional processing capacity remains such that image analysis can occur at the same time without interfering with other functions.

As used herein. "identifying a conflict" refers to identifying a situation where multiple processes compete for resources. In some such implementations, one process is given priority over another process. In some implementations, a conflict may relate to the need to give priority for allocation of time, processing capacity, storage capacity or any other resource for which priority is given. Thus, in some implementations, where processing time or capacity is to be distributed between two processes such as either analyzing a data set and acquiring and/or storing the data set, a conflict between the two processes exists and can be resolved by giving priority to one of the processes.

Also provided herein are systems for performing image analysis. The systems can include a processor; a storage capacity; and a program for image analysis, the program comprising instructions for processing a first data set for storage and the second data set for analysis, wherein the processing comprises acquiring and/or storing the first data set on the storage device and analyzing the second data set when the processor is not acquiring the first data set. In certain aspects, the program includes instructions for identifying at least one instance of a conflict between acquiring and/or storing the first data set and analyzing the second data set; and resolving the conflict in favor of acquiring and/or storing image data such that acquiring and/or storing the first data set is given priority. In certain aspects, the first data set comprises image files obtained from an optical imaging device. In certain aspects, the system further comprises an optical imaging device. In some aspects, the optical imaging device comprises a light source and a detection device.

As used herein, the term "program" refers to instructions or commands to perform a task or process. The term "program" can be used interchangeably with the term module. In certain implementations, a program can be a compilation of various instructions executed under the same set of commands. In other implementations, a program can refer to a discrete batch or file.

Set forth below are some of the surprising effects of utilizing the methods and systems for performing image analysis set forth herein. In some sequencing implementations, an important measure of a sequencing system's utility is its overall efficiency. For example, the amount of mappable data produced per day and the total cost of installing and running the instrument are important aspects of an economical sequencing solution. To reduce the time to generate mappable data and to increase the efficiency of the system, real-time base calling can be enabled on an instrument computer and can run in parallel with sequencing chemistry and imaging. This allows much of the data processing and analysis to be completed before the sequencing chemistry finishes. Additionally, it can reduce the storage required for intermediate data and limit the amount of data that needs to travel across the network.

While sequence output has increased, the data per run transferred from the systems provided herein to the network and to secondary analysis processing hardware has substantially decreased. By transforming data on the instrument computer (acquiring computer), network loads are dramatically reduced. Without these on-instrument, off-network data reduction techniques, the image output of a fleet of DNA sequencing instruments would cripple most networks.

The widespread adoption of the high-throughput DNA sequencing instruments has been driven in part by ease of use, support for a range of applications, and suitability for virtually any lab environment. The highly efficient algorithms presented herein allow significant analysis functionality to be added to a simple workstation that can control sequencing instruments. This reduction in the requirements for computational hardware has several practical benefits that will become even more important as sequencing output levels continue to increase. For example, by performing image analysis and base calling on a simple tower, heat production, laboratory footprint, and power consumption are kept to a minimum. In contrast, other commercial sequencing technologies have recently ramped up their computing infrastructure for primary analysis, with up to five times more processing power, leading to commensurate increases in heat output and power consumption. Thus, in some implementations, the computational efficiency of the methods and systems provided herein enables customers to increase their sequencing throughput while keeping server hardware expenses to a minimum.

Accordingly, in some implementations, the methods and/or systems presented herein act as a state machine, keeping track of the individual state of each specimen, and when it detects that a specimen is ready to advance to the next state, it does the appropriate processing and advances the specimen to that state. A more detailed example of how the state machine monitors a file system to determine when a specimen is ready to advance to the next state according to a preferred implementation described below.

In preferred implementations, the methods and systems provided herein are multi-threaded and can work with a configurable number of threads. Thus, for example in the context of nucleic acid sequencing, the methods and systems provided herein are capable of working in the background during a live sequencing run for real-time analysis, or it can be run using a pre-existing set of image data for off-line analysis. In certain preferred implementations, the methods and systems handle multi-threading by giving each thread its own subset of specimen for which it is responsible. This minimizes the possibility of thread contention.

A method of the present disclosure can include a step of obtaining a target image of an object using a detection apparatus, wherein the image includes a repeating pattern of analytes on the object. Detection apparatus that are capable of high resolution imaging of surfaces are particularly useful. In particular implementations, the detection apparatus will have sufficient resolution to distinguish analytes at the densities, pitches, and/or analyte sizes set forth herein. Particularly useful are detection apparatus capable of obtaining images or image data from surfaces. Example detectors are those that are configured to maintain an object and detector in a static relationship while obtaining an area image. Scanning apparatus can also be used. For example, an apparatus that obtains sequential area images (e.g., so called 'step and shoot' detectors) can be used. Also useful are devices that continually scan a point or line over the surface of an object to accumulate data to construct an image of the surface. Point scanning detectors can be configured to scan a point (i.e., a small detection area) over the surface of an object via a raster motion in the x-y plane of the surface. Line scanning detectors can be configured to scan a line along the y dimension of the surface of an object, the longest dimension of the line occurring along the x dimension. It will be understood that the detection device, object or both can be moved to achieve scanning detection. Detection apparatus that are particularly useful, for example in nucleic acid sequencing applications, are described in US Pat App. Pub. Nos. 2012/0270305 A1; 2013/0023422 A1; and 2013/0260372 A1; and U.S. Pat. Nos. 5,528,050; 5,719,391; 8,158,926 and 8,241,573, each of which is incorporated herein by reference.

The implementations disclosed herein may be implemented as a method, apparatus, system or article of manufacture using programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), coarse grained reconfigurable architectures (CGRAs), application-specific integrated circuits (ASICs), complex programmable logic devices (CPLDs), programmable logic arrays (PLAs), microprocessors, or other similar processing devices. In particular implementations, information or algorithms set forth herein are present in non-transient storage media.

In particular implementations, a computer implemented method set forth herein can occur in real time while multiple images of an object are being obtained. Such real time analysis is particularly useful for nucleic acid sequencing applications wherein an array of nucleic acids is subjected to repeated cycles of fluidic and detection steps. Analysis of the sequencing data can often be computationally intensive such that it can be beneficial to perform the methods set forth herein in real time or in the background while other data acquisition or analysis algorithms are in process. Example real time analysis methods that can be used with the present methods are those used for the MiSeq and HiSeq sequencing devices commercially available from Illumina, Inc. (San Diego, Calif.) and/or described in US Pat. App. Pub. No. 2012/0020537 A1, which is incorporated herein by reference.

An example data analysis system, formed by one or more programmed computers, with programming being stored on one or more machine readable media with code executed to carry out one or more steps of methods described herein. In one implementation, for example, the system includes an interface designed to permit networking of the system to one or more detection systems (e.g., optical imaging systems) that are configured to acquire data from target objects. The interface may receive and condition data, where appropriate. In particular implementations the detection system will output digital image data, for example, image data that is representative of individual picture elements or pixels that, together, form an image of an array or other object. A processor processes the received detection data in accordance with a one or more routines defined by processing code. The processing code may be stored in various types of memory circuitry.

In accordance with the presently contemplated implementations, the processing code executed on the detection data includes a data analysis routine designed to analyze the detection data to determine the locations and metadata of individual analytes visible or encoded in the data, as well as locations at which no analyte is detected (i.e., where there is no analyte, or where no meaningful signal was detected from an existing analyte). In particular implementations, analyte locations in an array will typically appear brighter than non-analyte locations due to the presence of fluorescing dyes attached to the imaged analytes. It will be understood that the analytes need not appear brighter than their surrounding area, for example, when a target for the probe at the analyte is not present in an array being detected. The color at which individual analytes appear may be a function of the dye employed as well as of the wavelength of the light used by the imaging system for imaging purposes. Analytes to which targets are not bound or that are otherwise devoid of a particular label can be identified according to other characteristics, such as their expected location in the microarray.

Once the data analysis routine has located individual analytes in the data, a value assignment may be carried out. In general, the value assignment will assign a digital value to each analyte based upon characteristics of the data represented by detector components (e.g., pixels) at the corresponding location. That is, for example when imaging data is processed, the value assignment routine may be designed to recognize that a specific color or wavelength of light was detected at a specific location, as indicated by a group or cluster of pixels at the location. In a typical DNA imaging application, for example, the four common nucleotides will be represented by four separate and distinguishable colors. Each color, then, may be assigned a value corresponding to that nucleotide.

As used herein, the terms "module." "system." or "system controller" may include a hardware and/or software system and circuitry that operates to perform one or more functions. For example, a module, system, or system controller may include a computer processor, controller, or other logic-based device that performs operations based on instructions stored on a tangible and non-transitory computer readable storage medium, such as a computer memory. Alternatively, a module, system, or system controller may include a hard-wired device that performs operations based on hard-wired logic and circuitry. The module, system, or system controller shown in the attached figures may represent the hardware and circuitry that operates based on software or hardwired instructions, the software that directs hardware to perform the operations, or a combination thereof. The module, system, or system controller can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are examples only, and are thus not limiting as to the types of memory usable for storage of a computer program.

In the molecular biology field, one of the processes for nucleic acid sequencing in use is sequencing-by-synthesis. The technique can be applied to massively parallel sequencing projects. For example, by using an automated platform, it is possible to carry out hundreds of thousands of sequencing reactions simultaneously. Thus, one of the implementations of the present invention relates to instruments and methods for acquiring, storing, and analyzing image data generated during nucleic acid sequencing.

Enormous gains in the amount of data that can be acquired and stored make streamlined image analysis methods even more beneficial. For example, the image analysis methods described herein permit both designers and end users to make efficient use of existing computer hardware. Accordingly, presented herein are methods and systems which reduce the computational burden of processing data in the face of rapidly increasing data output. For example, in the field of DNA sequencing, yields have scaled 15-fold over the course of a recent year, and can now reach hundreds of gigabases in a single run of a DNA sequencing device. If computational infrastructure requirements grew proportionately, large genome-scale experiments would remain out of reach to most researchers. Thus, the generation of more raw sequence data will increase the need for secondary analysis and data storage, making optimization of data transport and storage extremely valuable. Some implementations of the methods and systems presented herein can reduce the time, hardware, networking, and laboratory infrastructure requirements needed to produce usable sequence data.

The present disclosure describes various methods and systems for carrying out the methods. Examples of some of the methods are described as a series of steps. However, it should be understood that implementations are not limited to the particular steps and/or order of steps described herein. Steps may be omitted, steps may be modified, and/or other steps may be added. Moreover, steps described herein may be combined, steps may be performed simultaneously, steps may be performed concurrently, steps may be split into multiple sub-steps, steps may be performed in a different order, or steps (or a series of steps) may be re-performed in an iterative fashion. In addition, although different methods are set forth herein, it should be understood that the different methods (or steps of the different methods) may be combined in other implementations.

In some implementations, a processing unit, processor, module, or computing system that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

Moreover, the operations of the methods described herein can be sufficiently complex such that the operations cannot be mentally performed by an average human being or a person of ordinary skill in the art within a commercially reasonable time period. For example, the methods may rely on relatively complex computations such that such a person cannot complete the methods within a commercially reasonable time.

Throughout this application various publications, patents or patent applications have been referenced. The disclosures of these publications in their entireties are hereby incorporated by reference in this application in order to more fully describe the state of the art to which this invention pertains.

The term "comprising" is intended herein to be open-ended, including not only the recited elements, but further encompassing any additional elements.

As used herein, the term "each," when used in reference to a collection of items, is intended to identify an individual item in the collection but does not necessarily refer to every item in the collection. Exceptions can occur if explicit disclosure or context clearly dictates otherwise.

Although the invention has been described with reference to the examples provided above, it should be understood that various modifications can be made without departing from the invention.

The modules in this application can be implemented in hardware or software, and need not be divided up in precisely the same blocks as shown in the figures. Some can also be implemented on different processors or computers, or spread among a number of different processors or computers. In addition, it will be appreciated that some of the modules can be combined, operated in parallel or in a different sequence than that shown in the figures without affecting the functions achieved. Also as used herein, the term "module" can include "sub-modules", which themselves can be considered herein to constitute modules. The blocks in the figures designated as modules can also be thought of as flowchart steps in a method.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

As used herein. "concurrently" or "in parallel" does not require exact simultaneity. It is sufficient if the evaluation of one of the individuals begins before the evaluation of another of the individuals completes.

Computer System

Figure 16:
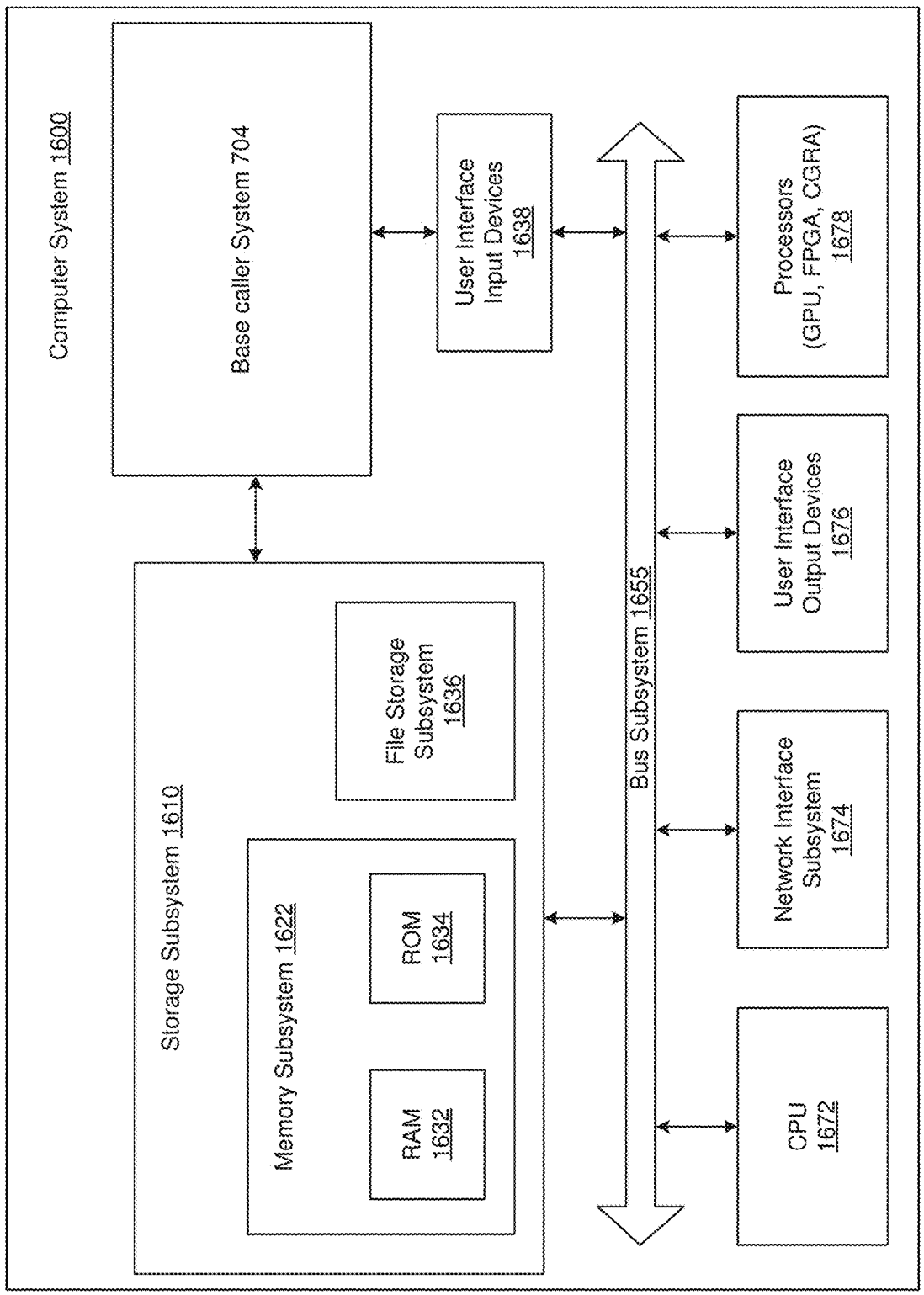
FIG. 16 is a computer system that can be used to implement the technology disclosed.

FIG. 16 is a computer system 1600 that can be used to implement the technology disclosed. Computer system 1600 includes at least one central processing unit (CPU) 1672 that communicates with a number of peripheral devices via bus subsystem 1655. These peripheral devices can include a storage subsystem 1610 including, for example, memory devices and a file storage subsystem 1636, user interface input devices 1638, user interface output devices 1676, and a network interface subsystem 1674. The input and output devices allow user interaction with computer system 1600. Network interface subsystem 1674 provides an interface to outside networks, including an interface to corresponding interface devices in other computer systems.

In one implementation, the base caller 704 is communicably linked to the storage subsystem 1610 and the user interface input devices 1638.

User interface input devices 1638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1600.

User interface output devices 1676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1600 to the user or to another machine or computer system.

Storage subsystem 1610 stores programming and data constructs that provide the functionality of some or all of the modules and methods described herein. These software modules are generally executed by processors 1678.

Processors 1678 can be graphics processing units (GPUs), field-programmable gate arrays (FPGAs), application-specific integrated circuits (ASICs), and/or coarse-grained reconfigurable architectures (CGRAs). Processors 1678 can be hosted by a deep learning cloud platform such as Google Cloud Platform™, Xilinx™, and Cirrascale™. Examples of processors 1678 include Google's Tensor Processing Unit (TPU)™, rackmount solutions like GX4 Rackmount Series™, GX16 Rackmount Series™, NVIDIA DGX-1™, Microsoft™ Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100S™, and others.

Memory subsystem 1622 used in the storage subsystem 1610 can include a number of memories including a main random access memory (RAM) 1632 for storage of instructions and data during program execution and a read only memory (ROM) 1634 in which fixed instructions are stored. A file storage subsystem 1636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1636 in the storage subsystem 1610, or in other machines accessible by the processor.

Bus subsystem 1655 provides a mechanism for letting the various components and subsystems of computer system 1600 communicate with each other as intended. Although bus subsystem 1655 is shown schematically as a single bus, alternative implementations of the bus subsystem can use multiple busses.

Computer system 1600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1600 depicted in FIG. 16 is intended only as a specific example for purposes of illustrating the preferred implementations of the present invention. Many other configurations of computer system 1600 are possible having more or less components than the computer system depicted in FIG. 16.

CLAUSES

The technology disclosed attenuates spatial crosstalk from sensor pixels using sharpening mask-based image processing techniques. The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, the technology disclosed proposes a computer-implemented method of attenuating spatial crosstalk from sensor pixels.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A computer-implemented method of base calling, the method including:
    accessing a section of an image output by a biosensor, the section of the image including a plurality of pixels depicting intensity emission values from a plurality of clusters within the biosensor and from locations within the biosensor that are adjacent to the plurality of clusters, wherein the plurality of clusters includes a target cluster;
    convolving the section of the image with a convolution kernel, to generate a feature map comprising a plurality of features having a corresponding plurality of feature values;
    assigning a weighted feature value to the target cluster, the weighted feature value based on one or more features values of the plurality of feature values of the feature map; and
    processing the weighted feature value assigned to the target cluster, to base call the target cluster.
2. The method of clause 1, wherein the section of the image is a first section that is generated from a first portion of a flow cell of the biosensor, wherein the convolution kernel is a first convolution kernel, the plurality of clusters is a first plurality of clusters, the plurality of pixels is a first plurality of pixels, the feature map is a first feature map, the plurality of feature values is a first plurality of feature values, the target cluster is a first target cluster, the weighted feature value is a first weighted feature value, and wherein the method further comprises:
    accessing a second section of the image output by a second portion of the flow cell of the biosensor, the second section of the image including a second plurality of pixels depicting intensity emission values from a second plurality of clusters within the biosensor and from locations within the biosensor that are adjacent to the second plurality of clusters, wherein the second plurality of clusters includes a second target cluster;
    convolving the second section of the image with a second convolution kernel that is different from the first convolution kernel, to generate a second feature map comprising a second plurality of features having a corresponding second plurality of feature values;
    assigning a second weighted feature value to the second target cluster, the second weighted feature value based on one or more features values of the second plurality of feature values of the second feature map; and processing the second weighted feature value assigned to the second target cluster, to base call the second target cluster.

3. The method of clause 2, wherein:
a tile of the flow cell of the biosensor is divided in k×k portions, where k is a positive integer, and wherein the first portion and the second portion are two portions of the k×k portions of the tile.

4. The method of clause 3, wherein k is one of three, five, or nine.

5. The method of clause 3, further comprising:
capturing the image within the biosensor using a point and shoot image capturing system.

6. The method of clause 2, wherein:
a tile of the flow cell of the biosensor is divided in 1×k portions, where k is a positive integer, and wherein the first portion and the second portion are two portions of the 1×k portions of the tile.

7. The method of clause 6, further comprising:
capturing the image within the biosensor using a line scan image capturing system.

8. The method of clause 2, wherein:
a tile of the flow cell of the biosensor is divided in a plurality of portions, the plurality portions comprising a first type of portions and a second type of portions, the second type of portions interleaved within the first type of portions in a periodic manner; the first portion is one of the first type of portions; and the second portion is one of the second type of portions.

9. The method of clause 8, further comprising:
capturing the image within the biosensor using one or more CMOS (complementary metal oxide semiconductor) sensors.

10. The method of clause 2, wherein:
a tile of the flow cell of the biosensor is divided in a plurality of portions that includes the first portion, the second portion, and a third portion;
the first section of the image generated from the first portion of the tile of the flow cell is convolved with the first convolution kernel;
the second section of the image generated from the second portion of the tile of the flow cell is convolved with the second convolution kernel; and
a third section of the image generated from the third portion of the tile of the flow cell is convolved with a third convolution kernel that is different from each of the first and second convolution kernels.

11. The method of clause 1, wherein the section of the image is a first section that is generated for a first color channel from a first portion of a flow cell, wherein the convolution kernel is a first convolution kernel, the plurality of pixels is a first plurality of pixels, the feature map is a first feature map, the plurality of feature values is a first plurality of feature values, the weighted feature value is a first weighted feature value, and wherein the method further comprises:
accessing a second section of the image that is generated for a second color channel from the first portion of the flow cell, the second section of the image including a second plurality of pixels depicting intensity emission values from the plurality of clusters within the biosensor and from locations within the biosensor that are adjacent to the plurality of clusters;
convolving the second section of the image with a second convolution kernel that is different from the first convolution kernel, to generate a second feature map comprising a second plurality of features having a corresponding second plurality of feature values;
assigning a second weighted feature value to the target cluster, the second weighted feature value based on one or more features values of the second plurality of feature values of the second feature map; and
processing the first weighted feature value and the second weighted feature value assigned to the target cluster, to base call the target cluster.

12. The method of clause 11, wherein:
the first section of the image for the first color channel is convolved with the first convolution kernel;
the second section of the image for the second color channel is convolved with the second convolution kernel; and
the third section of the image for a third color channel is convolved with a third convolution kernel that is different from each of the first and second convolution kernels.

13. The method of clause 1, wherein assigning the weighted feature value to the target cluster comprises:
based on a subpixel position or a sub-feature position of the target cluster, assigning the weighted feature value to the target cluster.

14. The method of clause 13, wherein the subpixel position of the target cluster includes a position of a center of the target cluster relative to a boundary of a pixel or a center of the pixel within which the target cluster is located.

15. The method of clause 13, wherein the sub-feature position of the target cluster includes a position of a center of the target cluster relative to a boundary of a feature or a center of the feature within which the target cluster is located.

16. The method of clause 1, wherein assigning the weighted feature value to the target cluster comprises:
based on a coordinate location of a center of the target cluster relative to coordinate locations of adjacent pixels in the section of the image, assigning the weighted feature value to the target cluster.

17. The method of clause 1, wherein assigning the weighted feature value to the target cluster comprises:
based on a coordinate location of a center of the target cluster relative to coordinate locations of adjacent features in the feature map, assigning the weighted feature value to the target cluster.

18. The method of clause 1, wherein assigning the weighted feature value to the target cluster comprises:
based on one or more center-to-center distances associated with the target cluster, assigning the weighted feature value to the target cluster.

19. The method of clause 18, further comprising:
determining the one or more center-to-center distances associated with the target cluster, the one or more center-to-center distances including (i) a first center-to-center distance between a center of the target cluster and a center of a first pixel of the plurality of pixels of the section of the image, wherein the target cluster is within the first pixel, and (ii) a second center-to-center distance between the center of the target cluster and a center of a second pixel of the plurality of pixels, the second pixel neighboring the first pixel in the section of the image.

20. The method of clause 18, further comprising:
  determining the one or more center-to-center distances associated with the target cluster, the one or more center-to-center distances associated with the target cluster including (i) a first center-to-center distance between a center of the target cluster and a center of a first feature of the plurality of features of the feature map, and (ii) a second center-to-center distance between the center of the target cluster and a center of a second feature of the plurality of features, the second feature neighboring the first feature in the feature map.

21. The method of clause 1, wherein assigning the weighted feature value to the target cluster comprises:
  selecting one or more features of the plurality of features that are nearest to a center of the target cluster; and
  interpolating the one or more feature values corresponding to the selected one or more features, to assign the weighted feature value to the target cluster.

22. The method of clause 21, wherein interpolating the one or more feature values corresponding to the selected one or more features, to assign the weighted feature value to the target cluster comprises:
  using one of bilinear interpolation, bicubic interpolation, interpolation based on weighted area coverage, Lanczos interpolation, or interpolation based on Hanning window, to assign the weighted feature value to the target cluster.

23. The method of clause 1, further comprising:
  training a base caller to generate and/or update coefficients of the convolution kernel.

24. The method of clause 23, wherein training the base caller comprises:
  training the base caller using at least one of least squares estimation, ordinary least squares, least-mean squares, and recursive least-squares to generate and/or update the coefficients.

25. The method of clause 23, wherein training the base caller comprises:
  training the base caller during a sequencing run, to update coefficients of the convolution kernel.

26. The method of clause 25, wherein training the base caller during the sequencing run comprises:
  training the base caller using data from one or more sequencing cycles of the sequencing run, to update the coefficients of the convolution kernel; and
  using the updated coefficients of the convolution kernel for convolution of images generated during subsequent one or more sequencing cycles of the sequencing run.

27. The method of clause 25, wherein training the base caller during the sequencing run comprises:
  training the base caller using data from a first sequencing cycle of the sequencing run, to update the coefficients of the convolution kernel; and
  using the updated coefficients of the convolution kernel for convolution of images generated during a second sequencing cycle and one or more subsequent sequencing cycles of the sequencing run.

28. The method of clause 23, further comprising:
  accessing base-wise feature value distributions of each of the four bases A, C, G, and T generated during prior base calling of images in the training data;
  selecting respective centers of the base-wise feature value distributions as base-wise ground truth targets for corresponding color channels; and
  using the base-wise ground truth targets to train the base caller.

29. A non-transitory computer readable storage medium impressed with computer program instructions to perform base calling, the instructions, when executed on a processor, implement a method comprising:
  accessing a first image output by a flow cell during a first sequencing cycle of a plurality of sequencing cycles of a sequencing run, the first image including a first plurality of pixels depicting intensity emission values from a plurality of clusters within the flow cell;
  processing the first image that is output during the first sequencing cycle, to update coefficients of a convolution kernel;
  accessing a second image output by the flow cell during a second sequencing cycle of the plurality of sequencing cycles of the sequencing run, the second image including a second plurality of pixels depicting intensity emission values from the plurality of clusters;
  convolving the second image with the updated coefficients of the convolution kernel, to generate a feature map comprising a plurality of features having a corresponding plurality of feature values;
  interpolating one or more feature values of one or more features of the feature map, to generate a weighted feature value for the target cluster; and
  processing the weighted feature value assigned to the target cluster, to base call the target cluster.

30. The non-transitory computer readable storage medium of clause 29, wherein processing the first image to update coefficients comprises:
  accessing a ground truth of a target cluster within the first image, wherein the ground truth of the target cluster has an associated ground truth feature value;
  generating, based on processing the first image using previous values of the coefficients, an output feature value for the target cluster; and
  based on a difference between the ground truth feature value and the output feature value, updating the coefficients, so as to reduce the difference.

31. The non-transitory computer readable storage medium of clause 29, wherein the second sequencing cycle is subsequent to the first sequencing cycle, wherein there is at least one sequencing cycle between the first sequencing cycle and the second sequencing cycle.

32. The non-transitory computer readable storage medium of clause 29, wherein the convolution kernel is a first convolution kernel, and wherein processing the first image comprises:
  processing (i) a first section of the first image, which is output by a first section of a tile of a flow cell during the first sequencing cycle, to update coefficients of the first convolution kernel, and (ii) a second section of the first image, which is output by a second section of the tile during the first sequencing cycle, to update coefficients of a second convolution kernel.

33. The non-transitory computer readable storage medium of clause 32, wherein processing the first image further comprises:

processing a third section of the first image, which is output by a third section of the tile during the first sequencing cycle, to update coefficients of a third convolution kernel.

34. The non-transitory computer readable storage medium of clause 29, wherein interpolating the one or more feature values of the one or more features of the feature map comprises:
   interpolating the one or more feature values of the one or more features of the feature map, using one of bilinear interpolation, bicubic interpolation, or interpolation based on weighted area coverage, to assign the weighted feature value to the target cluster.

35. The non-transitory computer readable storage medium of clause 29, wherein within the feature map, centers of the one or more features among the among the plurality of feature of the feature map are nearest to a center of the target cluster.

36. A system including one or more processors coupled to memory, the memory loaded with computer instructions to perform base calling, the instructions, when executed on the processors, implement actions comprising:
   accessing an image whose pixels depict intensity emissions for a first color channel and a second color channel from a target cluster and from locations adjacent to the target clusters;
   convolving a first mask with the intensity emissions of the pixels for the first color channel in the image to produce a first feature map, and convolving a second mask with the intensity emissions of the pixels for the second color channel in the image to produce a second feature map;
   interpolating (i) one or more feature values of one or more features of the first feature map, to generate a first weighted feature value for the target cluster, and (ii) one or more feature values of one or more features of the second feature map, to generate a second weighted feature value for the target cluster; and
   processing the first and second weighted feature values assigned to the target cluster, to base call the target cluster.

37. A non-transitory computer readable storage medium impressed with computer program instructions to perform base calling, the instructions, when executed on a processor, implement a method comprising:
   accessing a section of an image output by a biosensor, the section of the image including a plurality of pixels depicting intensity emission values from a plurality of clusters within the biosensor and from locations within the biosensor that are adjacent to the plurality of clusters, wherein the plurality of clusters includes a target cluster;
   convolving the section of the image with a convolution kernel, to generate a feature map comprising a plurality of features having a corresponding plurality of feature values;
   assigning a weighted feature value to the target cluster, the weighted feature value based on one or more features values of the plurality of feature values of the feature map; and
   processing the weighted feature value assigned to the target cluster, to base call the target cluster.

38. The non-transitory computer readable storage medium of clause 37, wherein the section of the image is a first section that is generated from a first portion of a flow cell of the biosensor, wherein the convolution kernel is a first convolution kernel, the plurality of clusters is a first plurality of clusters, the plurality of pixels is a first plurality of pixels, the feature map is a first feature map, the plurality of feature values is a first plurality of feature values, the target cluster is a first target cluster, the weighted feature value is a first weighted feature value, and wherein the method further comprises:
   accessing a second section of the image output by a second portion of the flow cell of the biosensor, the second section of the image including a second plurality of pixels depicting intensity emission values from a second plurality of clusters within the biosensor and from locations within the biosensor that are adjacent to the second plurality of clusters, wherein the second plurality of clusters includes a second target cluster;
   convolving the second section of the image with a second convolution kernel that is different from the first convolution kernel, to generate a second feature map comprising a second plurality of features having a corresponding second plurality of feature values;
   assigning a second weighted feature value to the second target cluster, the second weighted feature value based on one or more features values of the second plurality of feature values of the second feature map; and
   processing the second weighted feature value assigned to the second target cluster, to base call the second target cluster.

39. The non-transitory computer readable storage medium of clause 38, wherein:
   a tile of the flow cell of the biosensor is divided in k×k portions, where k is a positive integer, and wherein the first portion and the second portion are two of the k×k portions of the tile.

40. The non-transitory computer readable storage medium of clause 39 wherein k is one of three, five, or nine.

41. The non-transitory computer readable storage medium of clause 39, further comprising:
   capturing the image within the biosensor using a point and shoot image capturing system.

42. The non-transitory computer readable storage medium of clause 38, wherein:
   a tile of the flow cell of the biosensor is divided in 1×k portions, where k is a positive integer, and wherein the first portion and the second portion are two of the 1×k portions of the tile.

43. The non-transitory computer readable storage medium of clause 42, further comprising:
   capturing the image within the biosensor using a line scan image capturing system.

44. The non-transitory computer readable storage medium of clause 38, wherein:
   a tile of the flow cell of the biosensor is divided in a plurality of portions, the plurality portions comprising a first type of portions and a second type of portions, the second type of portions interleaved within the first type of portions in a periodic manner;
   the first portion is one of the first type of portions; and
   the second portion is one of the second type of portions.

45. The non-transitory computer readable storage medium of clause 44, further comprising:
   capturing the image within the biosensor using one or more CMOS (complementary metal oxide semiconductor) sensors.

46. The non-transitory computer readable storage medium of clause 38, wherein:
   a tile of the flow cell of the biosensor is divided in a plurality of portions that includes the first portion, the second portion, and a third portion;
   the first section of the image generated from the first portion of the tile of the flow cell is convolved with the first convolution kernel;
   the second section of the image generated from the second portion of the tile of the flow cell is convolved with the second convolution kernel; and
   a third section of the image generated from the third portion of the tile of the flow cell is convolved with a third convolution kernel that is different from each of the first and second convolution kernels.

47. The non-transitory computer readable storage medium of clause 37, wherein the section of the image is a first section that is generated for a first color channel from a first portion of a flow cell, wherein the convolution kernel is a first convolution kernel, the plurality of pixels is a first plurality of pixels, the feature map is a first feature map, the plurality of feature values is a first plurality of feature values, the weighted feature value is a first weighted feature value, and wherein the method further comprises:
   accessing a second section of the image that is generated for a second color channel from the first portion of a flow cell of the biosensor, the second section of the image including a second plurality of pixels depicting intensity emission values from the plurality of clusters within the biosensor and from locations within the biosensor that are adjacent to the plurality of clusters;
   convolving the second section of the image with a second convolution kernel that is different from the first convolution kernel, to generate a second feature map comprising a second plurality of features having a corresponding second plurality of feature values;
   assigning a second weighted feature value to the target cluster, the second weighted feature value based on one or more features values of the second plurality of feature values of the second feature map; and
   processing the first weighted feature value and the second weighted feature value assigned to the target cluster, to base call the target cluster.

48. The non-transitory computer readable storage medium of clause 37, wherein assigning the weighted feature value to the target cluster comprises:
   based on one or more center-to-center distances associated with the target cluster, assigning the weighted feature value to the target cluster.

49. The non-transitory computer readable storage medium of clause 48, further comprising:
   determining the one or more center-to-center distances associated with the target cluster, the one or more center-to-center distances including (i) a first center-to-center distance between a center of the target cluster and a center of a first pixel of the plurality of pixels of the section of the image, wherein the target cluster is within the first pixel, and (ii) a second center-to-center distance between the center of the target cluster and a center of a second pixel of the plurality of pixels, the second pixel neighboring the first pixel in the section of the image.

50. The non-transitory computer readable storage medium of clause 48, further comprising:
   determining the one or more center-to-center distances associated with the target cluster, the one or more center-to-center distances associated with the target cluster including (i) a first center-to-center distance between a center of the target cluster and a center of a first feature of the plurality of features of the feature map, and (ii) a second center-to-center distance between the center of the target cluster and a center of a second feature of the plurality of features, the second feature neighboring the first feature in the feature map.

51. The non-transitory computer readable storage medium of clause 37, wherein assigning the weighted feature value to the target cluster comprises:
   selecting one or more features of the plurality of features that are nearest to a center of the target cluster; and
   interpolating the one or more feature values corresponding to the selected one or more features, to assign the weighted feature value to the target cluster.

52. The non-transitory computer readable storage medium of clause 51, wherein interpolating the one or more feature values corresponding to the selected one or more features, to assign the weighted feature value to the target cluster comprises:
   using one of bilinear interpolation, bicubic interpolation, or interpolation based on weighted area coverage, to assign the weighted feature value to the target cluster.

53. The non-transitory computer readable storage medium of clause 37, further comprising:
   training a base caller to generate and/or update coefficients of the convolution kernel.

54. The non-transitory computer readable storage medium of clause 47, wherein training the base caller comprises:
   training the base caller using at least one of least squares estimation, ordinary least squares, least-mean squares, and recursive least-squares to generate and/or update the coefficients.

55. The non-transitory computer readable storage medium of clause 53, wherein training the base caller comprises:
   training the base caller during a sequencing run, to update coefficients of the convolution kernel.

56. The non-transitory computer readable storage medium of clause 55, wherein training the base caller during the sequencing run comprises:
   training the base caller using data from one or more sequencing cycles of the sequencing run, to update the coefficients of the convolution kernel; and
   using the updated coefficients of the convolution kernel for convolution of images generated during subsequent one or more sequencing cycles of the sequencing run.

57. The non-transitory computer readable storage medium of clause 55, wherein training the base caller during the sequencing run comprises:
   training the base caller using data from a first sequencing cycle of the sequencing run, to update the coefficients of the convolution kernel; and
   using the updated coefficients of the convolution kernel for convolution of images generated during a second sequencing cycle and one or more subsequent sequencing cycles of the sequencing run.

58. The non-transitory computer readable storage medium of clause 53, further comprising:
accessing base-wise intensity distributions of each of the four bases A, C, G, and T generated during prior base calling of images in the training data;
selecting respective centers of the base-wise intensity distributions as base-wise ground truth target intensities for corresponding color channels; and
using the base-wise ground truth target intensities to train the base caller.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system comprising:
one or more processors coupled to memory; and
computer instructions that, when executed on the one or more processors, cause the system to:
access an image section of an image depicting intensity emission values from clusters of oligonucleotides;
filter, from the image section, a set of feature values for a feature map corresponding to the image section;
determine a corresponding feature value for a target cluster of oligonucleotides based on the set of feature values from the feature map; and
generate a base call for the target cluster of oligonucleotides by applying the corresponding feature value to a subset of intensity emission values for the target cluster of oligonucleotides.

2. The system of claim 1, further comprising instructions that, when executed by the one or more processors, cause the system to determine the corresponding feature value for the target cluster of oligonucleotides by determining a weighted feature value for the target cluster of oligonucleotides based on neighboring feature values from the feature map that correspond to neighboring clusters of oligonucleotides that neighbor the target cluster of oligonucleotides.

3. The system of claim 1, further comprising computer instructions that, when executed by the one or more processors, cause the system to:
access the image section of the image by accessing the image in an imaging channel of a sequencing instrument; and
generate the feature map for the image section in the imaging channel.

4. The system of claim 1, further comprising computer instructions that, when executed by the one or more processors, cause the system to:
determine the corresponding feature value for the target cluster of oligonucleotides by interpolating one or more feature values from the set of feature values from the feature map for the image section of the image captured for a single sequencing cycle; and
generate the base call for the target cluster of oligonucleotides by applying the corresponding feature value to the subset of intensity emission values from the image captured for the single sequencing cycle.

5. The system of claim 1, wherein the image section of the image comprises a sub-tile region for a sub-tile of a flow cell.

6. The system of claim 1, further comprising instructions that, when executed by the one or more processors, cause the system to:
access an additional image section of the image depicting intensity emission values from one or more of the clusters of oligonucleotides;
filter, from the additional image section, an additional set of feature values for an additional feature map corresponding to the additional image section;
determine an additional corresponding feature value for an additional target cluster of oligonucleotides based on the additional set of feature values from the additional feature map; and
generate an additional base call for the additional target cluster of oligonucleotides by applying the additional corresponding feature value to intensity emission values for the additional target cluster of oligonucleotides.

7. The system of claim 1, further comprising computer instructions that, when executed by the one or more processors, cause the system to filter the set of feature values for the feature map by extracting, utilizing a sharpening operation, one or more of the intensity emission values of the intensity emission values to generate one or more feature values of the set of feature values for the feature map.

8. The system of claim 1, further comprising computer instructions that, when executed by the one or more processors, cause the system to generate the feature map by convolving the image section with a corresponding convolution kernel in a set of convolution kernels.

9. The system of claim 1, further comprising computer instructions that, when executed by the one or more processors, cause the system to:
filter, utilizing a convolutional neural network, the set of feature values for the feature map corresponding to the image section; and
determine, utilizing the convolutional neural network, the corresponding feature value for the target cluster of oligonucleotides based on the set of feature values from the feature map.

10. A non-transitory computer readable storage medium storing computer instructions that, when executed by one or more processors, cause a system to:
access an image section of an image depicting intensity emission values from clusters of oligonucleotides;
filter, from the image section, a set of feature values for a feature map corresponding to the image section;
determine a corresponding feature value for a target cluster of oligonucleotides based on the set of feature values from the feature map; and
generate a base call for the target cluster of oligonucleotides by applying the corresponding feature value to a subset of intensity emission values for the target cluster of oligonucleotides.

11. The non-transitory computer readable storage medium of claim 10, further storing computer instructions that, when executed by the one or more processors, cause the system to determine the corresponding feature value for the target cluster of oligonucleotides by determining a weighted feature value for the target cluster of oligonucleotides based on neighboring feature values from the feature map that correspond to neighboring clusters of oligonucleotides that neighbor the target cluster of oligonucleotides.

12. The non-transitory computer readable storage medium of claim 10, further storing computer instructions that, when executed by the one or more processors, cause the system to:

access the image section of the image by accessing the image in an imaging channel of a sequencing instrument; and
generate the feature map for the image section in the imaging channel.

13. The non-transitory computer readable storage medium of claim 10, further storing computer instructions that, when executed by the one or more processors, cause the system to:
determine the corresponding feature value for the target cluster of oligonucleotides by interpolating one or more feature values from the set of feature values from the feature map for the image section of the image captured for a single sequencing cycle; and
generate the base call for the target cluster of oligonucleotides by applying the corresponding feature value to the subset of intensity emission values from the image captured for the single sequencing cycle.

14. The non-transitory computer readable storage medium of claim 10, wherein the image section of the image comprises a sub-tile region for a sub-tile of a flow cell.

15. The non-transitory computer readable storage medium of claim 10, further storing computer instructions that, when executed by the one or more processors, cause the system to:
access an additional image section of the image depicting intensity emission values from one or more of the clusters of oligonucleotides;
filter, from the additional image section, an additional set of feature values for an additional feature map corresponding to the additional image section;
determine an additional corresponding feature value for an additional target cluster of oligonucleotides based on the additional set of feature values from the additional feature map; and
generate an additional base call for the additional target cluster of oligonucleotides by applying the additional corresponding feature value to intensity emission values for the additional target cluster of oligonucleotides.

16. A computer-implemented method comprising:
accessing an image section of an image depicting intensity emission values from clusters of oligonucleotides;
filtering, from the image section, a set of feature values for a feature map corresponding to the image section;
determining a corresponding feature value for a target cluster of oligonucleotides based on the set of feature values from the feature map; and
generating a base call for the target cluster of oligonucleotides by applying the corresponding feature value to a subset of intensity emission values for the target cluster of oligonucleotides.

17. The computer-implemented method of claim 16, wherein filtering the set of feature values for the feature map comprises extracting, utilizing a sharpening operation, one or more of the intensity emission values of the intensity emission values to generate one or more feature values of the set of feature values for the feature map.

18. The computer-implemented method of claim 16, further comprising generating the feature map by convolving the image section with a corresponding convolution kernel in a set of convolution kernels.

19. The computer-implemented method of claim 16, further comprising:
filtering, utilizing a convolutional neural network, the set of feature values for the feature map corresponding to the image section; and
determining, utilizing the convolutional neural network, the corresponding feature value for the target cluster of oligonucleotides based on the set of feature values from the feature map.

20. The computer-implemented method of claim 16, further comprising:
accessing an additional image section of the image depicting intensity emission values from one or more of the clusters of oligonucleotides;
filtering, from the additional image section, an additional set of feature values for an additional feature map corresponding to the additional image section;
determining an additional corresponding feature value for an additional target cluster of oligonucleotides based on the additional set of feature values from the additional feature map; and
generating an additional base call for the additional target cluster of oligonucleotides by applying the additional corresponding feature value to intensity emission values for the additional target cluster of oligonucleotides.

* * * * *